United States Patent
Ono

(10) Patent No.: US 11,546,506 B2
(45) Date of Patent: Jan. 3, 2023

(54) IMAGING APPARATUS, IMAGING METHOD, IMAGING PROGRAM, AND IMAGING SYSTEM

(71) Applicant: FUJIFILM Corporation, Tokyo (JP)

(72) Inventor: Shuji Ono, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 124 days.

(21) Appl. No.: 17/008,587

(22) Filed: Aug. 31, 2020

(65) Prior Publication Data

US 2020/0404166 A1    Dec. 24, 2020

Related U.S. Application Data

(63) Continuation of application No. PCT/JP2019/002766, filed on Jan. 28, 2019.

(30) Foreign Application Priority Data

Mar. 6, 2018 (JP) ............................. JP2018-039977

(51) Int. Cl.
*H04N 5/232* (2006.01)
*B64C 39/02* (2006.01)
(Continued)

(52) U.S. Cl.
CPC ....... *H04N 5/23222* (2013.01); *B64C 39/024* (2013.01); *G01C 21/20* (2013.01);
(Continued)

(58) Field of Classification Search
CPC .. H04N 5/23222; H04N 17/002; H04N 5/232; B64C 39/024; B64C 2201/027;
(Continued)

(56) References Cited

U.S. PATENT DOCUMENTS 10,352,912 B2    7/2019  Iida et al.
2001/0048815 A1  12/2001 Nakajima et al.
(Continued)

FOREIGN PATENT DOCUMENTS

CN    102661742    9/2012
EP    3264298      1/2018
(Continued)

OTHER PUBLICATIONS

"Office Action of China Counterpart Application", dated May 8, 2021, with English translation thereof, p. 1-p. 21.
(Continued)

*Primary Examiner* — Nasim N Nirjhar
(74) *Attorney, Agent, or Firm* — JCIPRNET

(57) ABSTRACT

Provided are an imaging apparatus, an imaging method, an imaging program, and an imaging system capable of easily making an imaging plan. The imaging apparatus (100) includes an imaging evaluation map acquiring section (101) that acquires an imaging evaluation map, and an imaging point selecting section (102) that selects an imaging point suitable for imaging an object and an imaging condition at the imaging point on the basis of the acquired imaging evaluation map. In the imaging evaluation map, an evaluation value that represents an evaluation of imaging in a case where an object is imaged at a specific position under a specific imaging condition is set at a plurality of imaging candidate positions for each of a plurality of imaging conditions.

21 Claims, 40 Drawing Sheets

(51) Int. Cl.
*G01C 21/20* (2006.01)
*G05D 1/00* (2006.01)
*G05D 1/10* (2006.01)

(52) U.S. Cl.
CPC ...... *G05D 1/0094* (2013.01); *B64C 2201/027* (2013.01); *B64C 2201/123* (2013.01); *B64C 2201/141* (2013.01); *G05D 1/0088* (2013.01); *G05D 1/101* (2013.01)

(58) Field of Classification Search
CPC ........ B64C 2201/123; B64C 2201/141; G01C 21/20; G05D 1/0094; G05D 1/0088; G05D 1/101; E01D 22/00; E04G 23/00; G03B 15/00
See application file for complete search history.

(56) References Cited

U.S. PATENT DOCUMENTS

| | | | |
|---|---|---|---|
| 2002/0113865 | A1 | 8/2002 | Yano et al. |
| 2017/0318209 | A1 | 11/2017 | Miyakawa et al. |
| 2017/0318256 | A1 | 11/2017 | Miyakawa et al. |
| 2017/0372466 | A1* | 12/2017 | Hirota ................. H04W 84/02 |
| 2017/0372523 | A1 | 12/2017 | Espeset et al. |
| 2020/0036952 | A1* | 1/2020 | Iwane ................. G06T 15/205 |
| 2021/0126582 | A1* | 4/2021 | Shue ................. G01M 5/005 |

FOREIGN PATENT DOCUMENTS

| | | |
|---|---|---|
| JP | 2000175183 | 6/2000 |
| JP | 2005045398 | 2/2005 |
| JP | 2011010133 | 1/2011 |
| JP | 2012094979 | 5/2012 |
| JP | 2017031740 | 2/2017 |

OTHER PUBLICATIONS

"Search Report of Europe Counterpart Application", dated Jun. 11, 2021, p. 1-p. 14.

Jose Luis Alarcon-Herrera et al., "Viewpoint selection for vision systems in industrial inspection," 2014 IEEE International Conference on Robotics and Automation (ICRA), Hong Kong Convention and Exhibition Center, Jun. 2014, pp. 4934-4939.

Enrique Dunn et al., "Pareto optimal camera placement for automated visual inspection," 2005 IEEE/RSJ International Conference on Intelligent Robots and Systems, Dec. 2015, pp. 1-6.

"International Search Report (Form PCT/ISA/210) of PCT/JP2019/002766," dated Apr. 23, 2019, with English translation thereof, pp. 1-3.

"Written Opinion of the International Searching Authority (Form PCT/ISA/237) of PCT/JP2019/002766," dated Apr. 23, 2019, with English translation thereof, pp. 1-7.

"International Search Report (Form PCT/ISA/210) of PCT/JP2019/002765," dated Apr. 23, 2019, with English translation thereof, pp. 1-3.

"Written Opinion of the International Searching Authority (Form PCT/ISA/237) of PCT/JP2019/002765," dated Apr. 23, 2019, with English translation thereof, pp. 1-9.

"Office Action of China Co-Pending Application, Application No. 201980017458 9", dated May 8, 2021, with English translation thereof, p. 1-p. 14.

Robert Bodor et al., "Optimal Camera Placement for Automated Surveillance Tasks", Journal of Intelligent and Robotic Systems, Oct. 3, 2007, pp. 257-295.

Konstantinos Tarabanis et al., "Planning viewpoints that simultaneously satisfy several feature detectability constraints for robotic vision", Fifth International Conference on Advanced Robotics 'Robots in Unstructured Environments, Jun. 19, 1991, pp. 1410-1415.

"Search Report of Europe Co-Pending Application, Application No. 19763693.9", dated Mar. 30, 2021, p. 1-p. 13.

"Office Action of U.S. Co-Pending Application, U.S. Appl. No. 17/008,599", dated Jan. 27, 2022, p. 1-p. 44.

Office Action of China Counterpart Application, with English translation thereof, dated Jan. 10, 2022, pp. 1-9.

"Office Action of U.S. Appl. No. 17/008,599", dated May 5, 2022, pp. 1-33.

* cited by examiner

FIG. 5

| CHARACTERISTIC PART | EVALUATION FUNCTION F | INDIVIDUAL EVALUATION VALUE $\alpha$ | EVALUATION VALUE $\Sigma \alpha$ |
|---|---|---|---|
| 1 | F1 | $\alpha$1 | $\sigma$ |
| 2 | F2 | $\alpha$2 | |
| 3 | F3 | $\alpha$3 | |
| ... | ... | ... | |
| n-1 | Fn-1 | $\alpha$n-1 | |
| n | Fn | $\alpha$n | |

$(\Sigma \alpha = \alpha 1 + \alpha 2 + \cdots \alpha n-1 + \alpha n)$

FIG. 6

| IMAGING CANDIDATE POSITION PP | IMAGING CONDITION SC | EVALUATION VALUE $\sigma$ |
|---|---|---|
| PP(X1, Y1, Z1) | SC1 | $\sigma1(X1, Y1, Z1)$ |
| | SC2 | $\sigma2(X1, Y1, Z1)$ |
| | ⋮ | ⋮ |
| | SCn | $\sigma n(X1, Y1, Z1)$ |
| PP(X2, Y1, Z1) | SC1 | $\sigma1(X2, Y1, Z1)$ |
| | SC2 | $\sigma2(X2, Y1, Z1)$ |
| | ⋮ | ⋮ |
| | SCn | $\sigma n(X2, Y1, Z1)$ |
| ⋮ | ⋮ | ⋮ |
| PP(Xn, Yn, Zn) | SC1 | $\sigma1(Xn, Yn, Zn)$ |
| | SC2 | $\sigma2(Xn, Yn, Zn)$ |
| | ⋮ | ⋮ |
| | SCn | $\sigma n(Xn, Yn, Zn)$ |

FIG. 12

| IMAGING DIRECTION 45° | | | | | | | | |
|---|---|---|---|---|---|---|---|---|
| IMAGING CANDIDATE POSITION | | | CHARACTERISTIC PART CP | DISTANCE d | POSITION EVALUATION fna | DIRECTION $\theta n$ | DIRECTION EVALUATION fnb | INDIVIDUAL EVALUATION VALUE $Fn = fna * fnb$ | EVALUATION VALUE $\Sigma Fn$ |
| PP | X | Y | | | | | | | |
| 1 | 150 | 50 | 1 | 5000 | 0.41 | 135.0 | 0.25 | 0.00 | 0.00 |
| | | | 2 | 65000 | 0.46 | 168.7 | 0.10 | 0.00 | |
| 2 | 75 | 50 | 1 | 3125 | 0.28 | 63.4 | 0.81 | 0.01 | 0.01 |
| | | | 2 | 33125 | 0.74 | 164.1 | 0.11 | 0.00 | |
| 3 | 0 | 50 | 1 | 12500 | 0.78 | 26.6 | 0.81 | 0.25 | 0.25 |
| | | | 2 | 12500 | 0.78 | 153.4 | 0.16 | 0.00 | |
| 4 | -75 | 50 | 1 | 33125 | 0.74 | 15.9 | 0.70 | 0.14 | 0.14 |
| | | | 2 | 3125 | 0.28 | 116.6 | 0.36 | 0.00 | |
| 5 | -150 | 50 | 1 | 65000 | 0.46 | 11.3 | 0.66 | 0.03 | 0.10 |
| | | | 2 | 5000 | 0.41 | 45.0 | 1.00 | 0.07 | |
| 6 | 150 | 100 | 1 | 12500 | 0.78 | 116.6 | 0.36 | 0.02 | 0.02 |
| | | | 2 | 72500 | 0.43 | 158.2 | 0.14 | 0.00 | |
| 7 | 75 | 100 | 1 | 10625 | 0.70 | 76.0 | 0.69 | 0.11 | 0.11 |
| | | | 2 | 40625 | 0.65 | 150.3 | 0.17 | 0.00 | |
| 8 | 0 | 100 | 1 | 20000 | 0.99 | 45.0 | 1.00 | 0.97 | 0.99 |
| | | | 2 | 20000 | 0.99 | 135.0 | 0.25 | 0.02 | |
| 9 | -75 | 100 | 1 | 40625 | 0.65 | 29.7 | 0.84 | 0.16 | 0.19 |
| | | | 2 | 10625 | 0.70 | 104.0 | 0.45 | 0.03 | |
| 10 | -150 | 100 | 1 | 72500 | 0.43 | 21.8 | 0.76 | 0.03 | 0.28 |
| | | | 2 | 12500 | 0.78 | 63.4 | 0.81 | 0.25 | |
| 11 | 150 | 150 | 1 | 25000 | 0.88 | 108.4 | 0.42 | 0.05 | 0.05 |
| | | | 2 | 85000 | 0.37 | 149.0 | 0.18 | 0.00 | |
| 12 | 75 | 150 | 1 | 23125 | 0.92 | 80.5 | 0.64 | 0.21 | 0.21 |
| | | | 2 | 53125 | 0.54 | 139.4 | 0.23 | 0.00 | |
| 13 | 0 | 150 | 1 | 32500 | 0.75 | 56.3 | 0.88 | 0.29 | 0.30 |
| | | | 2 | 32500 | 0.75 | 123.7 | 0.32 | 0.01 | |
| 14 | -75 | 150 | 1 | 53125 | 0.54 | 40.6 | 0.95 | 0.14 | 0.22 |
| | | | 2 | 23125 | 0.92 | 99.5 | 0.49 | 0.09 | |
| 15 | -150 | 150 | 1 | 85000 | 0.37 | 31.0 | 0.85 | 0.03 | 0.29 |
| | | | 2 | 25000 | 0.88 | 71.6 | 0.73 | 0.26 | |
| 16 | 150 | 200 | 1 | 42500 | 0.63 | 104.0 | 0.45 | 0.02 | 0.02 |
| | | | 2 | 102500 | 0.32 | 141.3 | 0.22 | 0.00 | |
| 17 | 75 | 200 | 1 | 40625 | 0.65 | 82.9 | 0.62 | 0.07 | 0.07 |
| | | | 2 | 70625 | 0.43 | 131.2 | 0.27 | 0.00 | |
| 18 | 0 | 200 | 1 | 50000 | 0.56 | 63.4 | 0.81 | 0.09 | 0.10 |
| | | | 2 | 50000 | 0.56 | 116.6 | 0.36 | 0.01 | |
| 19 | -75 | 200 | 1 | 70625 | 0.43 | 48.8 | 0.96 | 0.07 | 0.11 |
| | | | 2 | 40625 | 0.65 | 97.1 | 0.50 | 0.04 | |
| 20 | -150 | 200 | 1 | 102500 | 0.32 | 38.7 | 0.93 | 0.03 | 0.11 |
| | | | 2 | 42500 | 0.63 | 76.0 | 0.69 | 0.08 | |

FIG. 13

| IMAGING DIRECTION 90° | | | | | | | | | |
|---|---|---|---|---|---|---|---|---|---|
| IMAGING CANDIDATE POSITION | | | CHARACTERISTIC PART CP | DISTANCE d | POSITION EVALUATION fna | DIRECTION $\theta_n$ | DIRECTION EVALUATION fnb | INDIVIDUAL EVALUATION VALUE Fn = fna * fnb | EVALUATION VALUE $\Sigma$Fn |
| PP | X | Y | | | | | | | |
| 1 | 150 | 50 | 1 | 5000 | 0.41 | 135.0 | 0.56 | 0.01 | 0.02 |
| | | | 2 | 65000 | 0.46 | 168.7 | 0.32 | 0.00 | |
| 2 | 75 | 50 | 1 | 3125 | 0.28 | 63.4 | 0.73 | 0.01 | 0.03 |
| | | | 2 | 33125 | 0.74 | 164.1 | 0.35 | 0.02 | |
| 3 | 0 | 50 | 1 | 12500 | 0.78 | 26.6 | 0.42 | 0.03 | 0.07 |
| | | | 2 | 12500 | 0.78 | 153.4 | 0.42 | 0.03 | |
| 4 | -75 | 50 | 1 | 33125 | 0.74 | 15.9 | 0.35 | 0.02 | 0.03 |
| | | | 2 | 3125 | 0.28 | 116.6 | 0.73 | 0.01 | |
| 5 | -150 | 50 | 1 | 65000 | 0.46 | 11.3 | 0.32 | 0.00 | 0.02 |
| | | | 2 | 5000 | 0.41 | 45.0 | 0.56 | 0.01 | |
| 6 | 150 | 100 | 1 | 12500 | 0.78 | 116.6 | 0.73 | 0.18 | 0.19 |
| | | | 2 | 72500 | 0.43 | 158.2 | 0.39 | 0.00 | |
| 7 | 75 | 100 | 1 | 10625 | 0.70 | 76.0 | 0.85 | 0.21 | 0.24 |
| | | | 2 | 40625 | 0.65 | 150.3 | 0.44 | 0.02 | |
| 8 | 0 | 100 | 1 | 20000 | 0.99 | 45.0 | 0.56 | 0.17 | 0.35 |
| | | | 2 | 20000 | 0.99 | 135.0 | 0.56 | 0.17 | |
| 9 | -75 | 100 | 1 | 40625 | 0.65 | 29.7 | 0.44 | 0.02 | 0.24 |
| | | | 2 | 10625 | 0.70 | 104.0 | 0.85 | 0.21 | |
| 10 | -150 | 100 | 1 | 72500 | 0.43 | 21.8 | 0.39 | 0.00 | 0.19 |
| | | | 2 | 12500 | 0.78 | 63.4 | 0.73 | 0.18 | |
| 11 | 150 | 150 | 1 | 25000 | 0.88 | 108.4 | 0.81 | 0.36 | 0.36 |
| | | | 2 | 85000 | 0.37 | 149.0 | 0.45 | 0.00 | |
| 12 | 75 | 150 | 1 | 23125 | 0.92 | 80.5 | 0.90 | 0.56 | 0.58 |
| | | | 2 | 53125 | 0.54 | 139.4 | 0.53 | 0.02 | |
| 13 | 0 | 150 | 1 | 32500 | 0.75 | 56.3 | 0.66 | 0.12 | 0.25 |
| | | | 2 | 32500 | 0.75 | 123.7 | 0.66 | 0.12 | |
| 14 | -75 | 150 | 1 | 53125 | 0.54 | 40.6 | 0.53 | 0.02 | 0.58 |
| | | | 2 | 23125 | 0.92 | 99.5 | 0.90 | 0.56 | |
| 15 | -150 | 150 | 1 | 85000 | 0.37 | 31.0 | 0.45 | 0.00 | 0.36 |
| | | | 2 | 25000 | 0.88 | 71.6 | 0.81 | 0.36 | |
| 16 | 150 | 200 | 1 | 42500 | 0.63 | 104.0 | 0.85 | 0.15 | 0.16 |
| | | | 2 | 102500 | 0.32 | 141.3 | 0.51 | 0.00 | |
| 17 | 75 | 200 | 1 | 40625 | 0.65 | 82.9 | 0.92 | 0.22 | 0.23 |
| | | | 2 | 70625 | 0.43 | 131.2 | 0.59 | 0.02 | |
| 18 | 0 | 200 | 1 | 50000 | 0.56 | 63.4 | 0.73 | 0.07 | 0.14 |
| | | | 2 | 50000 | 0.56 | 116.6 | 0.73 | 0.07 | |
| 19 | -75 | 200 | 1 | 70625 | 0.43 | 48.8 | 0.59 | 0.02 | 0.23 |
| | | | 2 | 40625 | 0.65 | 97.1 | 0.92 | 0.22 | |
| 20 | -150 | 200 | 1 | 102500 | 0.32 | 38.7 | 0.51 | 0.00 | 0.16 |
| | | | 2 | 42500 | 0.63 | 76.0 | 0.85 | 0.15 | |

FIG. 14

| IMAGING DIRECTION 135° | | | | | | | | |
|---|---|---|---|---|---|---|---|---|
| IMAGING CANDIDATE POSITION | | | CHARACTERISTIC PART CP | DISTANCE d | POSITION EVALUATION fna | DIRECTION $\theta n$ | DIRECTION EVALUATION fnb | INDIVIDUAL EVALUATION VALUE Fn = fna * fnb | EVALUATION VALUE $\Sigma$Fn |
| PP | X | Y | | | | | | | |
| 1 | 150 | 50 | 1 | 5000 | 0.41 | 135.0 | 1.00 | 0.07 | 0.10 |
| | | | 2 | 65000 | 0.46 | 168.7 | 0.66 | 0.03 | |
| 2 | 75 | 50 | 1 | 3125 | 0.28 | 63.4 | 0.36 | 0.00 | 0.14 |
| | | | 2 | 33125 | 0.74 | 164.1 | 0.70 | 0.14 | |
| 3 | 0 | 50 | 1 | 12500 | 0.78 | 26.6 | 0.16 | 0.00 | 0.25 |
| | | | 2 | 12500 | 0.78 | 153.4 | 0.81 | 0.25 | |
| 4 | -75 | 50 | 1 | 33125 | 0.74 | 15.9 | 0.11 | 0.00 | 0.01 |
| | | | 2 | 3125 | 0.28 | 116.6 | 0.81 | 0.01 | |
| 5 | -150 | 50 | 1 | 65000 | 0.46 | 11.3 | 0.10 | 0.00 | 0.00 |
| | | | 2 | 5000 | 0.41 | 45.0 | 0.25 | 0.00 | |
| 6 | 150 | 100 | 1 | 12500 | 0.78 | 116.6 | 0.81 | 0.25 | 0.28 |
| | | | 2 | 72500 | 0.43 | 158.2 | 0.76 | 0.03 | |
| 7 | 75 | 100 | 1 | 10625 | 0.70 | 76.0 | 0.45 | 0.03 | 0.19 |
| | | | 2 | 40625 | 0.65 | 150.3 | 0.84 | 0.16 | |
| 8 | 0 | 100 | 1 | 20000 | 0.99 | 45.0 | 0.25 | 0.02 | 0.99 |
| | | | 2 | 20000 | 0.99 | 135.0 | 1.00 | 0.97 | |
| 9 | -75 | 100 | 1 | 40625 | 0.65 | 29.7 | 0.17 | 0.00 | 0.11 |
| | | | 2 | 10625 | 0.70 | 104.0 | 0.69 | 0.11 | |
| 10 | -150 | 100 | 1 | 72500 | 0.43 | 21.8 | 0.14 | 0.00 | 0.02 |
| | | | 2 | 12500 | 0.78 | 63.4 | 0.36 | 0.02 | |
| 11 | 150 | 150 | 1 | 25000 | 0.88 | 108.4 | 0.73 | 0.26 | 0.29 |
| | | | 2 | 85000 | 0.37 | 149.0 | 0.85 | 0.03 | |
| 12 | 75 | 150 | 1 | 23125 | 0.92 | 80.5 | 0.49 | 0.09 | 0.22 |
| | | | 2 | 53125 | 0.54 | 139.4 | 0.95 | 0.14 | |
| 13 | 0 | 150 | 1 | 32500 | 0.75 | 56.3 | 0.32 | 0.01 | 0.30 |
| | | | 2 | 32500 | 0.75 | 123.7 | 0.88 | 0.29 | |
| 14 | -75 | 150 | 1 | 53125 | 0.54 | 40.6 | 0.23 | 0.00 | 0.21 |
| | | | 2 | 23125 | 0.92 | 99.5 | 0.64 | 0.21 | |
| 15 | -150 | 150 | 1 | 85000 | 0.37 | 31.0 | 0.18 | 0.00 | 0.05 |
| | | | 2 | 25000 | 0.88 | 71.6 | 0.42 | 0.05 | |
| 16 | 150 | 200 | 1 | 42500 | 0.63 | 104.0 | 0.69 | 0.08 | 0.11 |
| | | | 2 | 102500 | 0.32 | 141.3 | 0.93 | 0.03 | |
| 17 | 75 | 200 | 1 | 40625 | 0.65 | 82.9 | 0.50 | 0.04 | 0.11 |
| | | | 2 | 70625 | 0.43 | 131.2 | 0.96 | 0.07 | |
| 18 | 0 | 200 | 1 | 50000 | 0.56 | 63.4 | 0.36 | 0.01 | 0.10 |
| | | | 2 | 50000 | 0.56 | 116.6 | 0.81 | 0.09 | |
| 19 | -75 | 200 | 1 | 70625 | 0.43 | 48.8 | 0.27 | 0.00 | 0.07 |
| | | | 2 | 40625 | 0.65 | 97.1 | 0.62 | 0.07 | |
| 20 | -150 | 200 | 1 | 102500 | 0.32 | 38.7 | 0.22 | 0.00 | 0.02 |
| | | | 2 | 42500 | 0.63 | 76.0 | 0.45 | 0.02 | |

FIG. 15

| IMAGING DIRECTION | | | 45° | | 90° | | 135° | |
|---|---|---|---|---|---|---|---|---|
| IMAGING CANDIDATE POSITION | | | INDIVIDUAL EVALUATION VALUE Fn = fna * fnb | EVALUATION VALUE ΣFn | INDIVIDUAL EVALUATION VALUE Fn = fna * fnb | EVALUATION VALUE ΣFn | INDIVIDUAL EVALUATION VALUE Fn = fna * fnb | EVALUATION VALUE ΣFn |
| PP | X | Y | | | | | | |
| 1 | 150 | 50 | 0.00 / 0.00 | 0.00 | 0.01 / 0.00 | 0.02 | 0.07 / 0.03 | 0.10 |
| 2 | 75 | 50 | 0.01 / 0.00 | 0.01 | 0.01 / 0.02 | 0.03 | 0.00 / 0.14 | 0.14 |
| 3 | 0 | 50 | 0.25 / 0.00 | 0.25 | 0.03 / 0.03 | 0.07 | 0.00 / 0.25 | 0.25 |
| 4 | -75 | 50 | 0.14 / 0.00 | 0.14 | 0.02 / 0.01 | 0.03 | 0.00 / 0.01 | 0.01 |
| 5 | -150 | 50 | 0.03 / 0.07 | 0.10 | 0.00 / 0.01 | 0.02 | 0.00 / 0.00 | 0.00 |
| 6 | 150 | 100 | 0.02 / 0.00 | 0.02 | 0.18 / 0.00 | 0.19 | 0.25 / 0.03 | 0.28 |
| 7 | 75 | 100 | 0.11 / 0.00 | 0.11 | 0.21 / 0.02 | 0.24 | 0.03 / 0.16 | 0.19 |
| 8 | 0 | 100 | 0.97 / 0.02 | 0.99 | 0.17 / 0.17 | 0.35 | 0.02 / 0.97 | 0.99 |
| 9 | -75 | 100 | 0.16 / 0.03 | 0.19 | 0.02 / 0.21 | 0.24 | 0.00 / 0.11 | 0.11 |
| 10 | -150 | 100 | 0.03 / 0.25 | 0.28 | 0.00 / 0.18 | 0.19 | 0.00 / 0.02 | 0.02 |
| 11 | 150 | 150 | 0.05 / 0.00 | 0.05 | 0.36 / 0.00 | 0.36 | 0.26 / 0.03 | 0.29 |
| 12 | 75 | 150 | 0.21 / 0.00 | 0.21 | 0.56 / 0.02 | 0.58 | 0.09 / 0.14 | 0.22 |
| 13 | 0 | 150 | 0.29 / 0.01 | 0.30 | 0.12 / 0.12 | 0.25 | 0.01 / 0.29 | 0.30 |
| 14 | -75 | 150 | 0.14 / 0.09 | 0.22 | 0.02 / 0.56 | 0.58 | 0.00 / 0.21 | 0.21 |
| 15 | -150 | 150 | 0.03 / 0.26 | 0.29 | 0.00 / 0.36 | 0.36 | 0.00 / 0.05 | 0.05 |
| 16 | 150 | 200 | 0.02 / 0.00 | 0.02 | 0.15 / 0.00 | 0.16 | 0.08 / 0.03 | 0.11 |
| 17 | 75 | 200 | 0.07 / 0.00 | 0.07 | 0.22 / 0.02 | 0.23 | 0.04 / 0.07 | 0.11 |
| 18 | 0 | 200 | 0.09 / 0.01 | 0.10 | 0.07 / 0.07 | 0.14 | 0.01 / 0.09 | 0.10 |
| 19 | -75 | 200 | 0.07 / 0.04 | 0.11 | 0.02 / 0.22 | 0.23 | 0.00 / 0.07 | 0.07 |
| 20 | -150 | 200 | 0.03 / 0.08 | 0.11 | 0.00 / 0.15 | 0.16 | 0.00 / 0.02 | 0.02 |

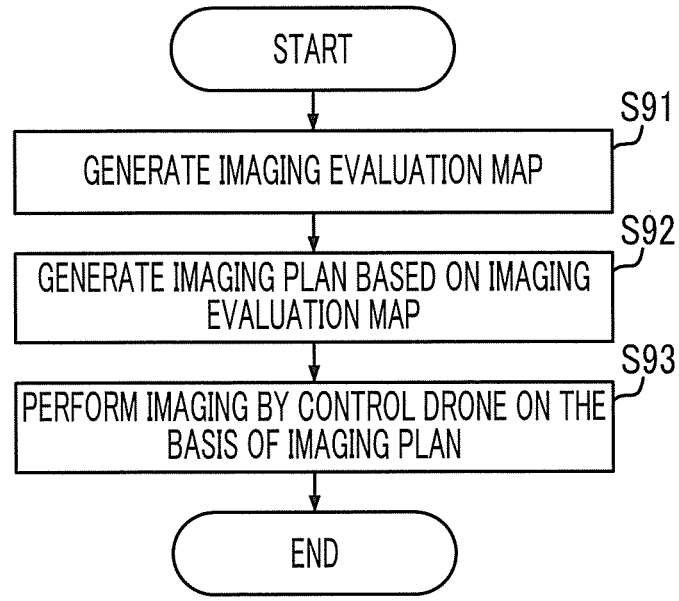

IMAGING APPARATUS, IMAGING METHOD, IMAGING PROGRAM, AND IMAGING SYSTEM

CROSS-REFERENCE TO RELATED APPLICATIONS

The present application is a Continuation of PCT International Application No. PCT/JP2019/002766 filed on Jan. 28, 2019 claiming priority under 35 U.S.C. § 119(a) to Japanese Patent Application No. 2018-039977 filed on Mar. 6, 2018. Each of the above applications is hereby expressly incorporated by reference, in its entirety, into the present application.

BACKGROUND OF THE INVENTION

1. Field of the Invention

The present invention relates to an imaging apparatus, an imaging method, an imaging program, and an imaging system.

2. Description of the Related Art

There is known a technique of inspecting or examining a structure such as a bridge, a tunnel, or a dam by imaging a surface of the structure with an imaging apparatus and analyzing the obtained image.

JP2017-031740A has proposed a technique of disposing a two-dimensional barcode on which information such as imaging conditions is recorded on a structure, reading the two-dimensional barcode, and performing imaging for inspection.

SUMMARY OF THE INVENTION

However, in a case where a structure is imaged for the purpose of inspection or the like, it is necessary to have a high degree of skill in determining what kind of device is to be used, and at what position and under what condition imaging is to be performed. In particular, in a case where imaging is performed using an autonomous mobile robot such as a drone (unmanned aerial vehicle, UAV), it is necessary to select a movement route, and a high degree of determination is required to make an imaging plan thereof.

The present invention has been made in view of such circumstances, and an object of the present invention is to provide an imaging apparatus, an imaging method, an imaging program, and an imaging system capable of easily making an imaging plan.

Units for solving the above problems is as follows.

(1) According to an aspect of the present invention, there is provided an imaging apparatus including: an imaging evaluation map acquiring section that acquires an imaging evaluation map in which an evaluation value that represents an evaluation of imaging in a case where an object is imaged at a specific position under a specific imaging condition is determined at a plurality of imaging candidate positions for each of a plurality of imaging conditions; and an imaging point selecting section that selects an imaging point suitable for imaging the object and an imaging condition at the imaging point on the basis of the acquired imaging evaluation map.

According to this aspect of the present invention, the imaging point suitable for imaging the object and the imaging condition at the imaging point are automatically selected. The imaging point and the imaging condition are selected on the basis of the imaging evaluation map. In an imaging evaluation map, an evaluation value that represents an imaging evaluation in a case where an object is imaged at a specific position under a specific imaging condition is determined, for each of a plurality of imaging conditions with respect to a plurality of imaging candidate positions. Accordingly, by taking this imaging evaluation map into consideration, it is possible to determine at which position and under which imaging condition a good image can be captured. The imaging point selecting section selects the imaging point suitable for imaging the object and the imaging condition at the imaging point on the basis of the imaging evaluation map. Thus, it is possible to easily make an imaging plan.

(2) The imaging apparatus according to (1) may further include: an imaging device information acquiring section that acquires information on an imaging device to be used, in which the imaging point selecting section may select the imaging point suitable for imaging the object and the imaging condition at the imaging point on the basis of the acquired imaging evaluation map and information on the imaging device.

According to this aspect of the present invention, the imaging point suitable for imaging the object and the imaging condition at the imaging point are selected on the basis of the information on the imaging device to be used. Thus, it is possible to easily make an imaging plan.

(3) In the imaging apparatus according to (2), the imaging device information acquiring section may acquire information on a plurality of imaging devices that are usable.

According to this aspect of the present invention, the imaging point suitable for imaging the object and the imaging condition at the imaging point are selected on the basis of the information on the plurality of usable imaging devices. Thus, it is possible to easily make an imaging plan.

(4) In the imaging apparatus according to (2) or (3), the information on the imaging device acquired by the imaging device information acquiring section may include at least one piece of information on an available imaging time, the number of images capable of being captured, or an available time.

According to this aspect of the present invention, the acquired information on the imaging device includes at least one piece of information on the available imaging time, the number of images capable of being captured, or the available time. Thus, it is possible to generate an imaging plan that matches the available imaging time of the imaging device to be used, the number of images capable of being captured, the available time, and the like. Here, the available imaging time refers to a time during which a motion picture can be taken. The time during which the motion picture can be imaged is determined by the capacity of a medium installed in the imaging device, a recorded image quality, or the like. Further, the number of images capable of being captured refers to the number of still images that can be captured. The number of still images that can be captured depends on the capacity of the medium installed in the imaging device, the recorded image quality, or the like. The available time refers to a time during which the imaging device can be used. The time during which the imaging device can be used is determined by the capacity of a battery installed in the imaging device, or the like.

(5) The imaging apparatus according to any one of (2) to (4) may further include: a mobile device information acquiring section that acquires information on a mobile device to be used, in which the imaging point selecting section may select the imaging point suitable for imaging the object and the imaging condition at the imaging point on the basis of the acquired imaging evaluation map, information on the imaging device, and information on the mobile device.

According to this aspect of the present invention, the imaging point suitable for imaging the object and the imaging condition at the imaging point are selected on the basis of the information on the mobile device to be used. Thus, it is possible to easily make an imaging plan.

(6) In the imaging apparatus according to (5), the mobile device information acquiring section may acquire information on a plurality of mobile devices that are usable.

According to this aspect of the present invention, the imaging point suitable for imaging the object and the imaging condition at the imaging point are selected on the basis of the information on the plurality of the mobile devices that are usable. Thus, it is possible to easily make an imaging plan.

(7) In the imaging apparatus according to (5) or (6), the information on the mobile device acquired by the mobile device information acquiring section may include information on an available time.

According to this aspect of the present invention, the information on the mobile device includes the information on the available time. Thus, it is possible to generate an imaging plan that matches the available time of the mobile device. Here, the available time refers to a time during which the mobile device can be used. The time during which the mobile device can be used is determined by the capacity of a battery installed in the mobile device.

(8) The imaging apparatus according to any one of (1) to (7) may further include: a movement route selecting section that selects a movement route suitable for imaging at each of the selected imaging points.

According to this aspect of the present invention, the movement route suitable for imaging at each selected imaging point is automatically selected. Thus, it is possible to easily make an imaging plan.

(9) In the imaging apparatus according to any one of (1) to (8), the evaluation value for each imaging condition at each imaging candidate position may be calculated by setting a plurality of characteristic parts on the object, setting an evaluation standard of imaging based on the imaging candidate positions and the imaging conditions for each characteristic part, calculating individual evaluation values for the respective characteristic parts according to the evaluation standard, and calculating a sum of the obtained individual evaluation values for the respective characteristic parts.

According to this aspect of the present invention, the evaluation value for each imaging condition at each imaging candidate position in the imaging evaluation map is calculated as the sum of the individual evaluation values for the plurality of respective characteristic parts set on the object. The individual evaluation value is calculated for each characteristic part according to the evaluation standard set for each characteristic part. The evaluation standard is set on the basis of the imaging candidate position and the imaging condition.

(10) According to another aspect of the present invention, there is provided an imaging system including: an autonomous mobile robot provided with an imaging unit; and an imaging control device that acquires information on an imaging point, an imaging condition, and a movement route selected by the imaging apparatus according to (9) as imaging control information, and controls the autonomous mobile robot on the basis of the acquired imaging control information.

According to this aspect of the present invention, the imaging is automatically performed at the imaging point, the imaging condition, and the movement route selected by the imaging apparatus according to (9). The imaging is performed using an autonomous mobile robot provided with an imaging unit. The autonomous mobile robot is controlled by the imaging control device. The imaging control device acquires the imaging point, the imaging condition, and the movement route selected by the imaging apparatus according to (9) as control information, and controls the autonomous mobile robot. The movement form of the autonomous mobile robot is not particularly limited. The autonomous mobile robot may employ various forms of movement such as flight, running, sailing, and walking.

(11) According to still another aspect of the present invention, there is provided an imaging apparatus including: an imaging evaluation map acquiring section that acquires an imaging evaluation map in which an evaluation value that represents an evaluation of imaging in a case where an object is imaged at a specific position under a specific imaging condition is determined at a plurality of imaging candidate positions for each of a plurality of imaging conditions; an imaging device information acquiring section that acquires information on a plurality of usable imaging devices; and an imaging device selecting section that selects the imaging device suitable for imaging the object on the basis of the acquired imaging evaluation map and information on the imaging device.

According to this aspect of the present invention, the imaging device suitable for imaging the object is automatically selected from the plurality of usable imaging devices. Thus, it is possible to easily make an imaging plan.

(12) In the imaging apparatus according to (11), the evaluation value for each imaging condition at each imaging candidate position may be calculated by setting a plurality of characteristic parts on the object, setting an evaluation standard of imaging based on the imaging candidate positions and the imaging conditions for each characteristic part, calculating individual evaluation values for the respective characteristic parts according to the evaluation standard, and calculating a sum of the obtained individual evaluation values for the respective characteristic parts.

According to this aspect of the present invention, the evaluation value for each imaging condition at each imaging candidate position in the imaging evaluation map is calculated as the sum of the individual evaluation values for the plurality of respective characteristic parts set on the object. The individual evaluation value is calculated for each characteristic part according to the evaluation standard set for each characteristic part. The evaluation standard is set on the basis of the imaging candidate position and the imaging condition.

(13) According to still another aspect of the present invention, there is provided an imaging apparatus including: an imaging evaluation map acquiring section that acquires an imaging evaluation map in which an evaluation value that represents an evaluation of imaging in a case where an object is imaged at a specific position under a specific imaging condition is determined at a plurality of imaging candidate positions for each of a plurality of imaging conditions; a mobile device information acquiring section that acquires information on a plurality of usable mobile devices; and a mobile device selecting section that selects the mobile device suitable for imaging the object on the basis of the acquired imaging evaluation map and information on the mobile device.

According to this aspect of the present invention, the mobile device suitable for imaging the object is automatically selected from the information on the plurality of usable mobile devices. Thus, it is possible to easily make an imaging plan.

(14) In the imaging apparatus according to (13), the evaluation value for each imaging condition at each imaging candidate position may be calculated by setting a plurality of characteristic parts on the object, setting an evaluation standard of imaging based on the imaging candidate positions and the imaging conditions for each characteristic part, calculating individual evaluation values for the respective characteristic parts according to the evaluation standard, and calculating a sum of the obtained individual evaluation values for the respective characteristic parts.

According to this aspect of the present invention, the evaluation value for each imaging condition at each imaging candidate position in the imaging evaluation map is calculated as the sum of the individual evaluation values for the plurality of respective characteristic parts set on the object. The individual evaluation value is calculated for each characteristic part according to the evaluation standard set for each characteristic part. The evaluation standard is set on the basis of the imaging candidate position and the imaging condition.

(15) According to still another aspect of the present invention, there is provided an imaging apparatus including: an imaging evaluation map acquiring section that acquires an imaging evaluation map in which an evaluation value that represents an evaluation of imaging in a case where an object is imaged at a specific position under a specific imaging condition is determined at a plurality of imaging candidate positions for each of a plurality of imaging conditions; an imaging device information acquiring section that acquires information on a usable imaging device; a mobile device information acquiring section that acquires information on a usable mobile device; and an imaging plan generating section that generates an imaging plan suitable for imaging the object, on the basis of the acquired imaging evaluation map, information on the imaging device, and information on the mobile device.

According to this aspect of the present invention, the imaging plan suitable for imaging the object is automatically generated by specifying the usable imaging device and the usable mobile device. The imaging plan is generated on the basis of the information on the usable imaging device, the information on the usable mobile device, and the imaging evaluation map. In an imaging evaluation map, an evaluation value that represents an imaging evaluation in a case where an object is imaged at a specific position under a specific imaging condition is determined, for each of a plurality of imaging conditions with respect to a plurality of imaging candidate positions. Accordingly, by taking this imaging evaluation map into consideration, it is possible to determine at which position and under which imaging condition a good image can be captured. The imaging plan generating section generates the imaging plan suitable for imaging from the usable imaging device and mobile device on the basis of the imaging evaluation map.

(16) In the imaging apparatus according to (15), the imaging plan may include a movement route, an imaging point, and an imaging condition at the imaging point.

According to this aspect of the present invention, the movement route, the imaging point, and the imaging condition at the imaging point are determined as the imaging plan.

(17) In the imaging apparatus according to (15) or (16), the evaluation value for each imaging condition at each imaging candidate position may be calculated by setting a plurality of characteristic parts on the object, setting an evaluation standard of imaging based on the imaging candidate positions and the imaging conditions for each characteristic part, calculating individual evaluation values for the respective characteristic parts according to the evaluation standard, and calculating a sum of the obtained individual evaluation values for the respective characteristic parts.

According to this aspect of the present invention, the evaluation value for each imaging condition at each imaging candidate position in the imaging evaluation map is calculated as the sum of the individual evaluation values for the plurality of respective characteristic parts set on the object. The individual evaluation value is calculated for each characteristic part according to the evaluation standard set for each characteristic part. The evaluation standard is set on the basis of the imaging candidate position and the imaging condition.

(18) According to still another aspect of the present invention, there is provided an imaging system including: an autonomous mobile robot provided with an imaging unit; and an imaging control device that acquires information on the imaging plan generated by the imaging apparatus according to any one of (15) to (17), and controls the autonomous mobile robot on the basis of the acquired imaging plan.

According to this aspect of the present invention, the imaging is automatically performed on the basis of the imaging plan generated by the imaging apparatus according to (1) to (11). The imaging is performed using an autonomous mobile robot provided with an imaging unit. The autonomous mobile robot is controlled by the imaging control device. The imaging control device controls the autonomous mobile robot so that the imaging according to the imaging plan is executed. The movement form of the autonomous mobile robot is not particularly limited. The autonomous mobile robot may employ various modes of movement such as flight, running, sailing, and walking.

(19) According to still another aspect of the present invention, there is provided an imaging method including: a step of acquiring an imaging evaluation map in which an evaluation value that represents an evaluation of imaging in a case where an object is imaged at a specific position under a specific imaging condition is determined at a plurality of imaging candidate positions for each of a plurality of imaging conditions; and a step of selecting an imaging point suitable for imaging the object and an imaging condition at the imaging point on the basis of the acquired imaging evaluation map.

According to this aspect of the present invention, the imaging point suitable for imaging the object and the imaging condition at the imaging point are automatically selected.

(20) According to still another aspect of the present invention, there is provided an imaging method including: a step of acquiring an imaging evaluation map in which an evaluation value that represents an evaluation of imaging in a case where an object is imaged at a specific position under a specific imaging condition is determined at a plurality of imaging candidate positions for each of a plurality of imaging conditions; a step of acquiring information on a plurality of usable imaging devices; and a step of selecting the imaging device suitable for imaging the object, on the basis of the acquired imaging evaluation map and information on the imaging device.

According to this aspect of the present invention, the imaging device suitable for imaging the object is automatically selected from the plurality of usable imaging devices.

(21) According to still another aspect of the present invention, there is provided an imaging method including: a step of acquiring an imaging evaluation map in which an evaluation value that represents an evaluation of imaging in a case where an object is imaged at a specific position under a specific imaging condition is determined at a plurality of imaging candidate positions for each of a plurality of imaging conditions; a step of acquiring information on a plurality of usable mobile devices; and a step of selecting the mobile device suitable for imaging the object, on the basis of the acquired imaging evaluation map and information on the mobile device.

According to this aspect of the present invention, the mobile device suitable for imaging the object is automatically selected from the plurality of usable mobile devices.

(22) According to still another aspect of the present invention, there is provided an imaging method including: a step of acquiring an imaging evaluation map in which an evaluation value that represents an evaluation of imaging in a case where an object is imaged at a specific position under a specific imaging condition is determined at a plurality of imaging candidate positions for each of a plurality of imaging conditions; a step of acquiring information on a usable imaging device; a step of acquiring information on a usable mobile device; and a step of generating an imaging plan suitable for imaging the object, on the basis of the acquired imaging evaluation map, information on the imaging device, and information on the mobile device.

According to this aspect of the present invention, the imaging plan suitable for imaging the object is automatically generated by specifying the usable imaging device and the usable mobile device.

(23) According to still another aspect of the present invention, there is provided an imaging program causing a computer to implement: a function of acquiring an imaging evaluation map in which an evaluation value that represents an evaluation of imaging in a case where an object is imaged at a specific position under a specific imaging condition is determined at a plurality of imaging candidate positions for each of a plurality of imaging conditions; and a function of selecting an imaging point suitable for imaging the object and an imaging condition at the imaging point on the basis of the acquired imaging evaluation map.

According to this aspect of the present invention, the imaging point suitable for imaging the object and the imaging condition at the imaging point are automatically selected.

(24) According to still another aspect of the present invention, there is provided an imaging program causing a computer to implement: a function of acquiring an imaging evaluation map in which an evaluation value that represents an evaluation of imaging in a case where an object is imaged at a specific position under a specific imaging condition is determined at a plurality of imaging candidate positions for each of a plurality of imaging conditions; and a function of acquiring information on a plurality of imaging devices that can be used; and a function of selecting the imaging device suitable for imaging the object, on the basis of the acquired imaging evaluation map and information on the imaging device.

According to this aspect of the present invention, the imaging device suitable for imaging the object is automatically selected from the plurality of usable imaging devices.

(25) According to still another aspect of the present invention, there is provided an imaging program causing a computer to implement: a function of acquiring an imaging evaluation map in which an evaluation value that represents an evaluation of imaging in a case where an object is imaged at a specific position under a specific imaging condition is determined at a plurality of imaging candidate positions for each of a plurality of imaging conditions; and a function of acquiring information on a plurality of usable mobile devices; and a function of selecting the mobile device suitable for imaging the object, on the basis of the acquired imaging evaluation map and information on the mobile device.

According to this aspect of the present invention, the mobile device suitable for imaging the object is automatically selected from the plurality of usable mobile devices.

(26) According to still another aspect of the present invention, there is provided an imaging program causing a computer to implement: a function of acquiring an imaging evaluation map in which an evaluation value that represents an evaluation of imaging in a case where an object is imaged at a specific position under a specific imaging condition is determined at a plurality of imaging candidate positions for each of a plurality of imaging conditions; a function of acquiring information on a usable imaging device; a function of acquiring information on a usable mobile device; and a function of generating an imaging plan suitable for imaging the object, on the basis of the acquired imaging evaluation map, information on the imaging device, and information on the mobile device.

According to this aspect of the present invention, the imaging plan suitable for imaging the object is automatically generated by specifying the usable imaging device and the usable mobile device.

According to the present invention, it is possible to easily generate an appropriate imaging plan.

BRIEF DESCRIPTION OF THE DRAWINGS

FIG. 5 is a graph showing a relationship between individual evaluation values and evaluation values obtained in a case where imaging is performed at a certain imaging candidate position under a certain imaging condition.

FIG. 6 is a diagram showing an example of a data structure of an imaging evaluation map.

FIG. 12 is a table showing a list of evaluation values obtained at respective imaging candidate positions in a case where the imaging direction is 45°.

FIG. 13 is a table showing a list of evaluation values obtained at respective imaging candidate positions in a case where the imaging direction is 90°.

FIG. 14 is a table showing a list of evaluation values obtained at respective imaging candidate positions in a case where the imaging direction is 135°.

FIG. 15 is a diagram showing an example of a data structure of an imaging evaluation map.

FIG. 40 is a flowchart showing a procedure of a process for imaging by the imaging system.

DESCRIPTION OF THE PREFERRED EMBODIMENTS

Hereinafter, preferred embodiments of the present invention will be described in detail with reference to the accompanying drawings.

♦♦Imaging Evaluation Map Generating Device♦♦

[Imaging Evaluation Map Generating Device]

The imaging evaluation map generating device generates an imaging evaluation map in which an evaluation value that represents an evaluation of imaging in a case where an object is imaged under a specific imaging condition at a specific position is determined for each of a plurality of imaging conditions with respect to a plurality of imaging candidate positions.

<<Hardware Configuration of Imaging Evaluation Map Generating Device>>

The imaging evaluation map generating device is configured by a computer in which a predetermined imaging evaluation map generating program is installed.

Figure 1:
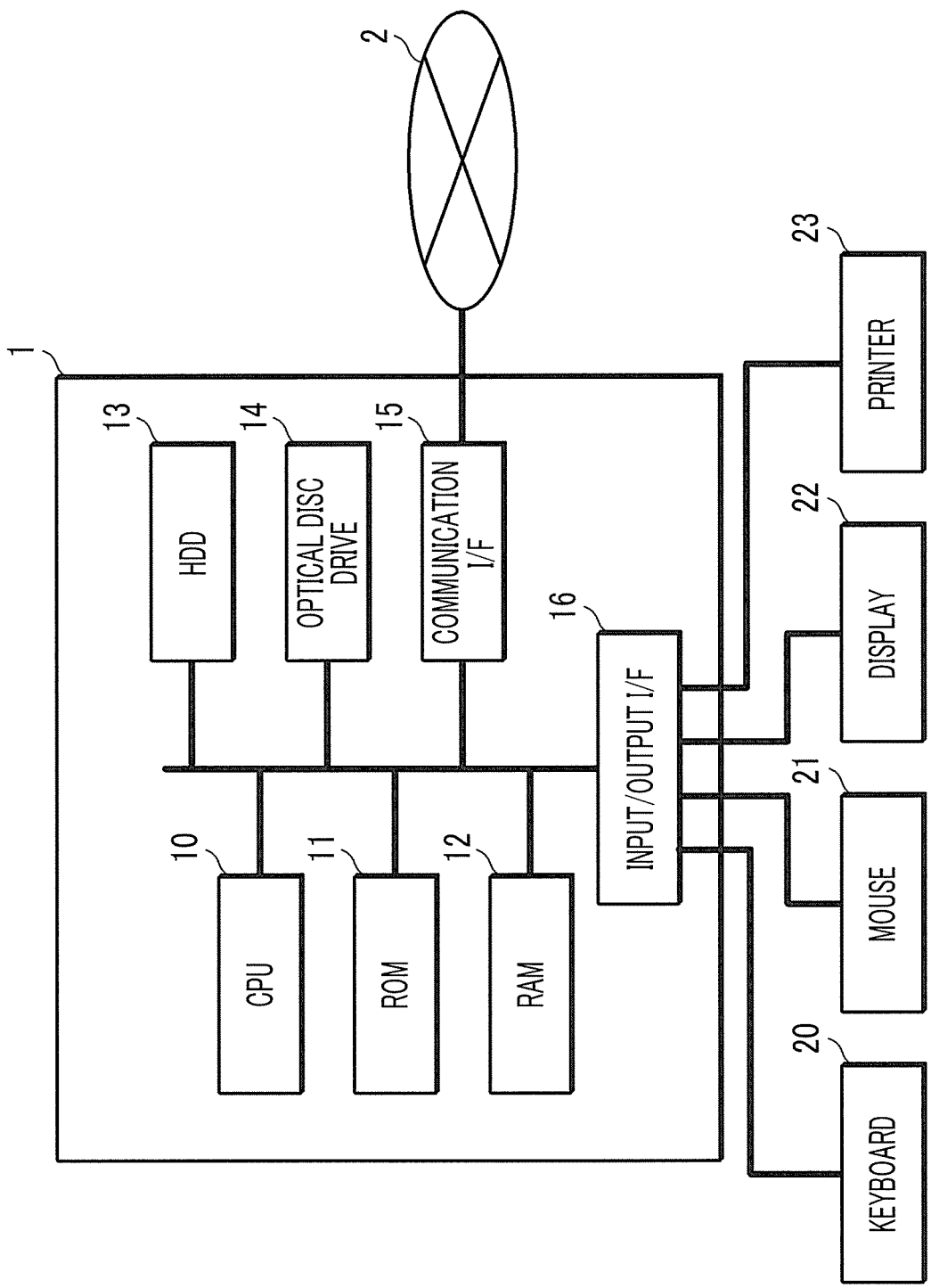
FIG. 1 is a block diagram showing a schematic configuration of an imaging evaluation map generating device realized by installing an imaging evaluation map generating program in a computer.

FIG. 1 is a block diagram showing a schematic configuration of an imaging evaluation map generating device realized by installing an imaging evaluation map generating program in a computer.

As shown in FIG. 1, an imaging evaluation map generating device 1 includes a central processing unit (CPU) 10, a read only memory (ROM) 11, a random access memory (RAM) 12, a hard disk drive (HDD) 13, an optical disc drive 14, an interface (I/F) 15, an input/output interface (I/F) 16, and the like.

The imaging evaluation map generating device 1 is connected to a network 2 through the communication interface 15, and is communicably connected to another device such as a server through the network 2.

Input devices such as a keyboard 20 and a mouse 21 are connected to the imaging evaluation map generating device 1 through the input/output interface 16. Further, output devices such as a display 22 and a printer 23 are connected to the imaging evaluation map generating device 1 through the input/output interface 16.

The imaging evaluation map generating program is recorded on a non-transitory computer-readable medium (recording medium) such as a digital versatile disc (DVD) and a compact disc read only memory (CD-ROM) for distribution, and is installed into the computer from the medium. Alternatively, the imaging evaluation map generating program is stored on a network in a state of being accessible from the outside, and is downloaded to the computer upon request to be installed in the computer.

<<Functions Realized by the Imaging Evaluation Map Generating Device>>

Figure 2:
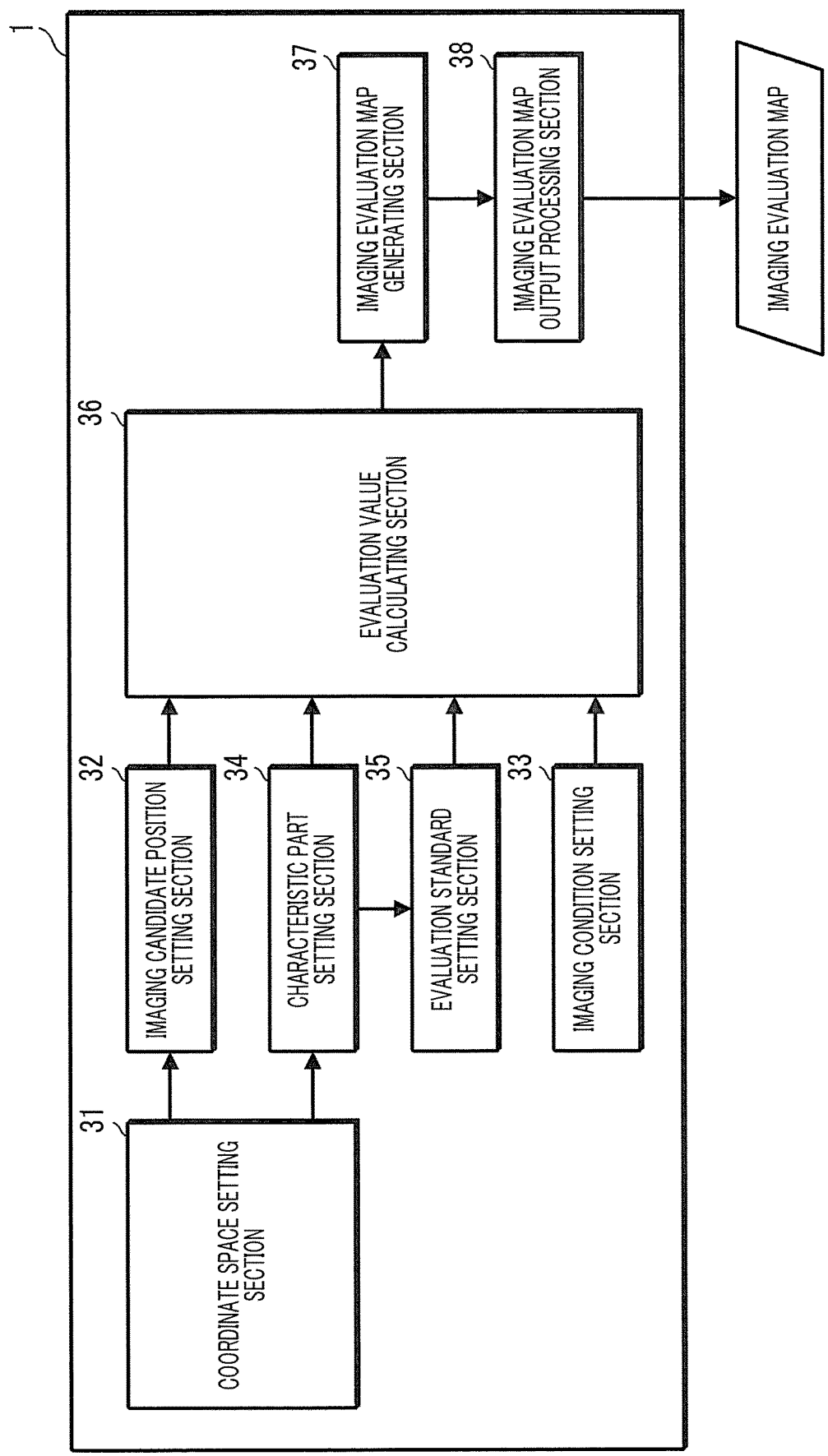
FIG. 2 is a block diagram showing functions realized by the imaging evaluation map generating device.

FIG. 2 is a block diagram showing functions realized by the imaging evaluation map generating device.

The imaging evaluation map generating device 1 functions as a coordinate space setting section 31 that sets a coordinate space, an imaging candidate position setting section 32 that sets an imaging candidate position, an imaging condition setting section 33 that sets an imaging condition, a characteristic part setting section 34 that sets a characteristic part, an evaluation standard setting section 35 that sets an imaging evaluation standard, an evaluation value calculating section 36 that calculates an evaluation value that represents an imaging evaluation, an imaging evaluation map generating section 37 that generates an imaging evaluation map, and an imaging evaluation map output processing section 38 that outputs the generated imaging evaluation map in a predetermined format.

<Coordinate Space Setting Section>

The coordinate space setting section 31 sets a coordinate space including an object. The coordinate space setting section 31 receives an input of information on the object, and sets the coordinate space. For example, in a case where a three-dimensional structure is set as an object, the coordinate space setting section 31 receives three-dimensional model data thereof as an input, and sets the coordinate space. Further, for example, in a case where a plane is set as the object, the coordinate space setting section 31 receives plane data (plane image data, map data, or the like) as an input, and sets the coordinate space.

Figure 3:
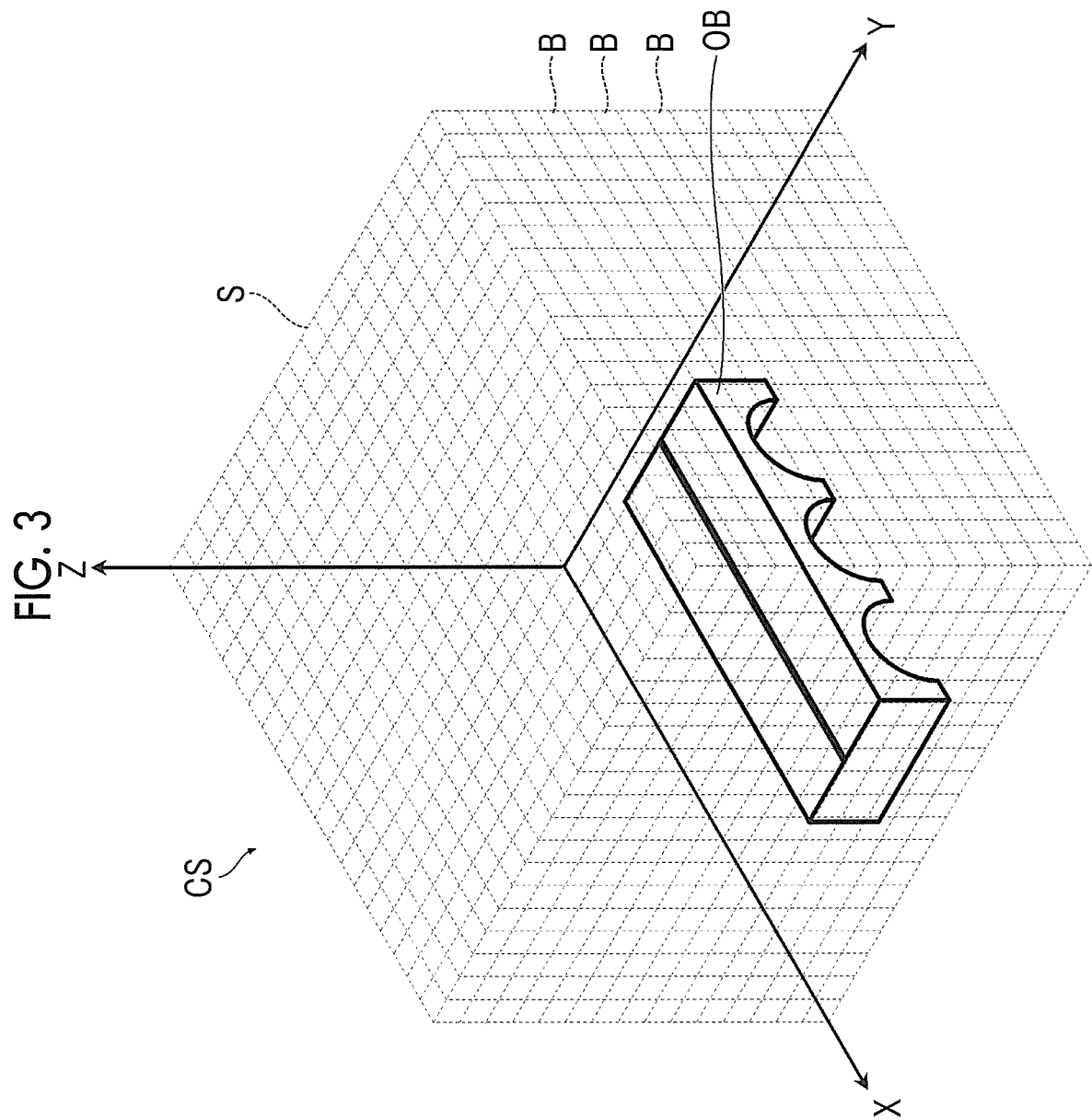
FIG. 3 is a diagram showing an example of setting of a coordinate space.

FIG. 3 is a diagram showing an example of setting of a coordinate space. A coordinate space CS is defined by three orthogonal axes (X axis, Y axis, and Z axis), and is set so as to include the entirety of an object OB that is an imaging target.

<Imaging Candidate Position Setting Section>

Figure 4:
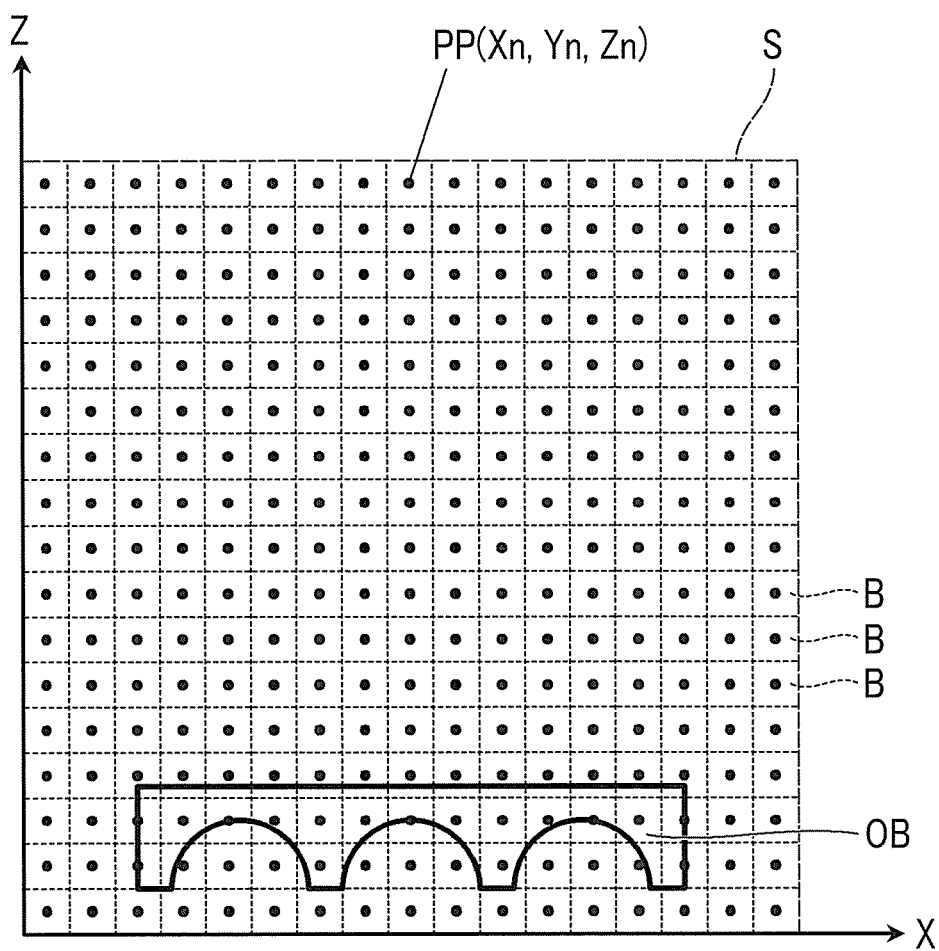
FIG. 4 is a diagram showing an example of setting of an imaging candidate position.

The imaging candidate position setting section 32 sets an imaging candidate position. A plurality of imaging candidate positions are set in the coordinate space set by the coordinate space setting section 31. For example, a finite space including the object OB is divided into a plurality of blocks B, and a center position of each block B is set as an imaging candidate position. FIG. 4 is a diagram showing an example of setting of imaging candidate positions. The figure shows an example of setting of imaging candidate positions on a specific XZ section. The figure shows an example in which a finite space S including the object OB is divided into the plurality of blocks B and an imaging candidate position PP (Xn, Yn, Zn) is set at the center position of each block B. The imaging candidate position setting section 32 automatically sets the imaging candidate positions on the basis of the set coordinate space.

<Imaging Condition Setting Section>

The imaging condition setting section 33 sets an imaging condition for an object. The imaging condition refers to a group of various parameters that influence an imaging result, such as an imaging direction (a direction of an optical axis of a lens), an imaging angle of view (focal length), the number of recording pixels, an imaging wavelength, and a positional relationship with a light source. The imaging condition setting section 33 automatically sets a plurality of imaging conditions. For example, the imaging condition setting section 33 automatically sets the plurality of imaging conditions by changing the imaging direction (the direction of the optical axis of the lens), the imaging angle of view (focal length), the number of recording pixels, and the like.

<Characteristic Part Setting Section>

The characteristic part setting section 34 sets a plurality of characteristic parts for an object. The "characteristic part" of the object refers to an "appearance" of a target that is directly or indirectly related to "information about the target". For example, in imaging for the purpose of inspecting a structure, a three-dimensional shape, a surface texture, and the like of an inspection target that is an object are used as typical characteristic parts. Specific elements of the three-dimensional shape that provides a useful "appearance" include vertices, ridges, or the like. In addition, specific elements of the surface texture that provides the useful "appearance" include surface stains (stains, discoloration, or the like) and deteriorated parts such as cracks, for example. In this way, points, lines, and regions that provide the useful "appearance" of the object serve as the characteristic parts. The positions and azimuths of the points, lines, and regions that are the characteristic parts are specified in the coordinate space. Further, in a case where a certain region is used as the characteristic part, its range (size) is specified. The azimuth refers to a direction in which the characteristic part is directed.

The characteristic part setting section 34 automatically sets the characteristic parts on the basis of data on the object. For example, the characteristic part setting section 34 automatically extracts vertices, ridges, or the like from data on a three-dimensional model of the object, and sets the extracted vertices, ridges, or the like as the characteristic parts. In addition, for example, the characteristic part setting section 34 automatically extracts characteristic points from plane image data, and sets the extracted characteristic points as the characteristic parts.

Further, the characteristic part setting section 34 receives designation of a characteristic part from a user, and sets the characteristic part. For example, the characteristic part setting section 34 causes a three-dimensional model (for example, a triangular mesh model, or the like) of an object to be displayed on the display 22, and receives designation (position and azimuth) of a part to be set as a characteristic part. Alternatively, the characteristic part setting section 34 causes an image group obtained by imaging an object from a plurality of viewpoints to be displayed on the display 22, and receives designation of a part to be set as a characteristic part on the images. The user designates a part to be set as a characteristic part through designation using a cursor or the like. For example, a characteristic part is designated by designating a region in which a deterioration phenomenon such as stains or cracks appears, or a region in which such a phenomenon is expected to appear.

Further, the characteristic part setting section 34 receives an instruction from the user, and cancels the setting of the characteristic part that is automatically set.

<Evaluation Standard Setting Section>

The evaluation standard setting section 35 sets an evaluation standard for evaluating imaging. This evaluation standard is an evaluation standard based on each characteristic part. That is, the quality of imaging is evaluated from a viewpoint of each characteristic part. Accordingly, the evaluation standard is set individually for each characteristic part.

The evaluation standard is defined by a function (evaluation function) having a position and an imaging condition as parameters. Accordingly, elements used as parameters in the evaluation function become an imaging condition set by the imaging condition setting section 33. Accordingly, for example, in a case where the imaging direction, the imaging angle of view, and the number of recording pixels are set as parameters of the evaluation function, the imaging condition setting section 33 sets at least the imaging direction, the imaging angle of view, and the number of recording pixels as an imaging condition.

The evaluation standard is set so that a relatively high evaluation is calculated for a position and an imaging condition in which a characteristic part for which the evaluation standard is set is satisfactorily imaged. For example, in the case of a characteristic part that can be better imaged from the front than from the diagonal, the evaluation standard is set so that a relatively high evaluation is calculated for a condition for imaging from the front than a condition for imaging from the diagonal.

The evaluation standard setting section 35 individually sets the evaluation function of each characteristic part on the basis of a predetermined setting rule. For example, the evaluation standard setting section 35 individually sets the evaluation function of each characteristic part so that a relatively high evaluation can be obtained for imaging performed from the front. The evaluation standard setting section 35 individually sets the evaluation function of each characteristic part so that a relatively high evaluation can be obtained for imaging performed for a layout in the center of a screen. The evaluation standard setting section 35 individually sets the evaluation function of each characteristic part so that a relatively high evaluation can be obtained for imaging performed for a predetermined size on the screen.

<Evaluation Value Calculating Section>

The evaluation value calculating section 36 calculates an evaluation value that represents an imaging evaluation in a case where an object is imaged from each imaging candidate position under each set imaging condition, for each imaging candidate position and each imaging condition. The evaluation value is calculated as the sum of evaluations obtained by evaluating imaging at the imaging candidate positions under the imaging conditions, to be evaluated, for all the characteristic parts. That is, the imaging is evaluated from the viewpoint of each characteristic part, and the sum of the obtained evaluations from the characteristic parts is used as the evaluation value of the imaging. For example, it is assumed that imaging is performed at a certain imaging candidate position under a certain imaging condition. The imaging is evaluated individually for all characteristic parts. In this case, various high and low evaluations are made from the respective characteristic parts. The sum of the evaluations of all the characteristic parts is an evaluation value of the imaging to be evaluated. The evaluation value calculating section 36 calculates the evaluation value in the following procedure.

First, the evaluation value calculating section 36 specifies an imaging candidate position and an imaging condition to be evaluated. Then, the evaluation value calculating section 36 calculates an evaluation obtained from each characteristic part in a case where imaging is performed under a specific condition. This evaluation is calculated as an individual evaluation value, and is calculated for all characteristic parts. The individual evaluation value is calculated according to an evaluation standard set for each characteristic part. As described above, the evaluation standard is defined as an evaluation function having the position and the imaging condition as parameters. Accordingly, the evaluation value calculating section 36 substitutes a specific imaging candidate position and a specific imaging condition into the evaluation function to calculate the individual evaluation value of each characteristic part. After the individual evaluation values are calculated for all the characteristic parts, the evaluation value calculating section 36 calculates the sum thereof. The calculated sum is used as the evaluation value at the imaging candidate position and the imaging condition to be evaluated.

FIG. 5 is a graph showing a relationship between individual evaluation values and evaluation values obtained in a case where imaging is performed at a certain imaging candidate position under a certain imaging condition.

As shown in the figure, in a case where there are n characteristic parts, evaluation functions F1 to Fn are determined for the n characteristic parts, respectively. Then, individual evaluation values α1 to αn of the respective characteristic parts are individually calculated using the individually determined evaluation functions F1 to Fn. The sum Σα=α1+α2+ . . . +αn−1+αn of the calculated individual evaluation values α1 to αn of all the characteristic parts is set as an evaluation value σ at the imaging candidate position under the imaging condition.

<Imaging Evaluation Map Generating Section>

The imaging evaluation map generating section 37 generates an imaging evaluation map on the basis of a calculation result of the evaluation value calculating section 36. That is, the imaging evaluation map generating section 37 generates an imaging evaluation map in which an evaluation value that represents an evaluation of imaging in a case where an object is imaged at a specific position under a specific imaging condition is determined, for each of a plurality of imaging conditions with respect to a plurality of imaging candidate positions.

As described above, the evaluation value calculating section 36 calculates an evaluation value that represents an evaluation of imaging for each imaging candidate position and each imaging condition. The imaging evaluation map generating section 37 generates an imaging evaluation map on the basis of a calculation result of the evaluation value calculating section 36.

The imaging evaluation map is generated in a predetermined format, in which at least information on evaluation values and information on imaging candidate positions and imaging conditions in which the evaluation values are calculated are associated with each other.

FIG. 6 is a diagram showing an example of a data structure of an imaging evaluation map.

As shown in the figure, data of an imaging evaluation map includes at least information on imaging candidate positions PP (X1, Y1, Z1) to PP (Xn, Yn, Zn), information on imaging conditions SC1 to SCn, and information on evaluation values σ1 (X1, Y1, Z1) to σn (Xn, Yn, Zn). The information on the evaluation values σ1 (X, Y1, Z1) to αn (Xn, Yn, Zn) is recorded in association with the information on the imaging candidate positions PP (X1, Y1, Z1) to PP (Xn, Yn, Zn) and the information on the imaging conditions SC1 to SCn in which the evaluation values σ1 (X, Y1, Z1) to σn (Xn, Yn, Zn) are calculated. Thus, in a case where an imaging candidate position and an imaging condition are specified, an evaluation value corresponding to the imaging candidate position and the imaging condition is uniquely obtained.

<Imaging Evaluation Map Output Processing Section>

The imaging evaluation map output processing section 38 outputs a generated imaging evaluation map to an output device in a predetermined output format. The imaging evaluation map is output in a tabular format or a graph format, for example.

Figure 7:
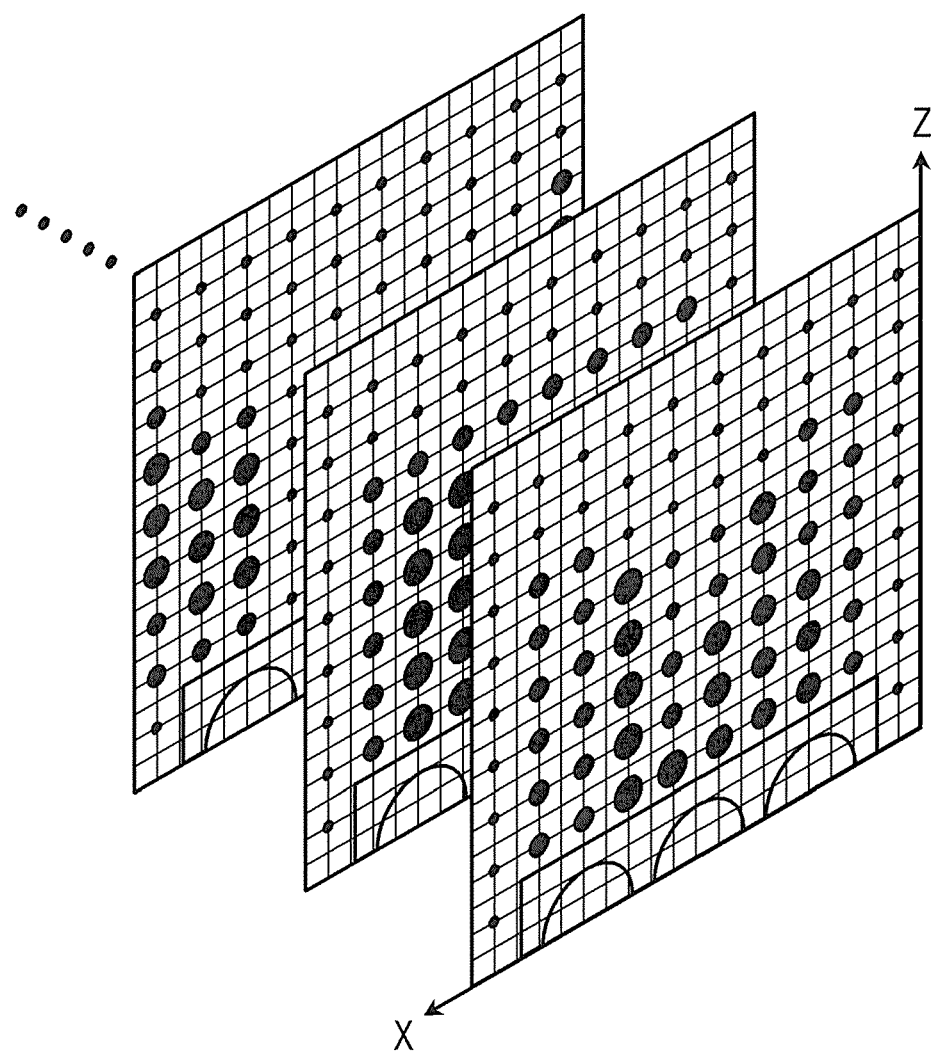
FIG. 7 is a diagram showing an example in which an imaging evaluation map is displayed in a graph format.

FIG. 7 is a diagram showing an example in which an imaging evaluation map is displayed in a graph format. This figure shows a graph of an evaluation value for each imaging condition on a certain XZ plane. A circle displayed in each graph indicates an evaluation value at a corresponding position (imaging candidate position), in which the larger the diameter, the higher the evaluation value. By displaying the evaluation values in a graph format in this way, it is possible to easily understand conditions (imaging candidate positions and imaging conditions) in which high evaluation values are obtained.

[Procedure of Generating Imaging Evaluation Map]

Next, a procedure for generating an imaging evaluation map (imaging evaluation map generating method) using the imaging evaluation map generating device 1 configured as described above will be described.

Figure 8:
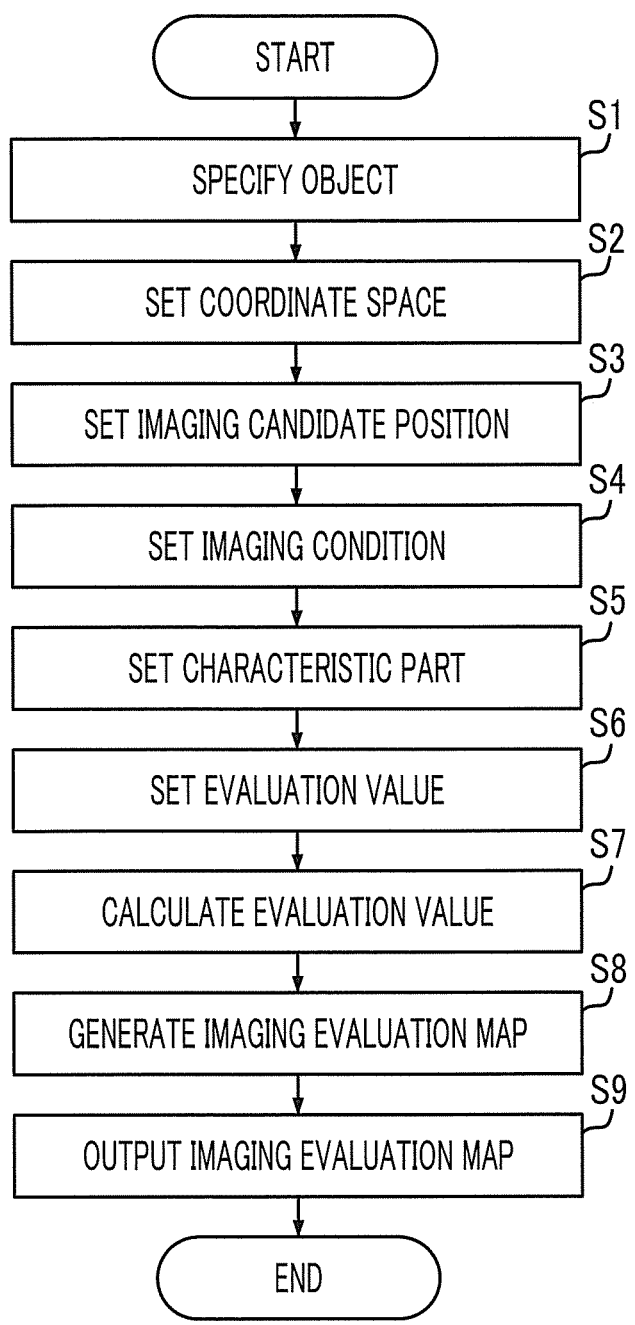
FIG. 8 is a flowchart showing a procedure of generating an imaging evaluation map.

FIG. 8 is a flowchart showing a procedure for generating an imaging evaluation map.

First, an object that is an imaging target is specified (step S1). The object is specified by inputting object data. For example, three-dimensional model data, plane data, and the like of the object are input and specified.

Then, a coordinate space including the object is set on the basis of the specified object (step S2).

Then, a plurality of imaging candidate positions are set in the set coordinate space (step S3).

Then, an imaging condition is set (step S4). The imaging condition is set on the basis of parameters of an evaluation function. For example, in a case where the evaluation function has an imaging angle of view and an imaging direction as parameters, conditions of the imaging angle of view and the imaging direction are set. Here, a plurality of imaging conditions having different content are set. For example, a plurality of imaging conditions having different imaging angles of view or imaging directions are set. Alternatively, a plurality of imaging conditions with different imaging angles of view and imaging directions are set.

Then, a characteristic part is set (step S5). The characteristic part is automatically set on the basis of the object data. That is, a part that is considered to be useful is automatically extracted and set as a characteristic part. Further, the characteristic part may be manually set as necessary.

Then, an evaluation standard is set for each set characteristic part (step S6). The evaluation standard is defined by an evaluation function having a position and an imaging condition as parameters. The evaluation function of the characteristic part is set so that a relatively high evaluation is calculated for a condition in which the characteristic part is satisfactorily imaged.

Then, an evaluation value is calculated on the basis of the set imaging candidate position, imaging condition, characteristic part, and evaluation function (step S7). The evaluation value is calculated for each imaging candidate position and each imaging condition.

Figure 9:
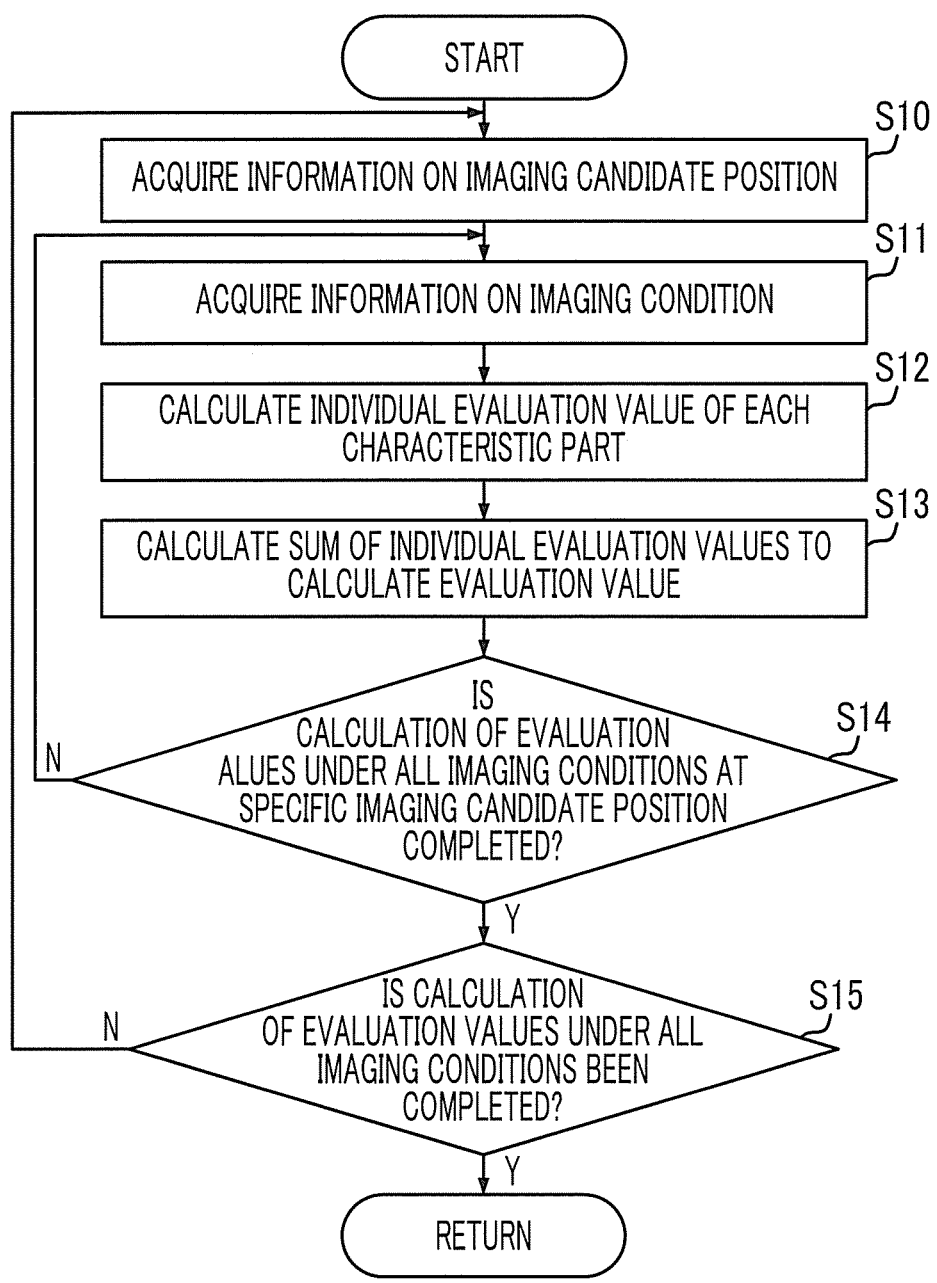
FIG. 9 is a flowchart showing a procedure of calculating evaluation values.

FIG. 9 is a flowchart showing a procedure for calculating an evaluation value.

The evaluation value is calculated for each imaging candidate position by performing switching between the imaging conditions. That is, after the evaluation values under all the imaging conditions are calculated for one imaging candidate position, an evaluation value for the next imaging candidate position is calculated.

First, information on a first imaging candidate position is acquired (step S10). Then, information on a first imaging condition is acquired (step S11). Then, an individual evaluation value of each characteristic part is calculated on the basis of the acquired imaging candidate position and imaging condition (step S12). The individual evaluation value of each characteristic part is calculated by substituting the information on the imaging candidate position and the imaging condition into the evaluation function. After the individual evaluation values of all the characteristic parts are calculated, the sum thereof is calculated, which is set as an evaluation value under the condition (step S13).

After the evaluation value is calculated, it is determined whether or not the evaluation values under all the imaging conditions have been calculated for the imaging candidate position (step S14). In a case where the evaluation values under all the imaging conditions have not been completely calculated, the procedure returns to step S11 to acquire information on the next imaging condition. Then, an evaluation value is calculated under the obtained imaging condition.

In a case where the calculation of the evaluation values under all the imaging conditions has been completed for the imaging candidate position, it is next determined whether or not the calculation of the evaluation values has been completed for all the imaging candidate positions (step S15). In a case where the calculation of the evaluation values has not been completed for all the imaging candidate positions, the procedure returns to step S10 to acquire information on the next imaging candidate position. Then, an imaging condition is switched at the acquired imaging candidate position, and each evaluation value is calculated. In a case where the calculation of the evaluation values has been completed for all the imaging candidate positions, the process ends.

After the evaluation values under all the imaging conditions at all the imaging candidate positions are calculated, an imaging evaluation map is generated on the basis of the calculation result (step S8). The imaging evaluation map is generated in a predetermined format, in which at least information on the evaluation values and information on the imaging candidate positions and the imaging conditions in which the evaluation values are calculated are associated with each other (see FIG. 6).

The generated imaging evaluation map is output to the output device in a predetermined output format (step S9). For example, the generated imaging evaluation map is output to the display 22 in a graph format (see FIG. 7).

[Example of Creating Imaging Evaluation Map]

Hereinafter, an example of creation of an imaging evaluation map will be described. For simplicity of description, an example of generation of an imaging evaluation map in a case where imaging is performed while moving in a two-dimensional space will be described below.

Figure 10:
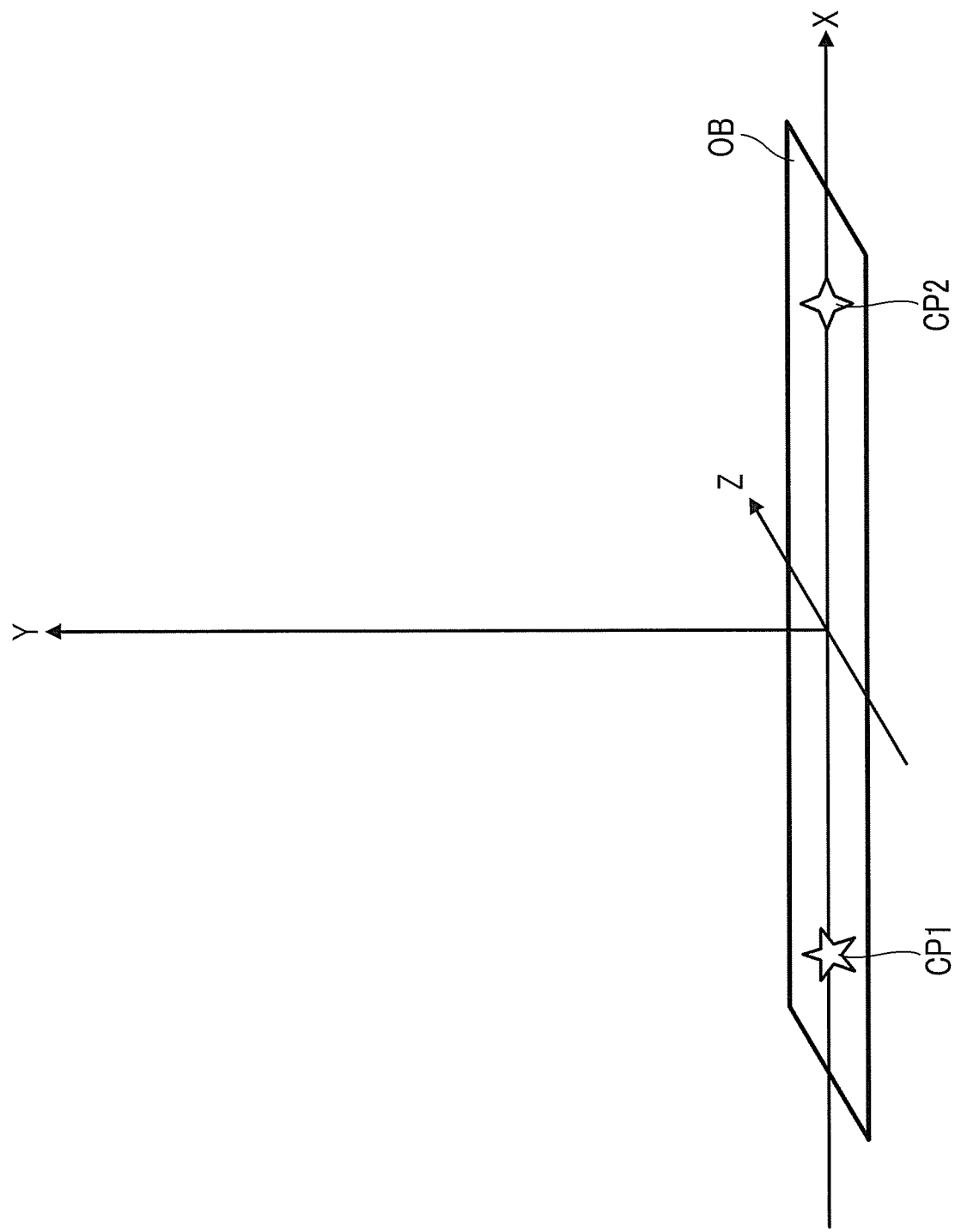
FIG. 10 is a diagram showing an example of an object.

FIG. 10 is a diagram showing an example of an object.

In this example, a specific region on a ground surface is set as an object OB.

(1) Setting of Coordinate Space

As shown in FIG. 10, a coordinate space including the object OB is set.

In this example, a plane including the object OB is set as a ZX plane, and a plane orthogonal to the ZX plane is set as an XY plane. The X axis, Y axis, and Z axis are set to pass through the center of the object OB, respectively.

(2) Setting of Imaging Candidate Positions

Imaging candidate positions are set in the set coordinate space. As described above, in this example, imaging is performed while moving in the two-dimensional space. Accordingly, the imaging candidate positions are set in the two-dimensional space. In this example, the imaging candidate positions are set on the XY plane. Each of the imaging candidate positions is represented by a coordinate position (x, y).

(3) Setting of Imaging Conditions

In this example, a plurality of imaging conditions having different imaging directions (a direction of an optical axis of a lens) are set. The imaging direction is represented by θ.

(4) Setting of Characteristic Parts

As described above, a characteristic part is set as a part that appears as an "appearance". As shown in FIG. 10, it is assumed that two parts appear as "appearances" in the object OB. In this case, the parts that appear as the "appearances" are set as the characteristic parts. One characteristic part is referred to as a first characteristic part CP1, and the other characteristic part is referred to as a second characteristic part CP2.

(5) Setting of Evaluation Standards

An evaluation function for each characteristic part is set as an evaluation standard for each characteristic part. In this example, since an imaging evaluation map in a case where imaging is performed at each imaging candidate position (x, y) under a plurality of imaging conditions with different imaging directions θ is created, the evaluation function is set as a function having the imaging candidate position (x, y) and the imaging direction θ as parameters.

In this example, an evaluation function is set on the basis of a standard in which, (standard a) with respect to an imaging position, the evaluation function is set so that a higher evaluation value is output as a distance is closer to an imaging distance suitable for imaging the characteristic part, and (standard b) with respect to an imaging direction, the evaluation function is set so that a higher evaluation value is output as a direction is closer to an imaging direction suitable for imaging the characteristic part.

Since the "imaging distance suitable for imaging the characteristic part" varies depending on a resolution capability of an imaging device to be used, an imaging target, and the like, and thus, is appropriately set in consideration of these factors.

In addition, since the "imaging direction suitable for imaging the characteristic part" also varies depending on an imaging target or the like, and thus, is appropriately set in consideration of the imaging target or the like. In general, it is preferable to perform imaging from the front, that is, to perform imaging in a state of directly facing the imaging target.

<<Evaluation Function Based on Each Standard>>

(A) Evaluation Function Based on Standard a (Evaluation Standard Related to Imaging Position)

(A1) Evaluation Function of First Characteristic Part CP1 Based on Standard a

The evaluation function of the first characteristic part CP1 based on the standard a is set as f1a (x, y, θ).

In a case where a coordinate position of the first characteristic part CP1 is set to (x1, y1), a distance (imaging distance) between each imaging candidate position (x, y) and the first characteristic part CP1 may be evaluated as the sum of squares of the difference, that is, $d1=(x-x1)^2+(y-y1)^2$. Assuming that the imaging distance suitable for imaging the first characteristic part CP1 is D1, this numerical value becomes smaller as the imaging distance becomes closer to D1.

Accordingly, the evaluation function f1a (x, y, θ) of the first characteristic part CP1 based on the standard a may be set as the following expression, for example.

$$f1a(x,y,\theta)=2.0\times(0.5-|D1^2-d1|/|D1^2+d1|)$$

Here, $|D1^2-d1|$ is an absolute value of $(D1^2-d1)$, and $|D1^2+d1|$ is an absolute value of $(D1^2+d1)$.

(A2) Evaluation Function of Second Characteristic Part CP2 Based on Standard a

The evaluation function of the second characteristic part CP2 based on the standard a is set as f2a (x, y, θ).

In a case where a coordinate position of the second characteristic part CP2 is (x2, y2), a distance (imaging distance) between each imaging candidate position (x, y) and the second characteristic part CP2 may be evaluated as the sum of squares of the difference, that is, $d2=(x-x2)^2+(y-y2)^2$. Assuming that the imaging distance suitable for imaging the second characteristic part CP2 is D2, the numerical value becomes smaller as the imaging distance becomes closer to D2.

Accordingly, the evaluation function f2a (x, y, θ) of the second characteristic part CP2 based on the standard a may be set as the following expression, for example.

$$f2a(x,y,\theta)=2.0\times(0.5-|D2^2-d2|/|D2^2+d2|)$$

Here, $|D2^2-d2|$ is an absolute value of $(D2^2-d2)$, and $|D2^2+d2|$ is an absolute value of $(D2^2+d2)$.

(B) Evaluation Function Based on Standard b (Evaluation Standard for Imaging Direction)

(B1) Evaluation Function of First Characteristic Part CP1 Based on Standard b

The evaluation function of the first characteristic part CP1 based on the standard b is set as f1b (x, y, θ).

In a case where a coordinate position of the first characteristic part CP1 is (x1, y1), an angle θ1 of a straight line that connects each imaging candidate position (x, y) and the first characteristic part CP1 is θ1=A TAN [(y-y1)/(x-x1)].

In a case where a higher evaluation value is given to imaging performed in a state of more directly facing the imaging target, the evaluation function f1b (x, y, θ) of the first characteristic part CP1 based on the standard b may be set as the following expression, for example.

$$f1b(x,y,\theta)=1.0-|\theta-\theta1|$$

(B2) Evaluation Function of Second Characteristic Part CP2 Based on Standard b

The evaluation function of the second characteristic part CP2 based on the standard b is set as f2b (x, y, θ).

In a case where a coordinate position of the second characteristic part CP2 is (x2, y2), an angle θ2 of a straight line that connects each imaging candidate position (x, y) and the second characteristic part CP2 is θ2=A TAN [(y-y2)/(x-x2)].

In a case where a higher evaluation value is given to imaging performed in a state of more directly facing the imaging target, the evaluation function f2b (x, y, θ) of the second characteristic part CP2 based on the standard b may be set as the following expression, for example.

$$f2b(x,y,\theta)=1.0-|\theta-\theta2|$$

<<Evaluation Function Set for Each Characteristic Part>>

The evaluation function of the first characteristic part CP1 is set as F 1 (x, y, θ), and the evaluation function of the second characteristic part CP2 is set as F2 (x, y, θ).

The evaluation function set for each characteristic part is generated by combining the individual evaluation functions f1a (x, y, θ), f1b (x, y, θ), f2a (x, y, θ), and f2b (x, y, θ) generated as described above.

For example, in a case where the evaluation based on the standard a and the evaluation based on the standard b are both high at the same time, if a higher evaluation is to be obtained, the product is set as follows.

Evaluation function F1 (x, y, θ) of the first characteristic part CP1

$$F1(x,y,\theta)=f1a(x,y,\theta)\times f1b(x,y,\theta)$$

Evaluation function F2 (x, y, θ) of the second characteristic part CP2

$$F2(x,y,\theta)=f2a(x,y,\theta)\times f2b(x,y,\theta)$$

Further, for example, in a case where the evaluation based on the standard a and the evaluation based on the standard b are to be treated independently, the sum is set as follows.

Evaluation function F1 (x, y, θ) of the first characteristic part CP1

$$F1(x,y,\theta)=f1a(x,y,\theta)+f1b(x,y,\theta)$$

Evaluation function F2 (x, y, θ) of the second characteristic part CP2

$$F2(x,y,\theta)=f2a(x,y,\theta)+f2b(x,y,\theta)$$

Alternatively, a weighted sum is set as follows (k1 and k2 are weights).

Evaluation function F1 (x, y, θ) of the first characteristic part CP1

$$F1(x,y,\theta)=k1 \times f1a(x,y,\theta)+k2 \times f1b(x,y,\theta)$$

Evaluation function F2 (x, y, θ) of the second characteristic part CP2

$$F2(x,y,\theta)=k1 \times f2a(x,y,\theta)+k2 \times f2b(x,y,\theta)$$

(6) Calculation of Evaluation Value

In a case where an evaluation function under a certain imaging condition (θ) at a certain imaging candidate position (x, y) is represented by F (x, y, θ), the evaluation function F (X, Y, θ) is as follows.

$$F(X,Y,\theta)=\Sigma Fn(X,Y,\theta)=F1(X,Y,\theta)+F2(X,Y,\theta)$$

Accordingly, in a case where information on an imaging candidate position and an imaging condition to be evaluated is input to the evaluation function F (X, Y, θ), it is possible to calculate an evaluation value thereof. An example of calculation of the evaluation value is shown below.

Figure 11:
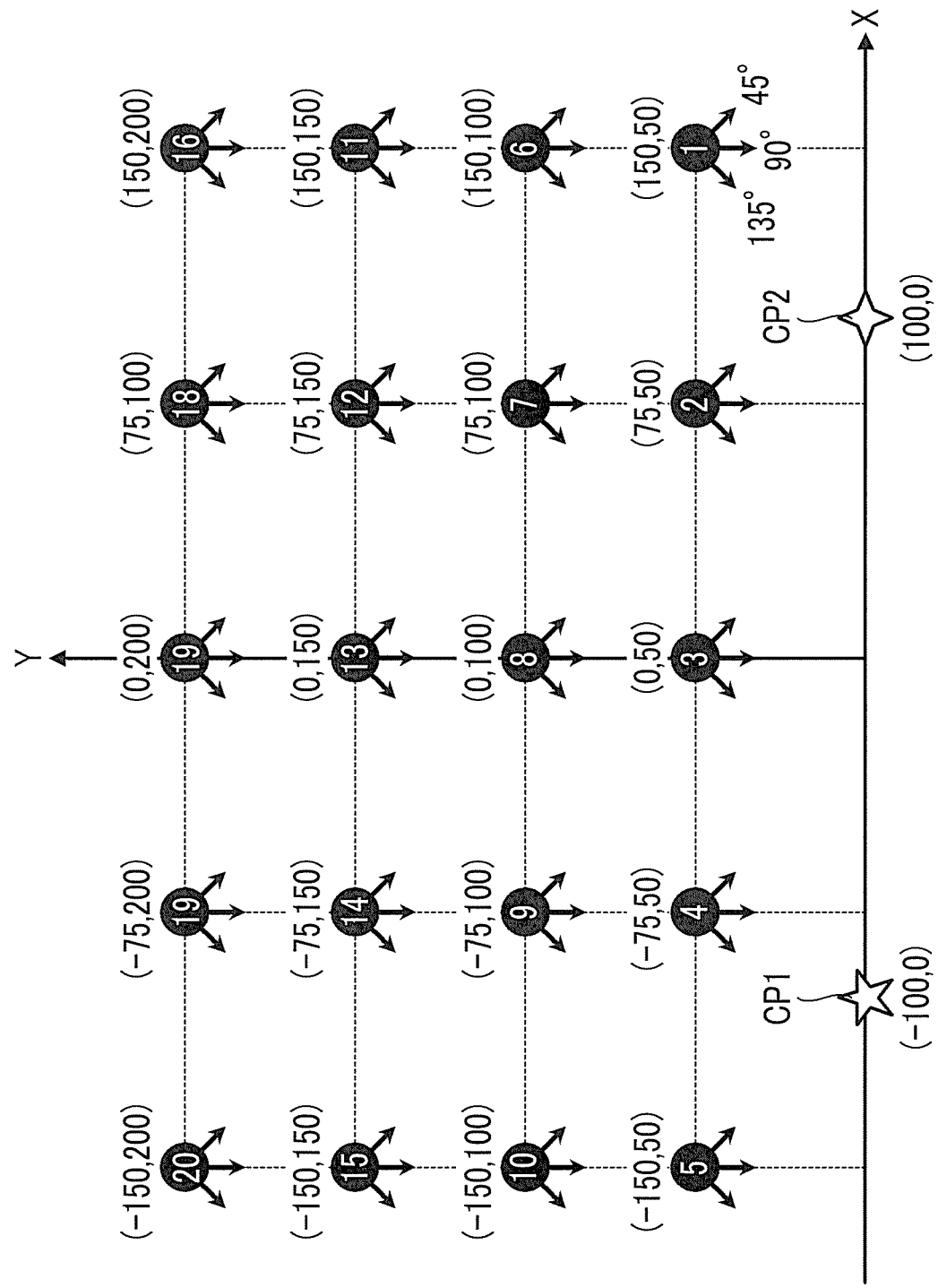
FIG. 11 is a diagram showing an example of setting of imaging candidate positions and imaging conditions (imaging directions).

FIG. 11 is a diagram showing an example of setting of imaging candidate positions and imaging conditions (imaging directions).

As an example, as shown in FIG. 11, an evaluation value under each imaging condition (imaging direction) at each imaging candidate position is calculated in an example in which there are 20 imaging candidate positions and three imaging conditions (imaging directions).

The imaging candidate positions (x, y) are set at total 20 locations, that is, four locations at equal intervals in the vertical direction (y direction) and five locations at equal intervals in the horizontal direction (x direction). In FIG. 11, it is assumed that the lower-right imaging candidate position is the first imaging candidate position and the upper-left imaging candidate position is the twentieth imaging candidate position.

The imaging direction (θ), which is an imaging condition, is set to 45°, 90°, and 135°. It is assumed that 90° is an imaging direction in the vertical downward direction.

The evaluation function F1 (x, y, θ) of the first characteristic part CP1 is set as F1 (x, y, θ)=f1a (x, y, θ)×f1b (x, y, θ), and the evaluation function F2 (x, y, θ) of the second characteristic part CP2 is set as F2 (x, y, θ)=f2a (x, y, θ)×f2b (x, y, θ). That is, an evaluation function Fn of each characteristic part is set so that in a case where an evaluation obtained by an evaluation function fna and an evaluation obtained by an evaluation function fnb are both high at the same time, a higher evaluation is obtained (n=1, 2).

In this example, an imaging distance D1 suitable for imaging the first characteristic part CP1 is set as 140, and an imaging distance D2 suitable for imaging the second characteristic part CP2 is set as 140.

FIG. 12 is a table showing a list of evaluation values obtained at respective imaging candidate positions in a case where the imaging direction is 45°. FIG. 13 is a table showing a list of evaluation values obtained at respective imaging candidate positions in a case where the imaging direction is 90°. FIG. 14 is a table showing a list of evaluation values obtained at respective imaging candidate positions in a case where the imaging direction is 135°.

In the tables shown in FIGS. 12 to 14, a column of "imaging candidate position" shows imaging candidate position numbers (see FIG. 11) and their coordinates (x, y).

A column of "characteristic part" indicates characteristic part numbers. "1" represents the first characteristic part, and "2" represents the second characteristic part.

A column of "distance" shows a distance of each imaging candidate position to each characteristic part.

A column of "position evaluation" represents evaluation values calculated by the evaluation function fna based on the standard a (evaluation standard relating to an imaging position).

A column of "direction" represents an angle of a straight line that connects each imaging candidate position and each characteristic part.

A column of "direction evaluation" represents evaluation values calculated by the evaluation function fnb based on the standard b (evaluation standard relating to an imaging direction).

A column of "individual evaluation value" represents evaluation values at respective characteristic parts. In this example, F1 (x, y, θ)=f1a (x, y, θ)×f1b (x, y, θ) is calculated for the first characteristic part CP1, and F2 (x, y, θ)=f2a (x, y, θ)×f2b (x, y, θ) is calculated for the second characteristic part CP2.

A column of "evaluation value" represents evaluation values at respective imaging candidate positions. As described above, since the evaluation value is the sum of the individual evaluations at each characteristic part, F (X, Y, θ)=F1 (X, Y, θ)+F2 (X, Y, θ) is calculated.

(7) Generation of Imaging Evaluation Map

An imaging evaluation map is generated on the basis of a calculation result of the evaluation values.

FIG. 15 is a diagram showing an example of a data structure of an imaging evaluation map.

As shown in the figure, at each imaging candidate position (x, y), an evaluation value obtained for each imaging condition (imaging direction) is recorded in association with information on the imaging candidate position and information on the imaging condition (imaging direction). In this example, information on an individual evaluation value in a case of calculating the evaluation value is also recorded.

In this example, since 20 imaging candidate positions are set and 3 imaging directions are set as the imaging conditions, an imaging evaluation map having evaluation values of 20×3=60 is generated. That is, the imaging evaluation map in which 60 ways of imaging are evaluated is generated.

(8) Output of Imaging Evaluation Map

The generated imaging evaluation map is output to the output device in a predetermined output format.

Figure 16:
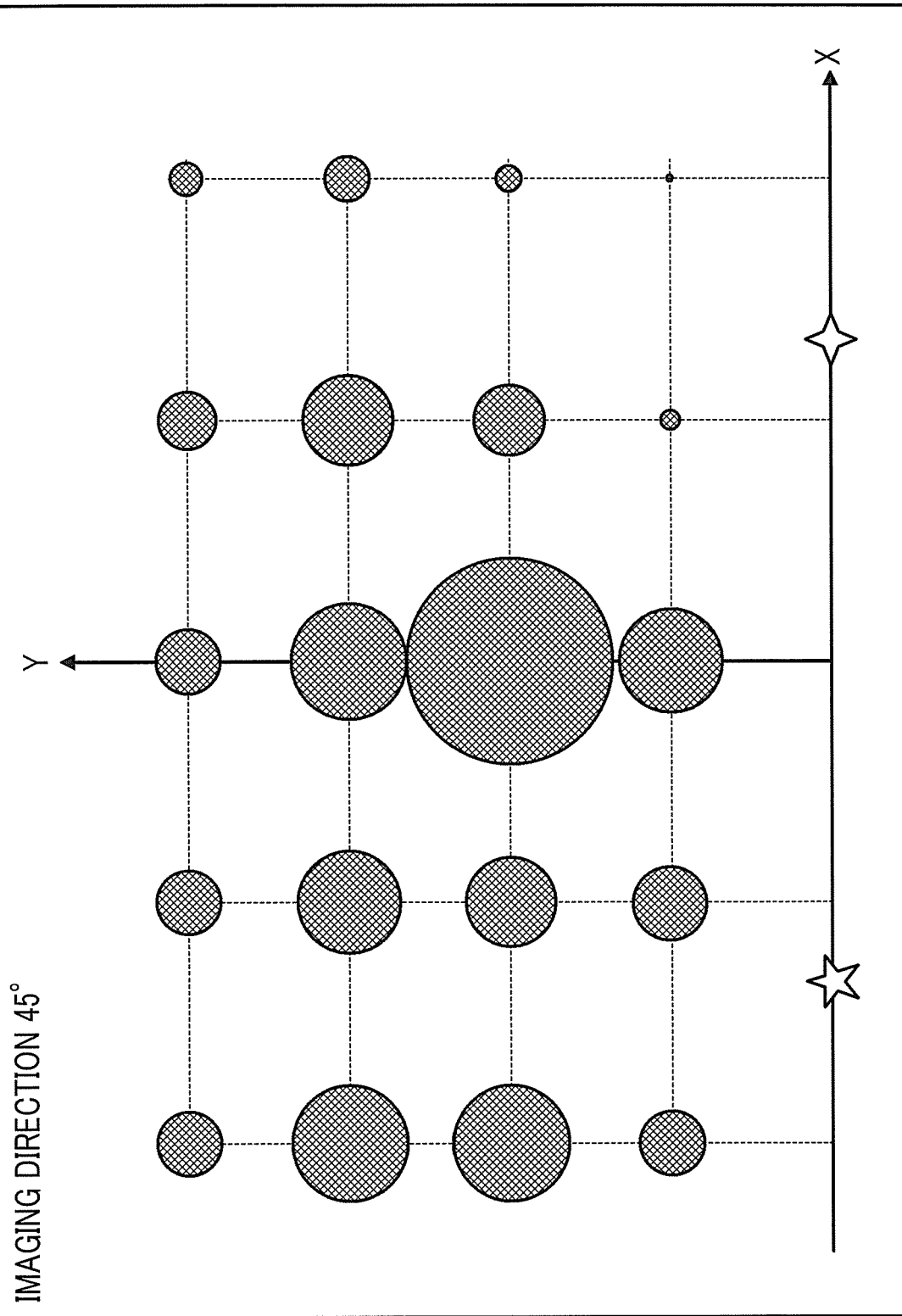
FIG. 16 is a diagram showing an example in which evaluation values obtained at respective imaging candidate positions are graphed and output in a case where the imaging direction is 45°.
Figure 17:
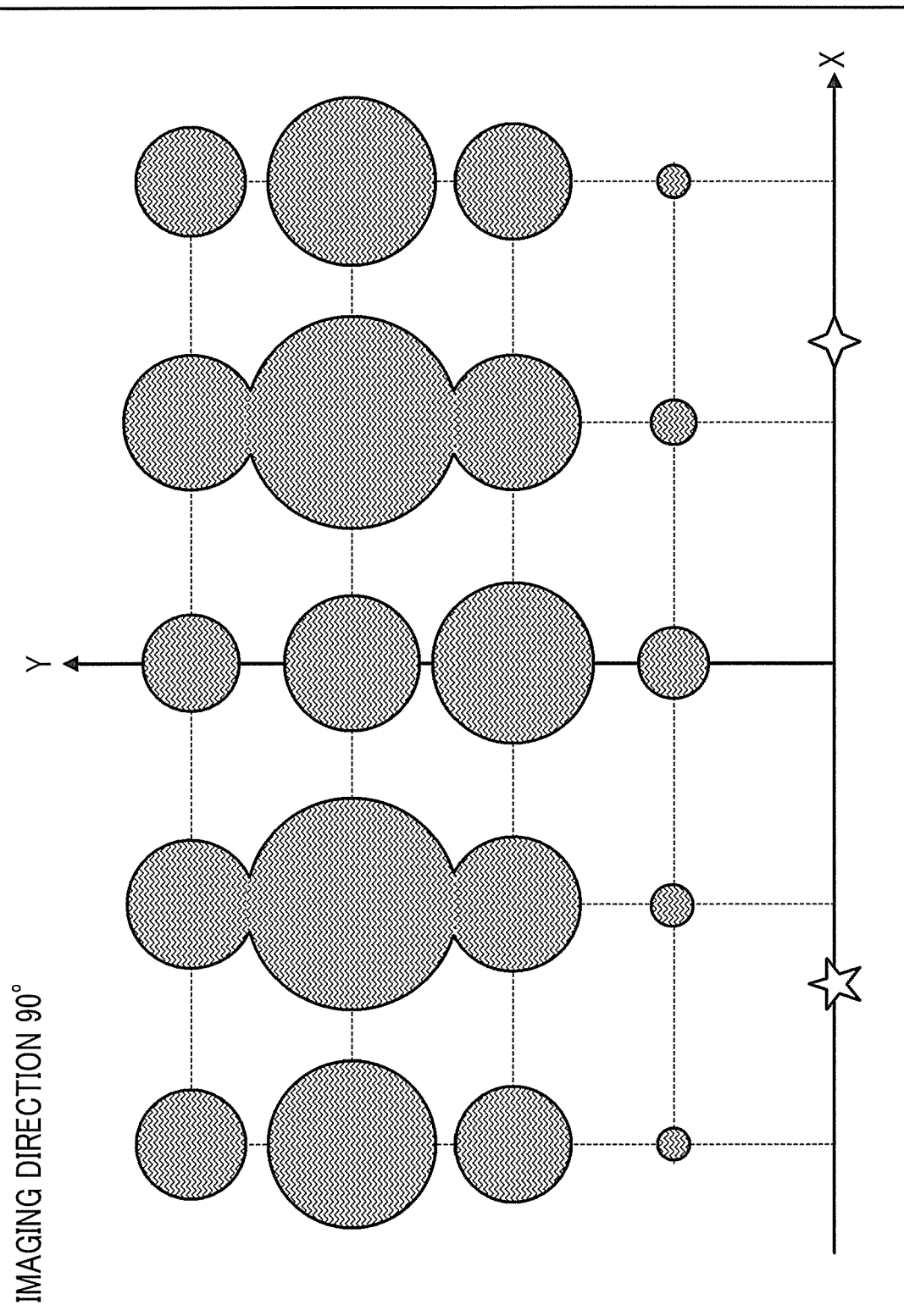
FIG. 17 is a diagram showing an example in which evaluation values obtained at respective imaging candidate positions are graphed and output in a case where the imaging direction is 90°.
Figure 18:
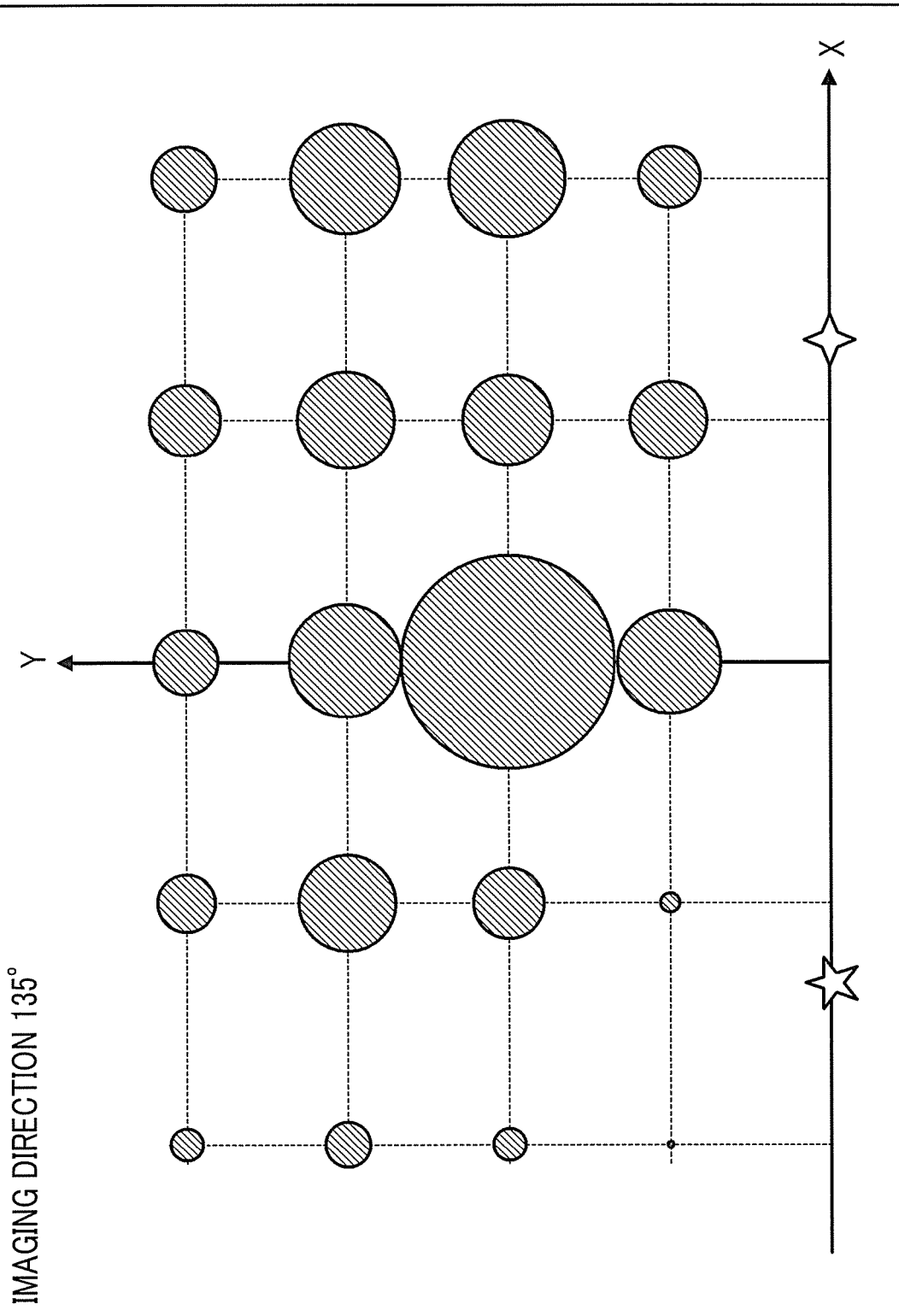
FIG. 18 is a diagram showing an example in which evaluation values obtained at respective imaging candidate positions are graphed and output in a case where the imaging direction is 135°.

FIGS. 16 to 18 are diagrams showing an example in a case where evaluation values obtained at respective imaging candidate positions are graphed and output. FIG. 16 is a diagram showing an example in which evaluation values obtained at respective imaging candidate positions are graphed and output in a case where the imaging direction is 45°. FIG. 17 is a diagram showing an example in which evaluation values obtained at respective imaging candidate positions are graphed and output in a case where the imaging direction is 90°. FIG. 18 is a diagram showing an example in which evaluation values obtained at respective imaging candidate positions are graphed and output in a case where the imaging direction is 135°.

In each figure, a circle displayed in the graph indicates an evaluation value at its position (imaging candidate position), and the larger the diameter, the higher the evaluation value.

As shown in FIGS. 16 to 18, using graphing, it is possible to easily understand conditions (imaging candidate positions and imaging conditions) under which a high evaluation value is obtained.

For example, under the condition that the imaging direction is 45°, it can be seen from FIG. 16 that imaging at an imaging candidate position (0, 100) has the highest evaluation.

Further, under the condition that the imaging direction is 90°, it can be seen from FIG. 17 that imaging at an imaging candidate position (75, 100) and an imaging candidate position (−75, 100) has the highest evaluation.

Further, under the condition that the imaging direction is 135°, it can be seen from FIG. 18 that imaging at the imaging candidate position (0, 100) has the highest evaluation.

[Modification Example of Imaging Evaluation Map Generating Device]

<<Modification Example of Coordinate Space Setting Section>>

As described above, in a case where a three-dimensional structure is set as an object, the coordinate space setting section 31 receives an input of three-dimensional model data thereof, and sets a coordinate space.

The three-dimensional model may be generated using a known method such as SfM (Structure from Motion). The SfM is a method of reproducing a three-dimensional model of an object from a plurality of images (multi-viewpoint images) obtained by imaging the object from a plurality of viewpoints.

In a case where a function of generating a three-dimensional model of an object is realized in the imaging evaluation map generating device, the imaging evaluation map generating device further includes an object image acquiring section that acquires a plurality of images obtained by imaging the object from a plurality of viewpoints, and a three-dimensional model generating section that generates a three-dimensional model of the object on the basis of the plurality of acquired images. The object image acquiring section and the three-dimensional model generating section are realized by causing a computer to execute a predetermined program. The three-dimensional model generating section generates a three-dimensional model (for example, a three-dimensional mesh model) using a known method such as SfM, for example.

The coordinate space setting section 31 acquires information on the three-dimensional model of the object generated by the three-dimensional model generating section, and sets a coordinate space on the basis of the obtained three-dimensional model.

<<Modification Example of Imaging Candidate Position Setting Section>>

It is preferable that an imaging candidate position set by the imaging candidate position setting section 32 is set in consideration of an imaging target, an imaging purpose, and the like. Further, the imaging candidate position may be manually set. Further, the imaging candidate position may be set on a straight line in consideration of a case where the imaging candidate position is imaged while moving on the straight line. In addition, the imaging candidate position may be set in a plane in consideration of a case where the imaging candidate position is imaged while moving in the plane.

<<Modification Example of Imaging Condition Setting Section>>

An imaging condition set by the imaging condition setting section 33 may be automatically set depending on an object, or may be set appropriately by a user. Further, the user may appropriately modify the imaging condition automatically set depending on the object. In the case of automatic setting, it is preferable to automatically select a necessary imaging condition in consideration of an imaging target, an imaging purpose, and the like.

Further, it is not essential that a plurality of imaging condition are set, and at least one imaging condition may be set. This is because the imaging condition may not be changed depending on a device to be used. In this case, an imaging evaluation map in which an imaging evaluation is determined for each imaging candidate position, based on the one set imaging condition, is generated.

In a case where a plurality of imaging conditions are set, a plurality of imaging conditions having different content may be set for one item. For example, as described in the above embodiment, a plurality of imaging conditions with different imaging directions may be set. As a result, a plurality of evaluation values having different imaging directions are obtained for the same imaging candidate position. As a result, for example, in a case where imaging is performed using a device having a function of switching an imaging direction, it is possible to easily make an imaging plan thereof.

In addition, a plurality of imaging conditions with different imaging angles of view may be set. As a result, a plurality of evaluation values with different imaging angles of view are obtained for the same imaging candidate position. Accordingly, for example, in a case where imaging is performed using a device having a function (zoom function) for switching an imaging angle of view, it is possible to easily make an imaging plan thereof. Changing the imaging angle of view is synonymous with changing a focal length.

Further, a plurality of imaging conditions with different numbers of recording pixels may be set. As a result, a plurality of evaluation values with different numbers of recording pixels are obtained for the same imaging candidate position. Thus, it is possible to easily select a device suitable for imaging. The number of recording pixels is the number of pixels in a case where a captured image is recorded on a medium. Here, the number of recording pixels is synonymous with resolution. That is, the larger the number of recording pixels, the higher the resolution of imaging.

Furthermore, a plurality of imaging conditions with different exposure correction amounts may be set. As a result, a plurality of evaluation values with different exposure correction amounts are obtained for the same imaging candidate position. Thus, for example, in a case where imaging is performed with a device capable of performing exposure correction, it is possible to easily make an imaging plan thereof.

Further, in a case where imaging for a motion picture is performed, a plurality of imaging conditions with different frame rates may be set. As a result, a plurality of evaluation values with different frame rates are obtained for the same imaging candidate position. Thus, it is possible to easily select a device suitable for imaging.

<<Modification Example of Characteristic Part Setting Section>>

As described above, a part (point, line, and region) that is a useful "appearance" of the object corresponds to a characteristic part. It is preferable that the characteristic part is set in consideration of an imaging target, an imaging purpose, and the like. As described above, in imaging for the purpose of inspecting a structure, a three-dimensional shape (vertices, ridges, or the like), or a surface texture (stains on the surface, or a deteriorated part such as cracks) of an object is a typical characteristic part.

Various methods may be employed for setting the characteristic part. Hereinafter, an example thereof will be described.

<In a Case where Characteristic Part is Manually Set>

In a case where a part that is a useful "appearance" of an object is known, the part may be manually set.

For example, in a case where a three-dimensional shape (vertices, ridges, or the like) of an object is used as a characteristic part, information on the vertices, ridges, or the like is acquired from data (drawings, Computer Aided Design (CAD) data, or the like) at the time of design of a structure that is the object, and is set as a characteristic part. Further, it is also possible to measure (survey) an actual object to acquire information on positions and azimuths of its vertices and ridges, and to set the information as a characteristic part.

Further, in a case where a surface texture (stains on a surface, a deteriorated part such as cracks) is used as a characteristic part, it is possible to estimate a location with a possibility that a deterioration phenomenon such as stains or cracks occurs from data (drawings, CAD data, or the like) at the time of design of a structure that is the object, and to specify its position, azimuth, and size (range) to set a characteristic part. Alternatively, it is possible to find a location where stains, cracks, or the like have occurred by visually observing an actual object, and to set the location as a characteristic part.

Further, in a case where the object has been imaged in the past, a characteristic part may be set with reference to a past imaging history. For example, in imaging for the purpose of inspecting a structure, in a case where the structure has been imaged in the past, information on a deteriorated part may be acquired with reference to a past imaging history, and may be set as a characteristic part.

<In a Case where a Characteristic Part is Automatically Set>

In a case where a characteristic part is automatically set, a part that is the characteristic part may be automatically extracted from an object, and may be set as the characteristic part. For example, when an imaging evaluation map is generated for the purpose of inspecting a structure or the like, the characteristic part may be set according to the following steps.

First step: First, a plurality of images obtained by imaging an object from a plurality of viewpoints are acquired.

Second step: Next, vertices and ridges useful for estimating a three-dimensional structure or shape of the object are extracted from the obtained image group. Further, a texture (not limited to stains, cracks, or the like) related to a surface shape of the object is extracted. The extraction process is performed using a known image recognition technique.

Third step: Next, the three-dimensional structure or shape of the object is estimated based on the information obtained in the second step.

Fourth step: Next, from the three-dimensional structure or shape of the object obtained in the third step, an element useful for inspection (useful "appearance") is extracted by image processing. For example, an image recognition technology is used to recognize stains, cracks, or the like, and to extract useful elements for inspection. The position, azimuth, and range (size) of the extracted element are specified and set as a characteristic part.

Further, the characteristic part may be set according to the following steps.

First step: First, a plurality of images obtained by imaging an object from a plurality of viewpoints are acquired.

Second step: Then, characteristic points are roughly detected from the obtained image group by a method such as SfM to obtain point group data.

Third step: Next, distribution of the point group is analyzed from the obtained point group data to generate a three-dimensional mesh model.

Fourth step: Vertices and ridges are extracted from the generated three-dimensional mesh model to be set as a characteristic part.

In the case of this configuration, the imaging evaluation map generating device further includes an object image acquiring section that acquires a plurality of images obtained by imaging an object from a plurality of viewpoints, and a three-dimensional model generating section that generates a three-dimensional model of the object on the basis of the obtained plurality of images. The object image acquiring section, the three-dimensional model generating section, and a characteristic part extracting section are realized as a computer executes a predetermined program.

In addition, for example, a configuration may be used in which a part capable of being a characteristic part is extracted from information on a plurality of images obtained by imaging an object from a plurality of viewpoints and three-dimensional model data generated from the image group, using a learned model.

Further, in a case where the object has been imaged in the past, a characteristic part may be set with reference to a past imaging history. For example, in the case of imaging for the purpose of inspecting a structure, or the like, in a case where the structure has also been imaged in the past, past imaging information on may be acquired, information on a deteriorated part may be automatically extracted from the obtained information, and thus, a characteristic part may be automatically set.

In a case where the characteristic part is automatically set, a user may manually add or delete a characteristic part as necessary, for example. That is, the characteristic part may be set by combining automatic setting and manual setting. This makes it possible to complement each other's defects and efficiently set the characteristic part.

<Modification Example of Evaluation Standard Setting Section>

An evaluation standard may be set manually, or may be set automatically.

As described above, in a case where the three-dimensional model of the object is generated to set the characteristic part, it is preferable that the evaluation standard is also automatically set. That is, it is preferable that the evaluation standard is automatically set on the basis of the generated three-dimensional model. For example, in a case where a three-dimensional mesh model is generated, by analyzing the direction of a mesh of the generated three-dimensional mesh model, it is possible to set an evaluation standard for each characteristic part. For example, the evaluation standard is set so that a characteristic part at a location where the directions of the mesh are dispersed (a location with large unevenness) is given a high evaluation not only in a front direction but also in an oblique direction.

Further, in a case where the evaluation standard for each characteristic part is set on the basis of the three-dimensional model, it is preferable that the evaluation standard for each characteristic part is set by further using information on characteristic points obtained in the process of generating the three-dimensional model. For example, it is possible to set the evaluation standard for each characteristic part by using information on the density of detected characteristic points. For example, in a characteristic part at a location where the density of characteristic points is high, the evaluation standard is set so that the higher the resolution imaging, the higher the evaluation.

In a case where the evaluation standard is set, it is preferable to consider an imaging target, an imaging purpose, and the like. This is because an image that is considered to be good differs depending on an imaging object. Further, even in a case where the same object is imaged, if the purpose is different, an image that is considered to be good is different. For example, in a characteristic part in which image information such as stains and cracks is necessary, the evaluation standard is set so that the higher the resolution, the higher the evaluation. In addition, for a characteristic part in which structural information (three-dimensional shape, deformation, or the like) is necessary, the evaluation standard is set so that a high evaluation is given to not only front imaging but also oblique imaging. Furthermore, in the case of a characteristic part at a location where imaging should be necessarily performed from a structural or past damage history, the evaluation standard is set so that a high evaluation is given to a condition (imaging position and/or imaging direction) that the characteristic part is surely imaged.

As for the evaluation function, as described in the above-described embodiment, it is possible to generate the evaluation function by setting a standard for evaluation, setting a function for each set standard, and appropriately combining the set functions. In a case where a position, an imaging direction, and an imaging angle of view are evaluated, a function for evaluation of the position, a function for evaluation of the imaging direction, and a function for evaluation of the imaging angle of view are set, and the set functions are combined to generate one function. The combination method is set according to an evaluation mode. In a case where respective items are highly evaluated at the same time, in a case where a higher evaluation is to be obtained, an evaluation function obtained by multiplying respective functions is generated. In a case where the evaluation of each item is handled independently, an evaluation function obtained by adding up respective functions is generated. In a case where a particular item is emphasized, a weight is given to generate an evaluation function. For example, in the above example, in a case where the imaging direction is regarded as important, a relatively high weight is given to the function for evaluation of the imaging direction, and an evaluation function obtained by adding up the respective functions is generated.

<Modification Example of Evaluation Value Calculating Section>

As described above, the evaluation value is calculated as the sum of evaluation values (individual evaluation values) obtained for all the characteristic parts. In a case where this evaluation value is calculated, a weight may be given to each characteristic part. For example, in a case where an imaging evaluation map is generated for the purpose of inspecting a structure or the like, in a case where a deteriorated part (stains, cracks, or the like) on a surface of the structure is used as a characteristic part, a relatively high weight may be given to the deteriorated part to calculate an evaluation value. Alternatively, a relatively high weight may be given to a characteristic part designated as a part to be noticed to calculate an evaluation value.

In a case where the evaluation value is calculated by giving a weight to each characteristic part, the imaging evaluation map generating device further includes a weight setting section. The weight setting section sets a weight to each characteristic part. The weight setting section is realized by causing a computer to execute a predetermined program. In a case where the weight is set, the evaluation value calculating section 36 calculates, in a case of calculating an evaluation value, a sum of values obtained by multiplying acquired individual evaluation values for respective characteristic parts by weights as the evaluation value.

For example, in a case where an imaging evaluation map is generated for the purpose of inspecting a structure or the like, a weight assigning section acquires information on a deteriorated part set as a characteristic part, and gives a relatively high weight to the deteriorated part. Further, in a case where past imaging information can be acquired, the weight may be given to each characteristic part using the past imaging information. For example, a relatively high weight is given to a characteristic part at a location that should be necessarily imaged from the past imaging information. Similarly, in a case where information on a past damage history or the like can be acquired, a weight may be appropriately given to a characteristic part from the information.

Further, in a case where a relatively high weight is given to a part to be noticed, a notice part selecting section is separately provided. The notice part selecting section performs a process of selecting a part to be noticed (notice part) from a plurality of set characteristic parts. The selection is performed, for example, by displaying the plurality of set characteristic parts on the display 22 and causing a user to select a characteristic part to be set as a notice part. The weight assigning section assigns a relatively high weight to the selected notice part.

In this way, by assigning weights to calculate evaluation values, the evaluation depending on the degree of importance is obtained, and the imaging evaluation map depending on the degree of importance is generated. Thus, it is possible to easily generate an imaging plan.

The weight given to each characteristic part may be manually given. Further, it is preferable that the set weight can be adjusted appropriately.

<Modification Example of Imaging Evaluation Map Generating Device>

An imaging evaluation map generated by the imaging evaluation map generating section 37 may include at least information on evaluation values and information on imaging candidate positions and imaging conditions in which the evaluation values are calculated. Further, by recording useful information in association with the evaluation values, it is possible to generate a more useful imaging evaluation map.

<Modification Example of Imaging Evaluation Map Output Processing Section>

The generated imaging evaluation map does not necessarily have to be displayed, and may be output as data. In this case, an external device that has acquired the data performs a process such as display, a process of generating an imaging plan using the imaging evaluation map, and the like.

♦♦Imaging Apparatus♦♦

In an imaging evaluation map, an evaluation value that represents an imaging evaluation in a case where an object is imaged at a specific position under a specific imaging condition is determined, for each of a plurality of imaging conditions with respect to a plurality of imaging candidate positions. Accordingly, by taking this imaging evaluation map into consideration, it is possible to determine at which position and under which imaging condition a good image can be captured.

Hereinafter, an imaging method using such an imaging evaluation map will be described.

[First Embodiment of Imaging Apparatus]

Here, an example will be described in which an imaging point suitable for imaging an object and an imaging condition at the imaging point are automatically selected from an imaging evaluation map. In particular, in the present embodiment, an example will be described in which imaging is performed for the purpose of inspecting a structure.

<<Hardware Configuration of Imaging Apparatus>>

The imaging apparatus is configured of a computer in which a predetermined imaging program is installed. A hardware configuration thereof is substantially the same as the hardware configuration of the above-described imaging evaluation map generating device (see FIG. 1). Accordingly, description of its detailed configuration will not be repeated.

<<Functions Realized by Imaging Apparatus>>

Figure 19:
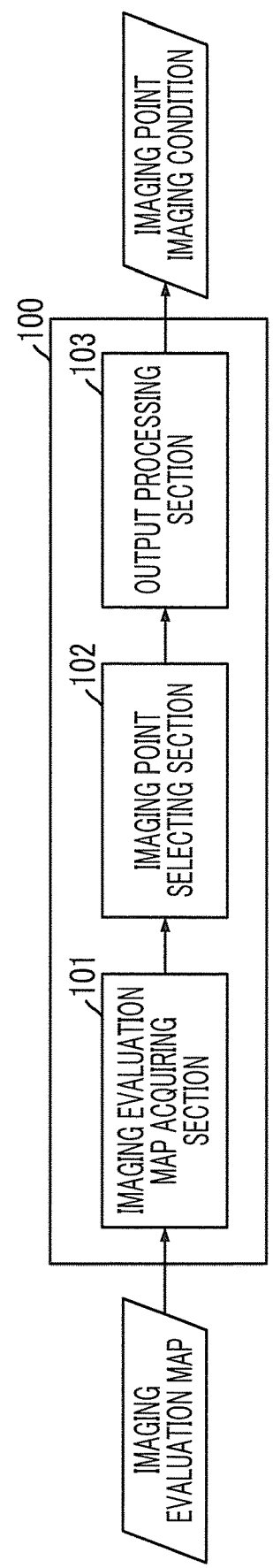
FIG. 19 is a block diagram showing functions realized by an imaging apparatus.

FIG. 19 is a block diagram of functions realized by an imaging apparatus.

As shown in the figure, an imaging apparatus 100 includes an imaging evaluation map acquiring section 101 that acquires an imaging evaluation map, an imaging point selecting section 102 that selects an imaging point and an imaging condition at the imaging point on the basis of the acquired imaging evaluation map, and an output processing section 103 that outputs the selected imaging point and imaging condition.

<Imaging Evaluation Map Acquiring Section>

The imaging evaluation map acquiring section 101 acquires an imaging evaluation map. In a case where the computer that functions as the imaging apparatus also functions as an imaging evaluation map generating device, the imaging evaluation map acquiring section 101 acquires an imaging evaluation map generated by the imaging evaluation map generating device as it is. That is, the imaging evaluation map is directly acquired from the imaging evaluation map generating section 37. In a case where the imaging evaluation map is acquired from an external device, the imaging evaluation map is acquired using the optical disc drive 14, the communication interface 15, the input/output interface 16, or the like (see FIG. 1).

As described above, in the present example, since the imaging is performed for the purpose of inspecting the structure, an imaging evaluation map generated for the purpose of imaging for inspecting the structure is acquired. As described above, in this type of imaging evaluation map, a three-dimensional shape (vertices, ridges, or the like) of a structure that is an object, a texture of a surface (deteriorated part such as stains, cracks, or the like), or the like are set as a characteristic part.

<Imaging Point Selecting Section>

The imaging point selecting section 102 selects an imaging point (imaging position) suitable for imaging an object and an imaging condition at the imaging point on the basis of the imaging evaluation map acquired by the imaging evaluation map acquiring section 101.

The imaging point selecting section 102 extracts a condition having a high evaluation value (a combination of an imaging candidate position and an imaging condition) from the imaging evaluation map, and selects the imaging point and the imaging condition so as to satisfy the condition. For example, the imaging point selecting section 102 extracts conditions having higher N evaluation values (combinations of imaging candidate positions and imaging conditions), and selects imaging points and imaging conditions so as to satisfy the extracted conditions. Alternatively, the imaging point selecting section 102 extracts a condition (a combination of an imaging candidate position and an imaging condition) whose evaluation value is equal to or more than a threshold value, and selects an imaging point and an imaging condition so as to satisfy the extracted condition.

As an example, in the imaging evaluation map shown in FIG. 15, in a case where conditions (combinations of imaging candidate positions and imaging conditions) having high four evaluation values are extracted, the following four conditions are obtained.

| | | |
|---|---|---|
| Imaging candidate position: (0, 100) | Imaging direction: 45° | Evaluation value: 0.99 |
| Imaging candidate position: (0, 100) | Imaging direction: 135° | Evaluation value: 0.99 |
| Imaging candidate position: (75, 150) | Imaging direction: 90° | Evaluation value: 0.58 |
| Imaging candidate position: (−75, 150) | Imaging direction: 90° | Evaluation value: 0.58 |

The imaging points and the imaging conditions are selected so as to satisfy the extracted conditions (combinations of the imaging candidate positions and the imaging conditions).

The simplest selection method is a method for setting the extracted imaging candidate positions and the imaging conditions to the imaging points and the imaging conditions as they are. In this case, the imaging points and imaging conditions are selected as follows.

(A) Position (0,100), imaging direction 45°
(B) Position (0,100), imaging direction 135°
(C) Position (75, 150), imaging direction 90°
(D) Position (−75, 150), imaging direction 90°

In addition, the imaging points and the imaging conditions may be selected in consideration of information on the degree of freedom of imaging, an imaging distance suitable for imaging, and the cost necessary for imaging (particularly, the cost necessary for changing imaging conditions (cost necessary for movement, cost necessary for changing an imaging direction, or the like)). Thus, it is possible to select an imaging point and an imaging condition suitable for a user's request.

For example, in a case where the imaging direction is limited to 90°, the position (75, 150) and the position (−75, 150) are set as the suitable imaging points. Further, in consideration of the imaging distance suitable for imaging, the position (x1, D1) and the position (x2, D2) are set as the suitable imaging points (it is assumed that a coordinate position of the first characteristic part CP1 is (x1, y1), an imaging distance suitable for imaging the first characteristic part CP1 is D1, a coordinate position of the second characteristic part CP2 is (x2, y2), and an imaging distance suitable for imaging the second characteristic part CP2 is D2).

Further, in consideration of the cost necessary for imaging, imaging at one location is imaging with the lowest energy consumption and a low cost. In this case, imaging in which the imaging direction is changed at the position (0,100) is a preferable condition. That is, at the position (0, 100), imaging performed in the imaging direction of 45° and imaging performed in the imaging direction of 135° are suitable conditions. Furthermore, the imaging point may be selected in consideration of the imaging distance suitable for imaging each characteristic part.

Generally, in the case of imaging using a drone, the cost for movement is higher than the cost for changing the imaging direction (power consumption is large). Further, in the case of movement, power is consumed in the order of ascending>level flight>hovering>descending.

<Output Processing Section>

The output processing section 103 outputs imaging points and imaging conditions selected by the imaging point selecting section 102 in a predetermined output format.

Figure 20:
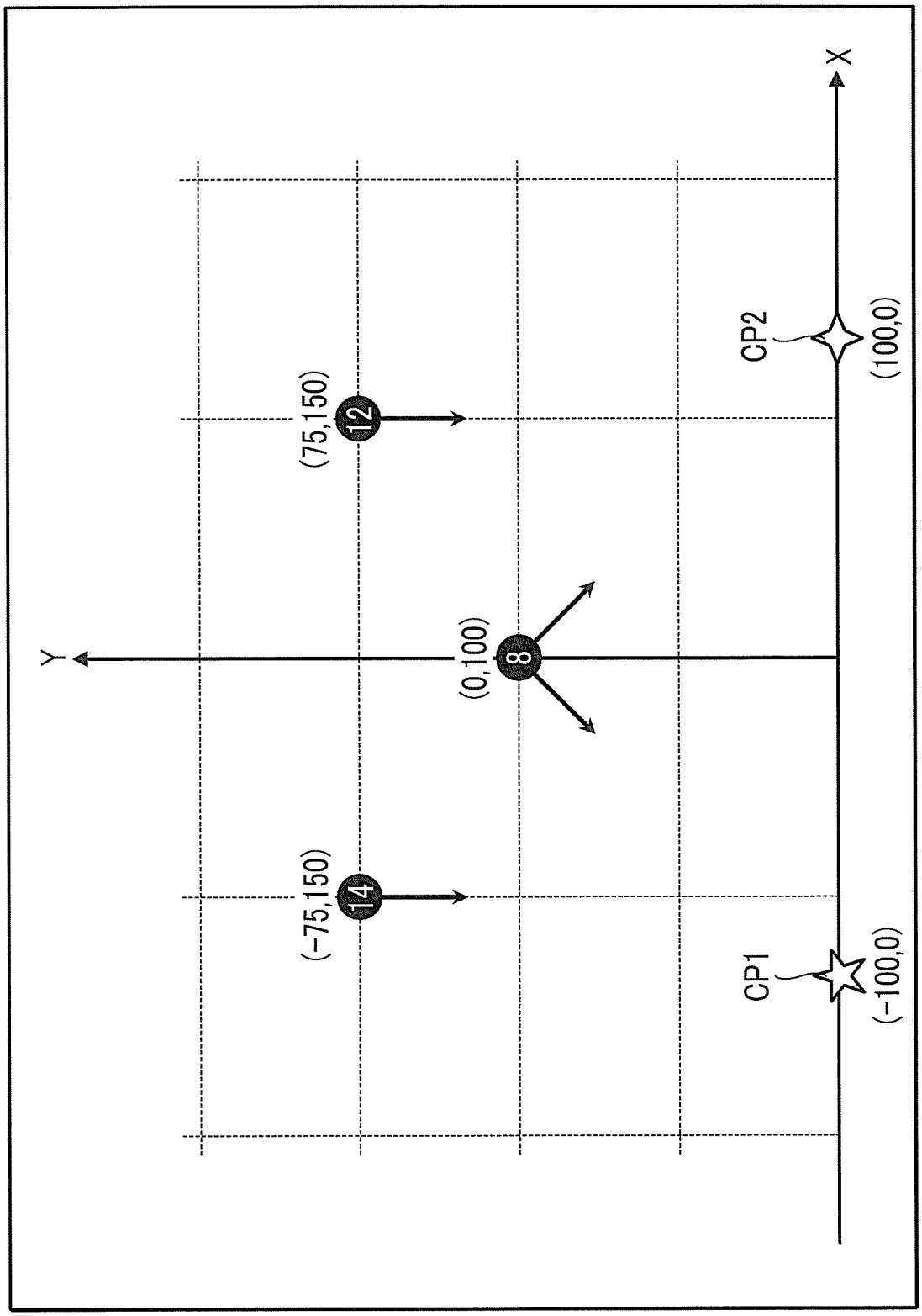
FIG. 20 is a diagram showing an example in which selected imaging points and imaging conditions are output to a display.

FIG. 20 is a diagram showing an example in which selected imaging points and imaging conditions are output to a display.

As shown in the figure, imaging candidate positions selected as the imaging points and their imaging conditions are displayed on the display 22. In this example, information on the imaging direction that is an imaging condition is indicated by a direction of an arrow extending from each imaging candidate position.

In this way, by displaying the imaging point and the imaging condition, it is possible to easily recognize an imaging point suitable for imaging and an imaging condition.

Figure 21:
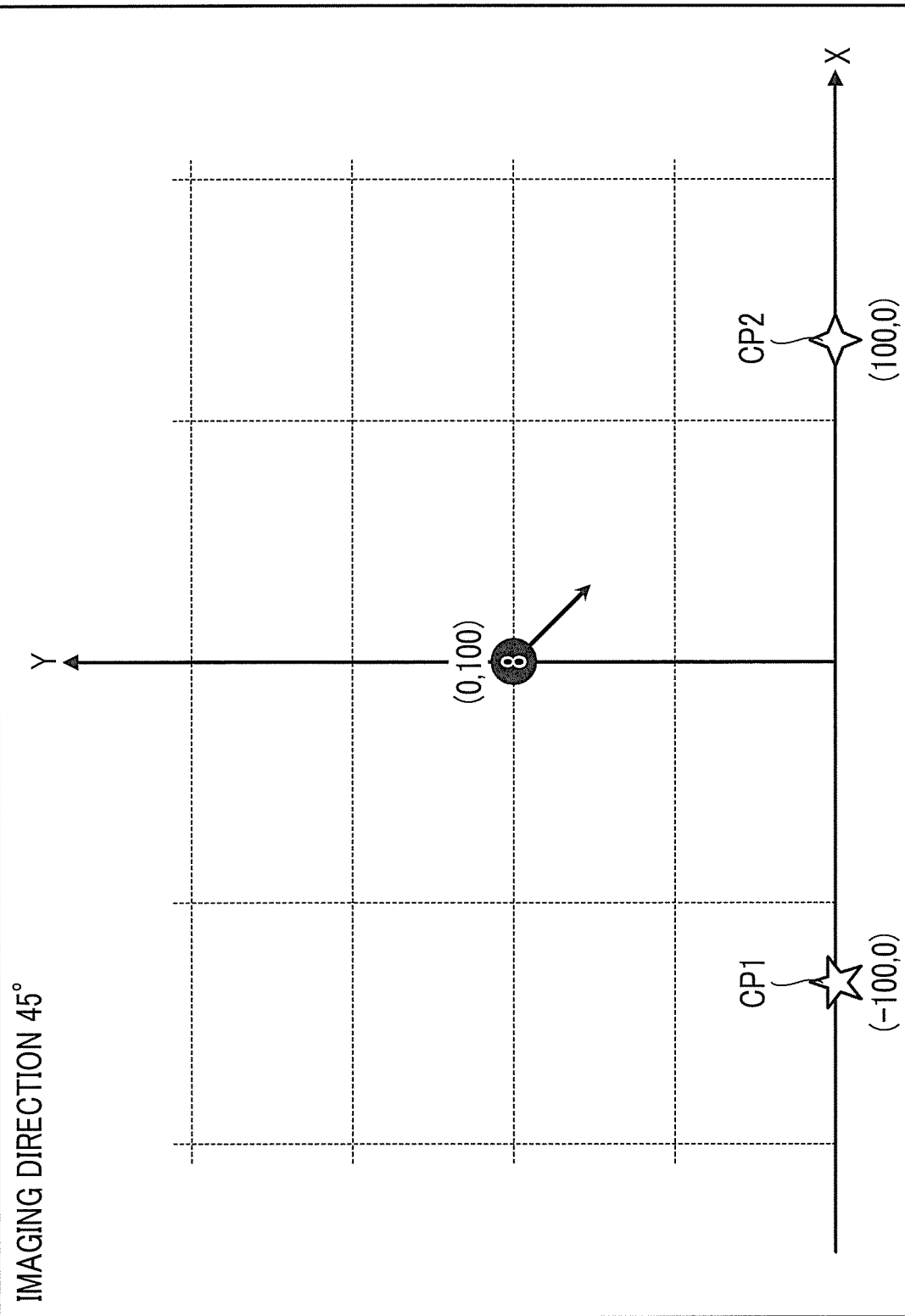
FIG. 21 is a diagram showing another example in which selected imaging points and imaging conditions are output to a display (in a case where the imaging direction is 45°).
Figure 22:
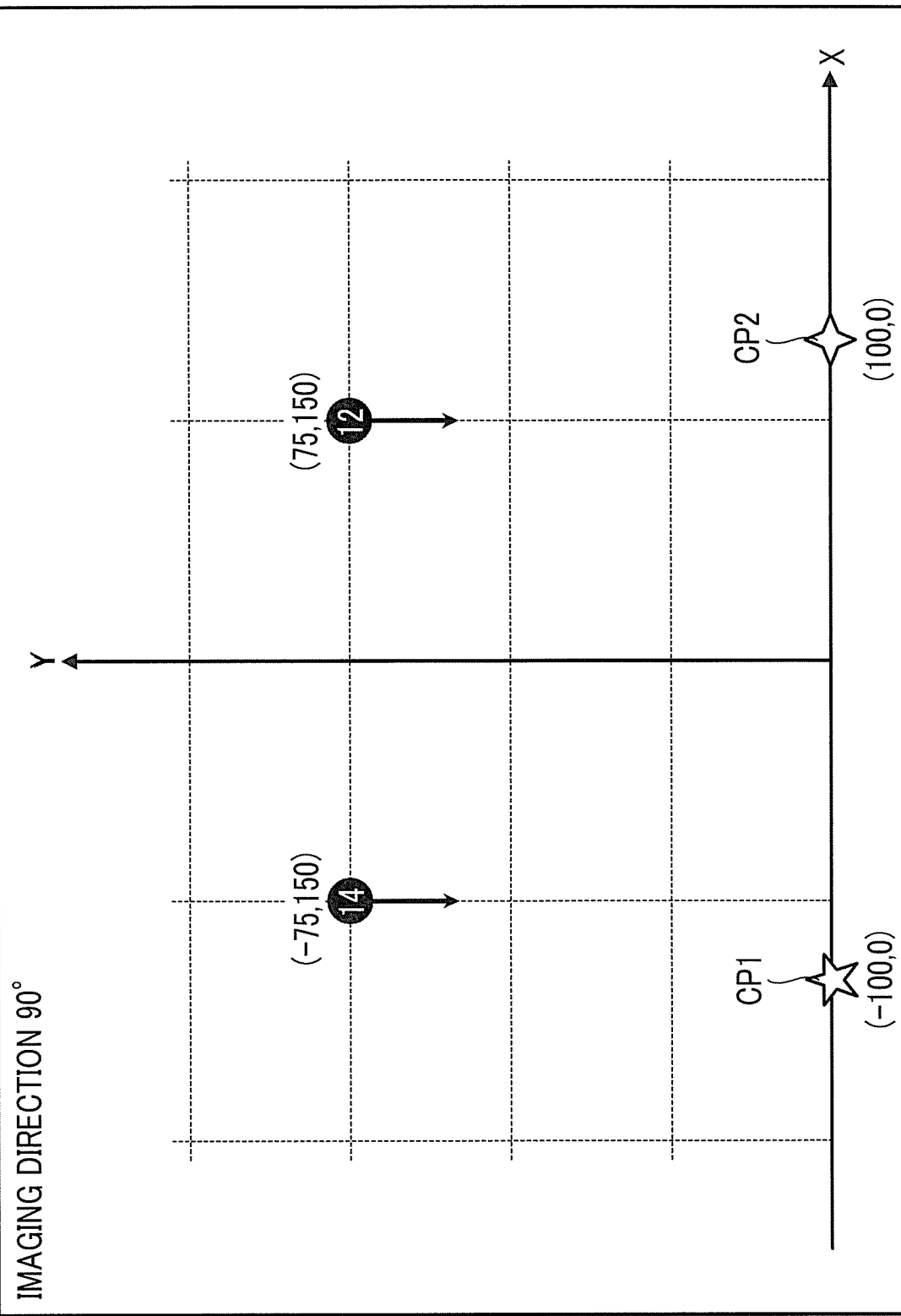
FIG. 22 is a diagram showing another example in which selected imaging points and imaging conditions are output to a display (in a case where the imaging direction is 90°).
Figure 23:
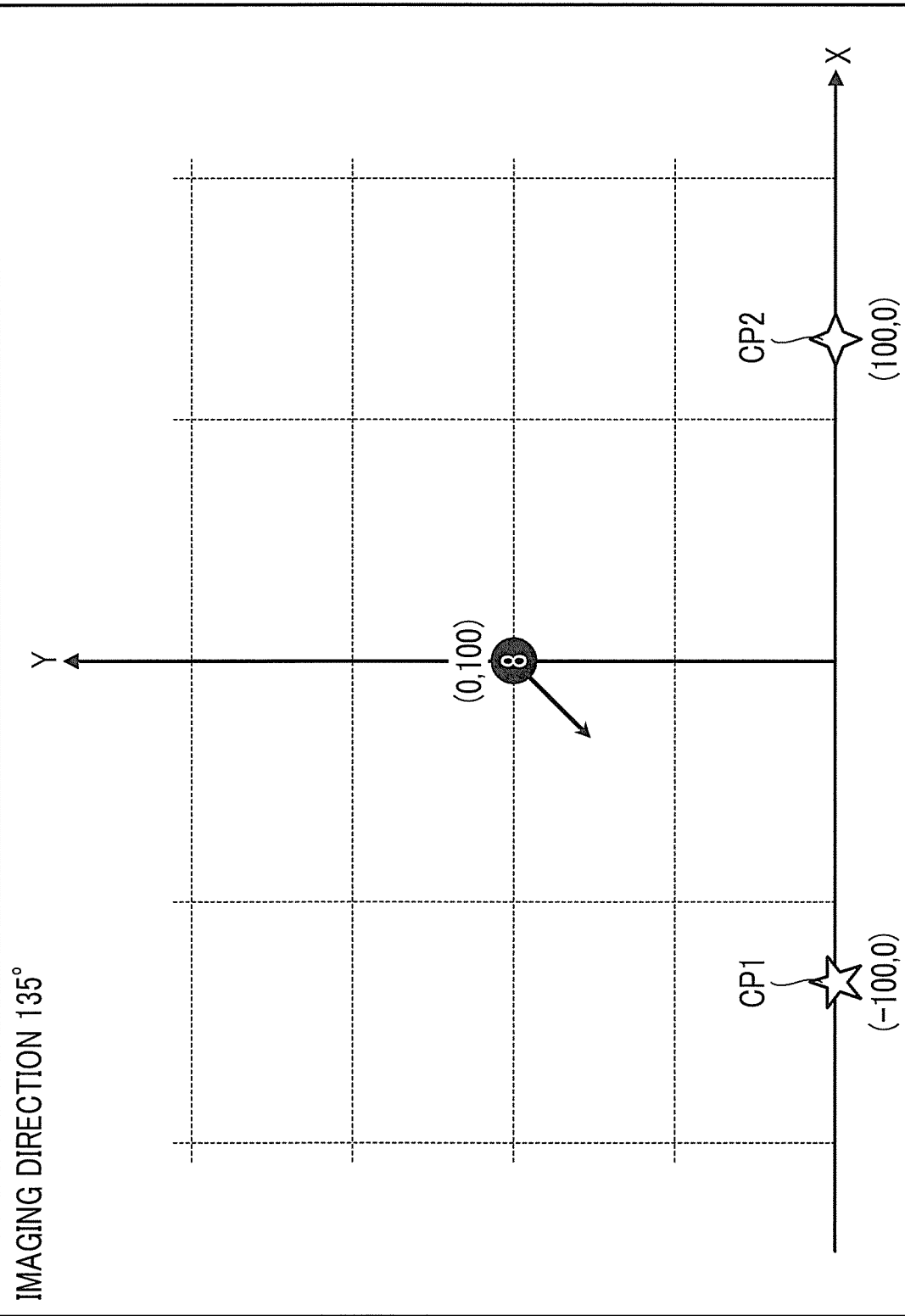
FIG. 23 is a diagram showing another example in which selected imaging points and imaging conditions are output to a display (in a case where the imaging direction is 135°).

FIGS. 21 to 23 show another example in which selected imaging points and imaging conditions are output to a display.

FIGS. 21 to 23 show examples in which the selected imaging points are displayed for each imaging condition. FIG. 21 shows a display example in a case where the imaging direction is 45°. FIG. 22 shows a display example in a case where the imaging direction is 90°. FIG. 23 shows a display example in a case where the imaging direction is 135°.

In a case where there are many imaging points to be selected, through display according to imaging conditions in this way, it is possible to easily discriminate the selected conditions.

<Operation of Imaging Apparatus>

Figure 24:
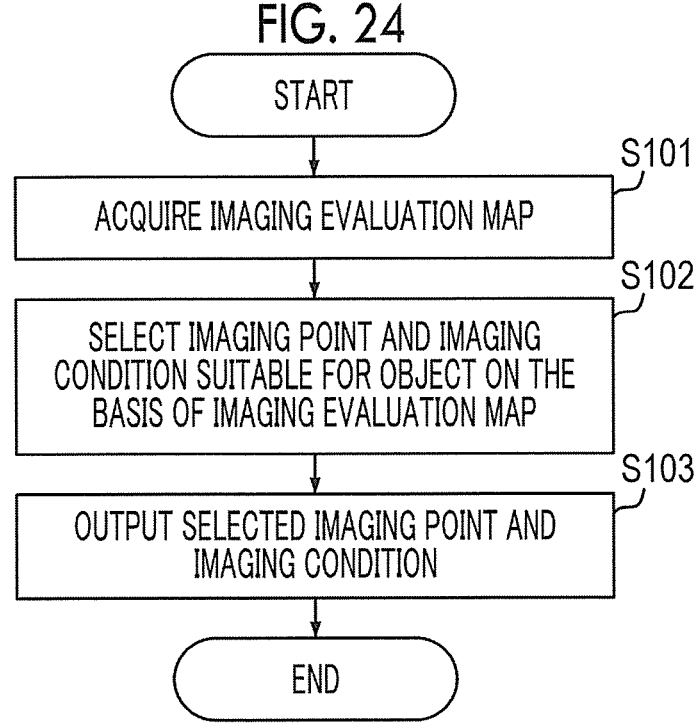
FIG. 24 is a flowchart showing a procedure of a process for selecting and outputting an imaging point and an imaging condition.

FIG. 24 is a flowchart showing a procedure of a process for selecting and outputting an imaging point and an imaging condition.

First, an imaging evaluation map is acquired (step S101). Then, an imaging point suitable for imaging an object and an imaging condition at the imaging point are selected on the basis of the acquired imaging evaluation map (step S102). Then, the selected imaging point and imaging condition are output (step S103). A user makes an imaging plan on the basis of information on the output imaging point and imaging condition.

A movement route is also selected in making the imaging plan. For the selection of the movement route, for example, a known algorithm for solving a combinatorial optimization problem may be employed. For example, an algorithm for solving the traveling salesman problem may be employed to select the movement route.

Modification Example

For the selection of the imaging point and the imaging condition, for example, a learned model generated using a learning data set based on an evaluation map may be used.

[Second Embodiment of Imaging Apparatus]

<<Functions Realized by Imaging Apparatus>>

Figure 25:
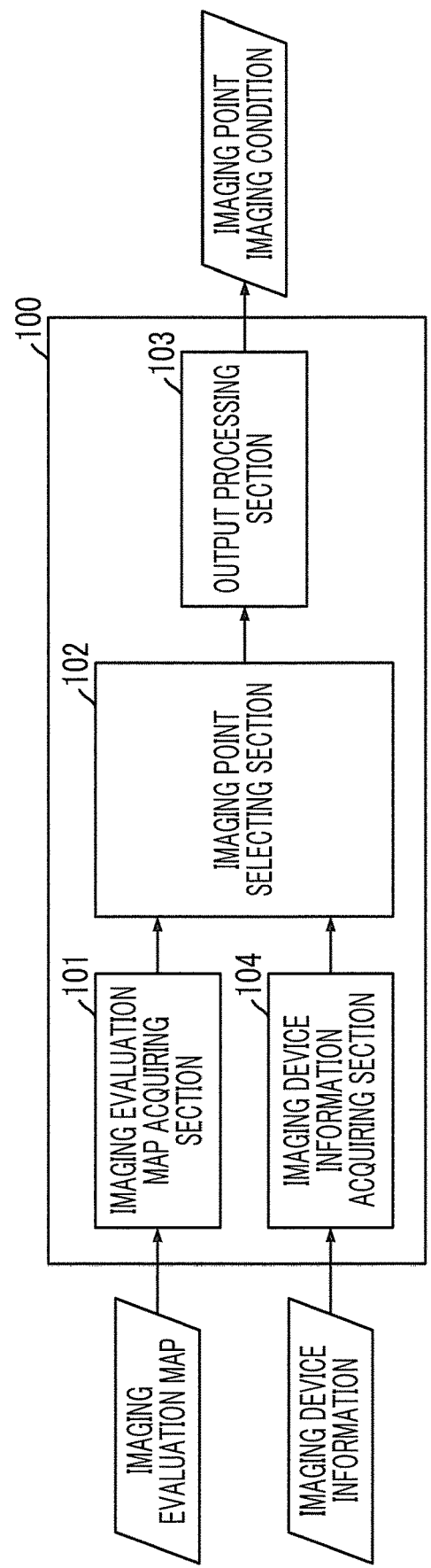
FIG. 25 is a block diagram showing functions realized by an imaging apparatus according to a second embodiment.

FIG. 25 is a block diagram showing functions realized by an imaging apparatus according to a second embodiment.

As shown in the figure, the imaging apparatus 100 according to the present embodiment further includes an imaging device information acquiring section 104 that acquires information on an imaging device to be used, and is different from the imaging apparatus 100 of the first embodiment in that imaging points and imaging conditions are selected in consideration of the information on the imaging device to be used. Accordingly, in the following description, only the differences from the imaging apparatus of the first embodiment will be described.

<Imaging Device Information Acquiring Section>

The imaging device information acquiring section 104 acquires information on an imaging device to be used. Here, the information on the imaging device is information such as specification of the imaging device. For example, in a case where a lens-interchangeable digital camera is used, the information includes a specification of a camera main body and a specification of a lens to be mounted. Information on the specification of the camera main body includes a variety of information on the camera main body that influences imaging, such as image sensor size information, effective pixel number information, settable sensitivity information, settable exposure correction amount information, information on whether or not there is a camera shake correction function, selectable shutter speed information, and continuous imaging speed information. In addition, information on the specification of the lens includes a variety of information on the lens that influences imaging, such as focal length information, settable aperture value information, zoom magnification information, and information on whether or not there is a camera shake correction function.

Further, the information on the imaging device includes information on an available imaging time, the number of images capable of being captured, and an available time. The available imaging time refers to a time during which a motion picture can be captured. The time during which the motion picture can be imaged is determined by the capacity of a medium installed in the imaging device, a recorded image quality, or the like. Further, the number of images capable of being captured refers to the number of still images that can be captured. The number of still images that can be captured depends on the capacity of the medium installed in the imaging device, the recorded image quality, or the like. The available time refers to a time during which the imaging device can be used. The time during which the imaging device can be used is determined by the capacity of a battery installed in the imaging device, or the like.

The imaging device information acquiring section 104 displays a predetermined input screen on the display 22, and receives an input of information on the imaging device to be used. A user inputs the information on the imaging device to be used using the input device such as the keyboard 20 and the mouse 21. The imaging device information acquiring section 104 acquires the input information as the information on the imaging device to be used.

Alternatively, the imaging device information acquiring section 104 receives an input of information on a model of the imaging device to be used (product name, model number, or the like), and acquires the information on the imaging device to be used with reference to a predetermined database.

<Imaging Point Selecting Section>

The imaging point selecting section 102 selects an imaging point suitable for imaging an object and an imaging condition at the point on the basis of an imaging evaluation map acquired by the imaging evaluation map acquiring section 101 and the information on the imaging device acquired by the imaging device information acquiring section 104. That is, the imaging point and the imaging condition suitable for the imaging are selected in consideration of the information on the imaging device. This is because there is a case where imaging cannot be performed depending on the imaging device to be used.

<<Operation of Imaging Apparatus>>

Figure 26:
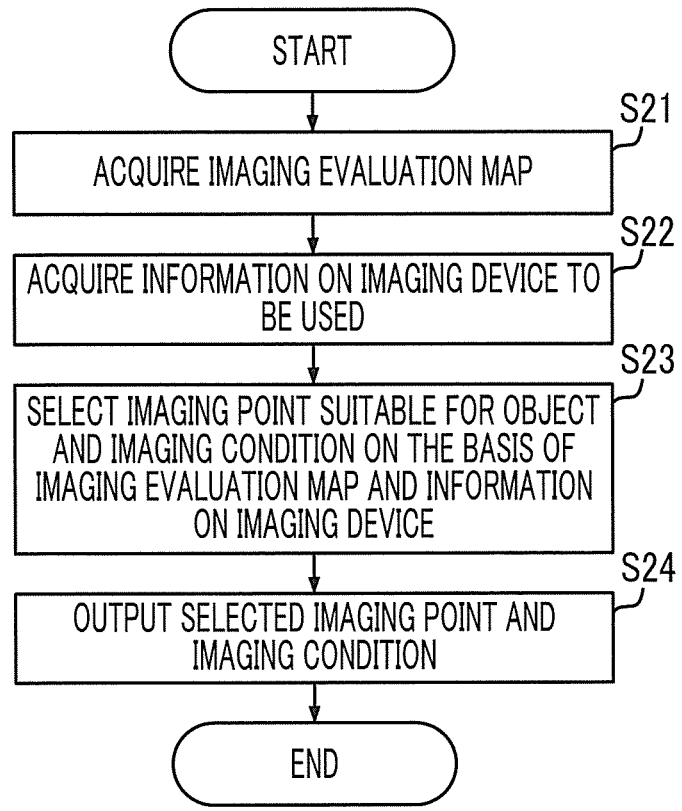
FIG. 26 is a flowchart showing a procedure of a process for selecting and outputting an imaging point and an imaging condition.

FIG. 26 is a flowchart showing a procedure of a process for selecting and outputting an imaging point and an imaging condition.

First, an imaging evaluation map is acquired (step S21). Then, the information on the imaging device to be used is acquired (step S22). Then, on the basis of the acquired imaging evaluation map and information on the imaging device, an imaging point suitable for imaging an object and an imaging condition at the imaging point are selected (step S23). Then, the selected imaging point and imaging condition are output (step S24). A user makes an imaging plan on the basis of information on the output imaging point and imaging condition.

According to the imaging apparatus of the present embodiment, since an imaging point and an imaging condition suitable for imaging are selected in consideration of an imaging device to be used, it is possible to easily make an imaging plan.

Modification Example

The imaging device information acquiring section 104 may be configured to acquire information on a plurality of usable imaging devices and to select and output an imaging point and an imaging condition suitable for imaging on the basis of the acquired information on the plurality of imaging devices.

In this case, the imaging point and the imaging condition suitable for imaging may be selected and output for each imaging device. Further, a configuration in which the most suitable imaging device is selected from the usable imaging devices and the imaging point and the imaging condition suitable for imaging are selected and output on the basis of the selected imaging device may be used.

[Third Embodiment of Imaging Apparatus]

<<Functions Realized by Imaging Apparatus>>

Figure 27:
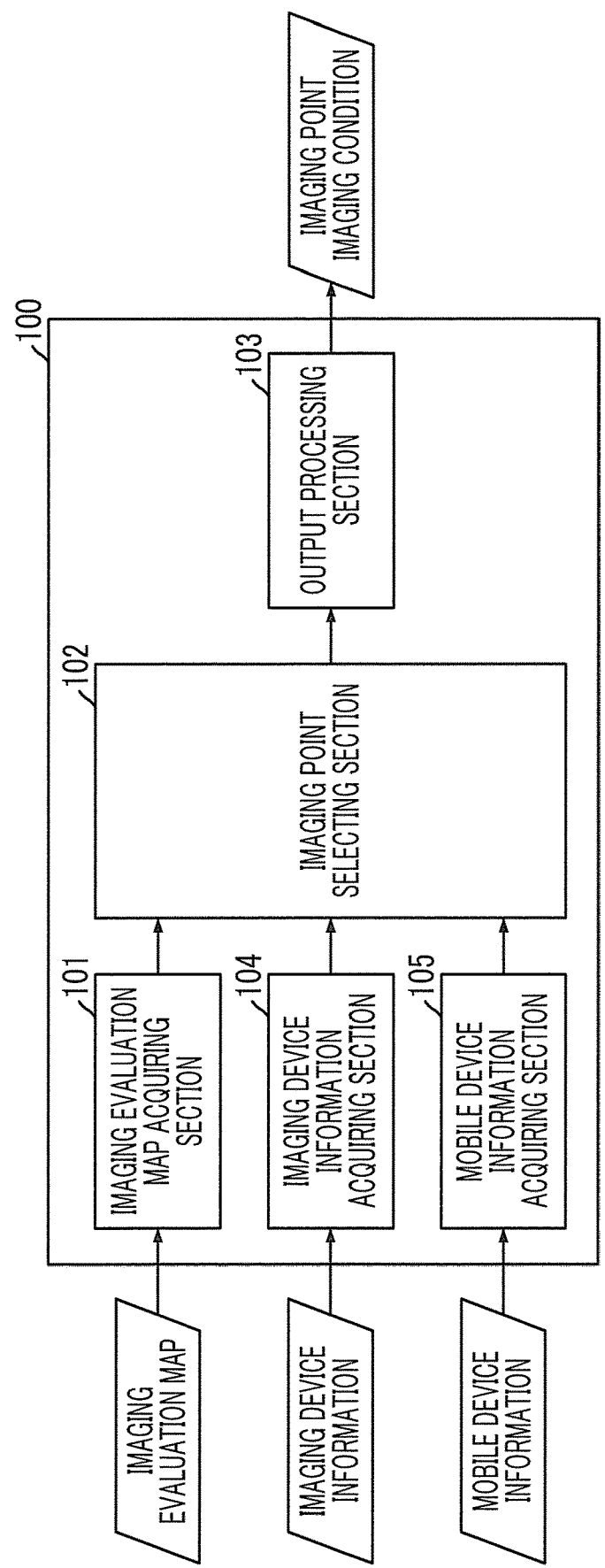
FIG. 27 is a block diagram showing functions realized by an imaging apparatus according to a third embodiment.

FIG. 27 is a block diagram showing functions realized by an imaging apparatus according to a third embodiment.

As shown in the figure, the imaging apparatus 100 according to the present embodiment further includes a mobile device information acquiring section 105 that acquires information on a mobile device to be used, and is different from the imaging device 100 of the second embodiment in that an imaging point and an imaging condition are selected in further consideration of the information on the mobile device to be used. Accordingly, in the following description, only the differences from the imaging apparatus of the second embodiment will be described.

<Mobile Device Information Acquiring Section>

The mobile device information acquiring section 105 acquires information on a mobile device to be used. Here, the mobile device refers to a device for moving the imaging device. For example, in a case where imaging is performed using a drone, the drone is the mobile device. In addition, the mobile device includes a variety of moving units such as an unmanned vehicle, an unmanned ship, or a walking robot. Further, in a case where a person performs handheld imaging, the person becomes the mobile device.

Further, the information on the mobile device includes information on an available time of the mobile device. For example, in the case of a drone, the information on the mobile device includes information on a flight available time. Further, the information on the mobile device includes information on whether or not there is a control function for an imaging direction of a mounted imaging device. That is, the information on the mobile device includes information on whether or not there is a function of switching the imaging direction (a direction of an optical axis of the lens) of the mounted imaging device.

The mobile device information acquiring section 105 displays a predetermined input screen on the display 22, and receives an input of the information on the mobile device to be used. A user inputs the information on the mobile device to be used using the input device such as the keyboard 20 and the mouse 21. The mobile device information acquiring section 105 acquires the input information as the information on the mobile device to be used.

Alternatively, the mobile device information acquiring section 105 receives an input of information on a model (product name, model number, or the like) of the mobile device to be used, and acquires the information on the mobile device to be used with reference to a predetermined database.

<Imaging Point Selecting Section>

The imaging point selecting section 102 selects an imaging point suitable for imaging an object and an imaging condition at the imaging point on the basis of the imaging evaluation map acquired by the imaging evaluation map acquiring section 101, the information on the imaging device acquired by the imaging device information acquiring section 104, and the information on the mobile device acquired by the mobile device information acquiring section 105. That is, the imaging point and the imaging condition suitable for imaging are selected in further consideration of the information on the mobile device. This is because there is a case where imaging cannot be performed depending on the mobile device used.

<<Operation of Imaging Apparatus>>

Figure 28:
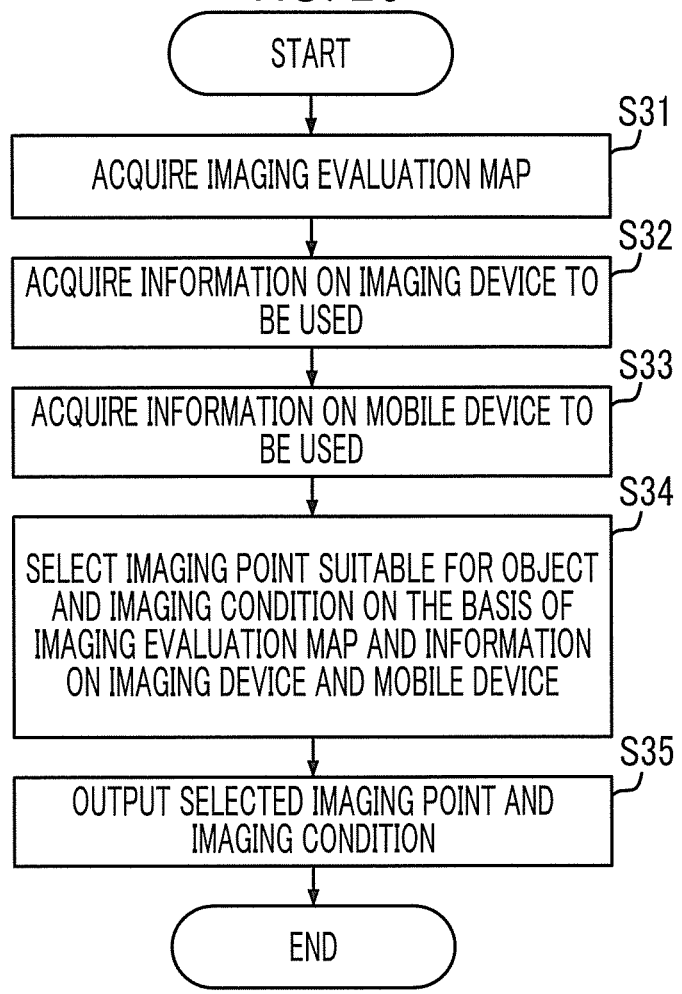
FIG. 28 is a flowchart showing a procedure of a process for selecting and outputting an imaging point and an imaging condition.

FIG. 28 is a flowchart showing a procedure of a process for selecting and outputting an imaging point and an imaging condition.

First, an imaging evaluation map is acquired (step S31). Then, information on an imaging device to be used is acquired (step S32). Then, information on a mobile device to be used is acquired (step S33). Then, on the basis of the acquired imaging evaluation map, and information on the imaging device and mobile device, an imaging point suitable for imaging an object and an imaging condition at the imaging point are selected (step S34). Then, the selected imaging point and imaging condition are output (step S35). A user makes an imaging plan on the basis of information on the output imaging point and imaging condition.

According to the imaging apparatus of the present embodiment, since the imaging points and the imaging condition suitable for imaging are selected and output in further consideration of the mobile device to be used, it is possible to easily make an imaging plan.

Modification Example

The mobile device information acquiring section 105 may be configured to acquire information on a plurality of usable imaging devices and to select and output imaging points and imaging conditions suitable for imaging on the basis of the acquired information on the plurality of mobile devices.

In this case, an imaging point and an imaging condition suitable for imaging may be selected and output for each mobile device. Further, a configuration in which a mobile device most suitable for imaging is selected from the usable mobile devices and an imaging point and an imaging condition suitable for imaging are selected and output on the basis of the selected mobile device may be used.

[Fourth Embodiment of Imaging Apparatus]

<<Functions Realized by Imaging Apparatus>>

Figure 29:
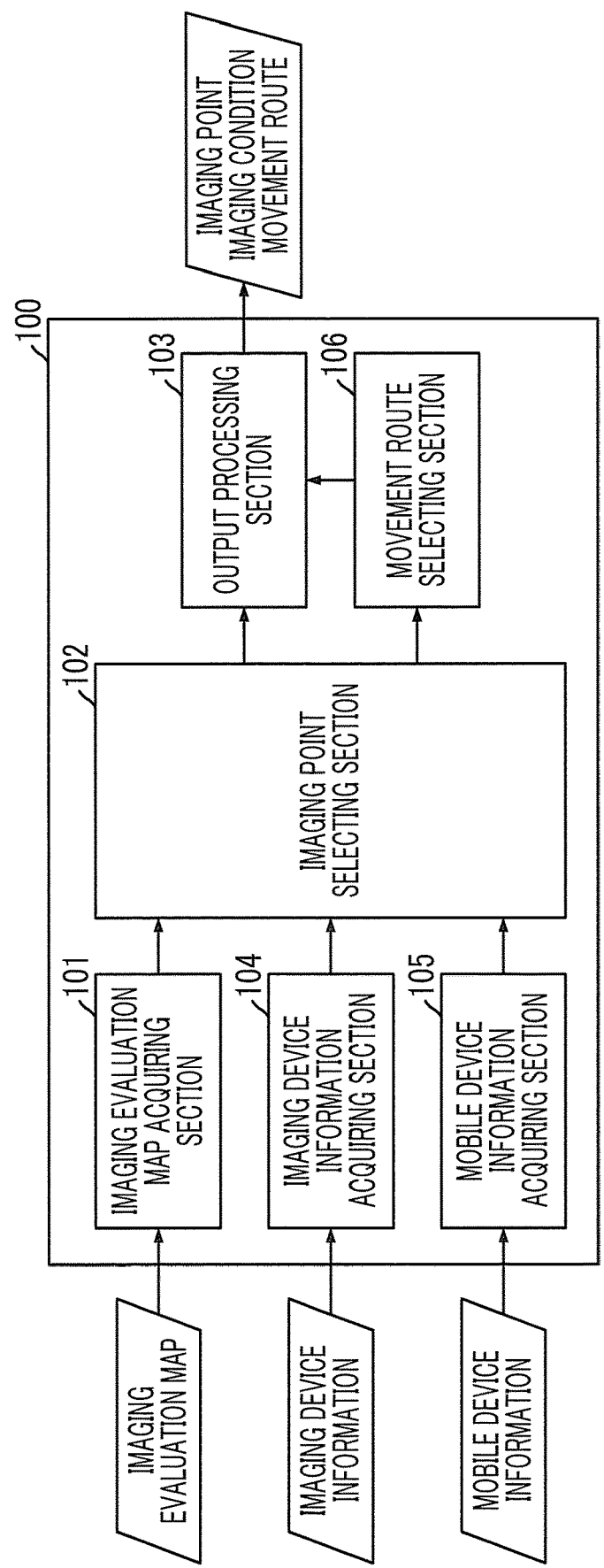
FIG. 29 is a block diagram showing functions realized by an imaging apparatus according to a fourth embodiment.

FIG. 29 is a block diagram showing functions realized by an imaging apparatus according to a fourth embodiment.

As shown in the figure, the imaging apparatus 100 of the present embodiment further includes a movement route selecting section 106 that selects a movement route on the basis of information on an imaging point and an imaging condition that are selected, and in this point, is different from the imaging device 100 according to the third embodiment. Accordingly, in the following description, only the differences from the imaging apparatus of the third embodiment will be described.

<Movement Route Selecting Section>

The movement route selecting section 106 selects a movement route suitable for imaging at each imaging point selected by the imaging point selecting section 102. For the route selection, for example, a known algorithm for solving a combinatorial optimization problem may be employed. For example, an algorithm for solving the traveling salesman problem may be employed to select the movement route.

<Output Processing Section>

The output processing section 103 outputs an imaging point and an imaging condition selected by the imaging point selecting section 102 and the movement route selected by the movement route selecting section 106 in a predetermined output format.

<<Operation of Imaging Apparatus>>

Figure 30:
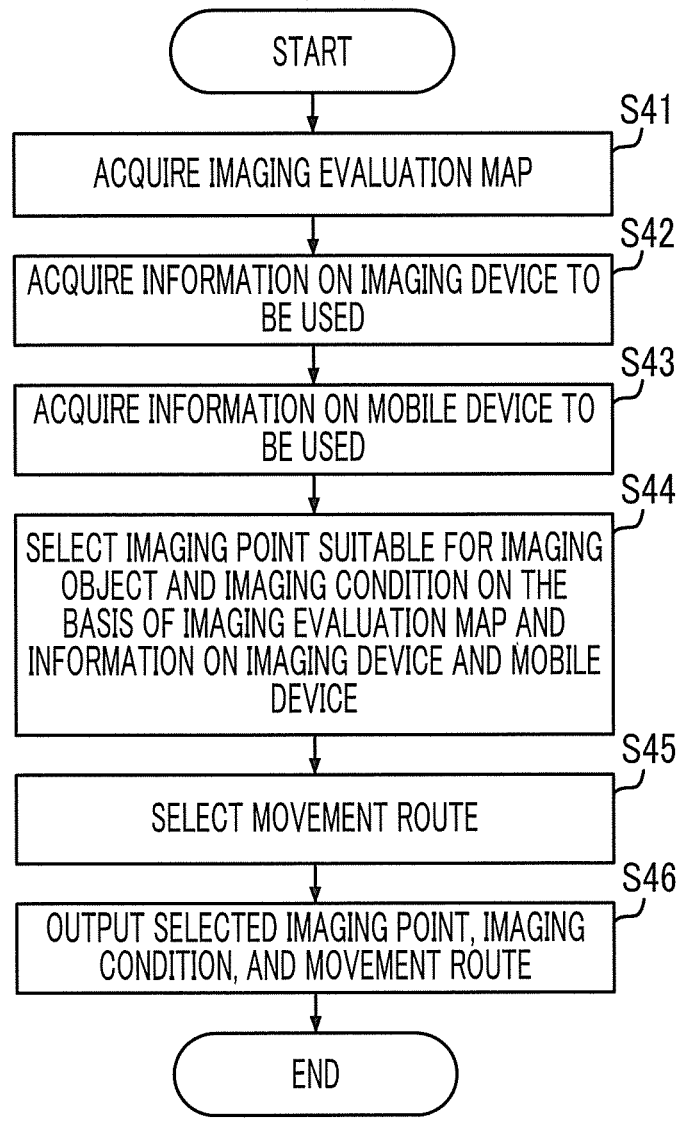
FIG. 30 is a flowchart showing a procedure of a process for selecting and outputting an imaging point, an imaging condition, and a movement route.

FIG. 30 is a flowchart showing a procedure of a process for selecting and outputting an imaging point, an imaging condition, and a movement route.

First, an imaging evaluation map is acquired (step S41). Then, information on an imaging device to be used is acquired (step S42). Then, information on a mobile device to be used is acquired (step S43). Then, on the basis of the acquired imaging evaluation map, and the information on the imaging device and the mobile device, an imaging point suitable for imaging an object and an imaging condition at the imaging point are selected (step S44). Then, a movement route is selected on the basis of the selected imaging point (step S45). Then, the selected imaging point, imaging condition, and movement route are output (step S46).

According to the imaging apparatus of the present embodiment, since the movement route is also automatically generated, it is possible to easily make an imaging plan.

Modification Example

The movement route selected by the movement route selecting section 106 does not necessarily have to pass all of the selected imaging points. An optimum imaging point and imaging condition may be further selected, and the movement route may be selected so that imaging is performed at the selected imaging point and imaging condition. In selecting the optimum imaging point and imaging condition, it is preferable to consider cost (energy consumption), necessary roughness of imaging, or the like.

Further, the movement route selecting section 106 may select a plurality of movement routes. For example, a plurality of movement routes having different costs (energy consumption) or different roughness of imaging may be selected. In a case where the plurality of movement routes are selected, it is preferable that a display order can be changed in accordance with a request from a user.

[Fifth Embodiment of Imaging Apparatus]

<<Functions Realized by Imaging Apparatus>>

Figure 31:
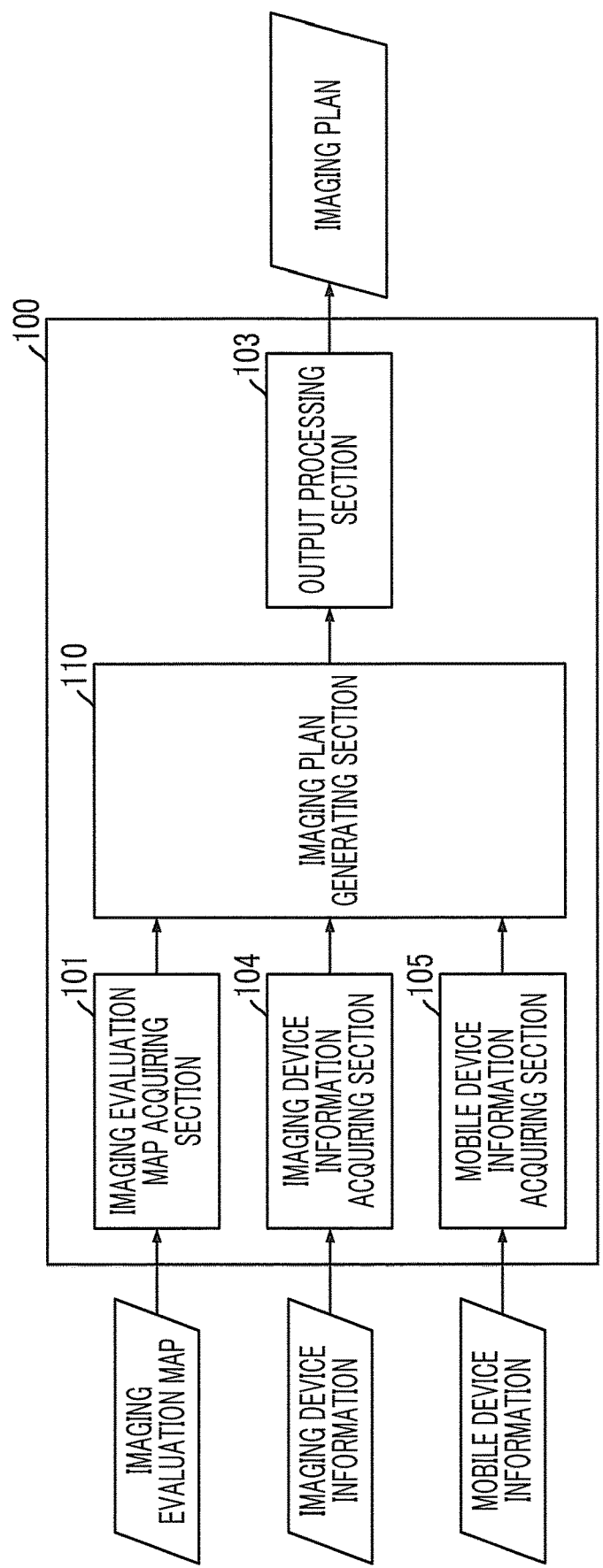
FIG. 31 is a block diagram showing functions realized by an imaging apparatus according to a fifth embodiment.

FIG. 31 is a block diagram showing functions realized by an imaging apparatus according to a fifth embodiment.

As shown in the figure, the imaging apparatus 100 according to the present embodiment includes an imaging evaluation map acquiring section 101 that acquires an imaging evaluation map, an imaging device information acquiring section 104 that acquires information on an imaging device to be used, and a mobile device information acquiring section 105 that acquires information on an imaging device to be used, an imaging plan generating section 110 that creates an imaging plan on the basis of the acquired imaging evaluation map, the information on the imaging device, and the information on the mobile device, and an output processing section 103 that outputs the generated imaging plan.

The functions of the imaging evaluation map acquiring section 101, the imaging device information acquiring section 104, and the mobile device information acquiring section 105 are substantially the same as those of the imaging evaluation map acquiring section 101, the imaging device information acquiring section 104, and the mobile device information acquiring section 105 provided in the imaging apparatus according to the first to third embodiments. Accordingly, in the following description, the imaging plan generating section 110 will be described.

<Imaging Plan Generating Section>

The imaging plan generating section 110 generates an imaging plan on the basis of the acquired imaging evaluation map, information on the imaging device, and information on the mobile device. The imaging plan is generated by selecting an imaging point suitable for imaging, an imaging condition at the imaging point, and a movement route from the imaging evaluation map. The selection of the imaging point and the imaging condition at the imaging point is the same as the process in the imaging point selecting section 102. The selection of the movement route is the same as the process in the movement route selecting section 106.

<Output Processing Section>

The output processing section 103 outputs an imaging plan generated by the imaging plan generating section 110 in a predetermined output format.

<<Operation of Imaging Apparatus>>

Figure 32:
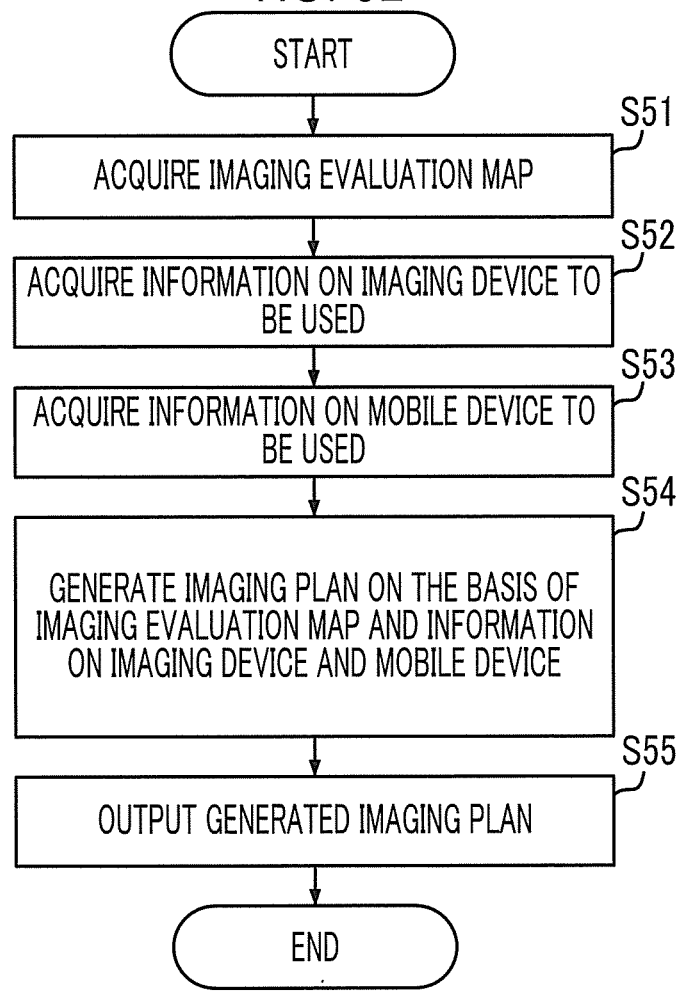
FIG. 32 is a flowchart showing a procedure of a process for generating an imaging plan.

FIG. 32 is a flowchart showing a procedure of a process for generating an imaging plan.

First, an imaging evaluation map is acquired (step S51). Then, information on an imaging device to be used is acquired (step S52). Then, information on a mobile device to be used is acquired (step S53). Then, an imaging plan suitable for imaging an object is generated on the basis of the acquired imaging evaluation map, and information on the imaging device and the mobile device (step S54). Then, the generated imaging plan is output (step S55).

Modification Example

There may be a plurality of imaging plans generated by the imaging plan generating section 110. For example, a plurality of imaging plans having different costs (energy consumption) or different roughness of imaging may be generated. Further, information on a plurality of usable imaging devices and mobile devices may be acquired to generate a plurality of imaging plans. In a case where the plurality of imaging plans are generated, it is preferable that a display order can be changed in accordance with a request from a user.

[Sixth Embodiment of Imaging Apparatus]

<<Functions Realized by Imaging Apparatus>>

Figure 33:
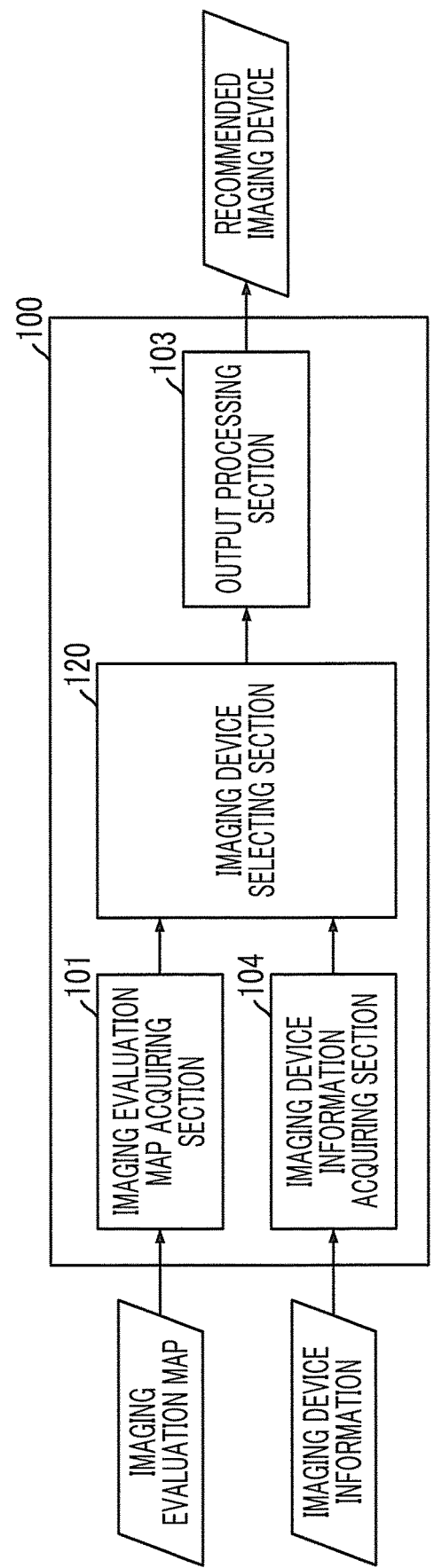
FIG. 33 is a block diagram showing functions realized by an imaging apparatus according to a sixth embodiment.

FIG. 33 is a block diagram showing functions realized by an imaging apparatus according to a sixth embodiment.

The imaging apparatus 100 of the present embodiment automatically selects an imaging device suitable for imaging based on an imaging evaluation map.

As shown in FIG. 33, the imaging apparatus 100 according to the present embodiment has an imaging evaluation map acquiring section 101 that acquires an imaging evaluation map, an imaging device information acquiring section 104 that acquires information on a usable imaging device, an imaging device selecting section 120 that selects an imaging device suitable for imaging on the basis of the acquired imaging evaluation map and the information on the usable imaging device, and an output processing section 103 that outputs information on the selected imaging device.

The functions of the imaging evaluation map acquiring section 101 and the imaging device information acquiring section 104 are substantially the same as those of the imaging evaluation map acquiring section 101 and the imaging device information acquiring section 104 of the imaging apparatus according to the second embodiment. Accordingly, in the following description, only the differences from the imaging apparatus of the second embodiment will be described.

<Imaging Device Selecting Section>

The imaging device selecting section 120 selects an imaging device suitable for imaging on the basis of the imaging evaluation map acquired by the imaging evaluation map acquiring section 101 and the information on the usable imaging device acquired by the imaging device information acquiring section 104. Specifically, an imaging condition with a high evaluation value is extracted, and an imaging device in which imaging can be performed under the extracted imaging condition is selected. For example, higher N imaging conditions with high evaluation values are extracted, and an imaging device in which imaging can be performed under the extracted imaging conditions is selected. Alternatively, an imaging condition having an evaluation value equal to or higher than a threshold value is extracted, and an imaging device in which imaging can be performed under the extracted imaging condition is selected.

<Output Processing Section>

The output processing section 103 outputs the imaging device selected by the imaging device selecting section 120 as a recommended imaging device in a predetermined output format.

<<Operation of Imaging Apparatus>>

Figure 34:
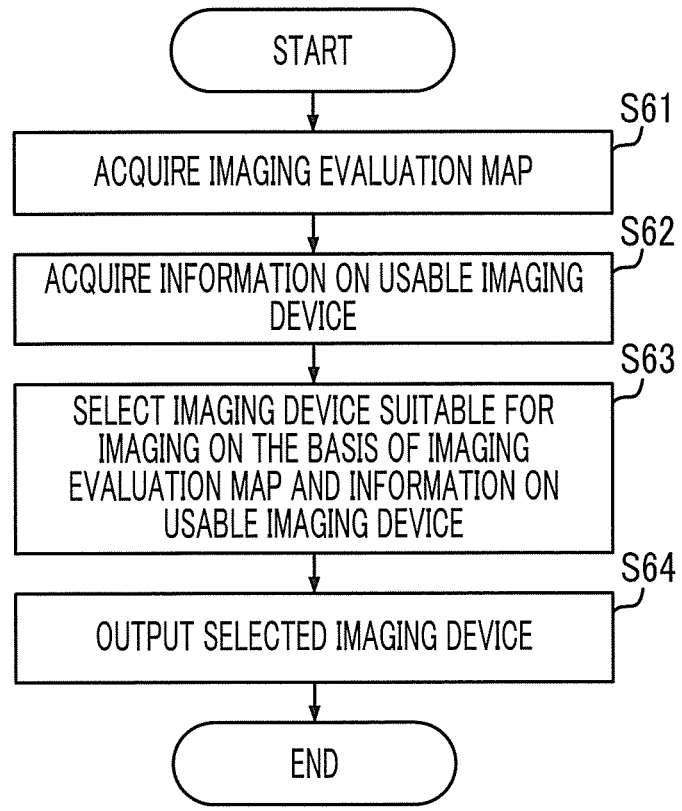
FIG. 34 is a flowchart showing a procedure of a process for selecting a recommended imaging device.

FIG. 34 is a flowchart showing a procedure of a process for selecting a recommended imaging device.

First, an imaging evaluation map is acquired (step S61). Then, information on a usable imaging device is acquired (step S62). At least one piece of information on the usable imaging device is acquired. Then, on the basis of the acquired imaging evaluation map and information on the usable imaging device, an imaging device suitable for imaging an object is selected (step S63). Then, the selected imaging device is output as a recommended imaging device (step S64).

Modification Example

The imaging device selecting section 120 may select a plurality of imaging devices. In this case, it is preferable to select the plurality of imaging devices in ranks. Further, information on mobile devices to be used in combination may be acquired, and imaging devices may be selected in consideration of the acquired information on the mobile devices.

[Seventh Embodiment of Imaging Apparatus]

<<Functions Realized by Imaging Apparatus>>

Figure 35:
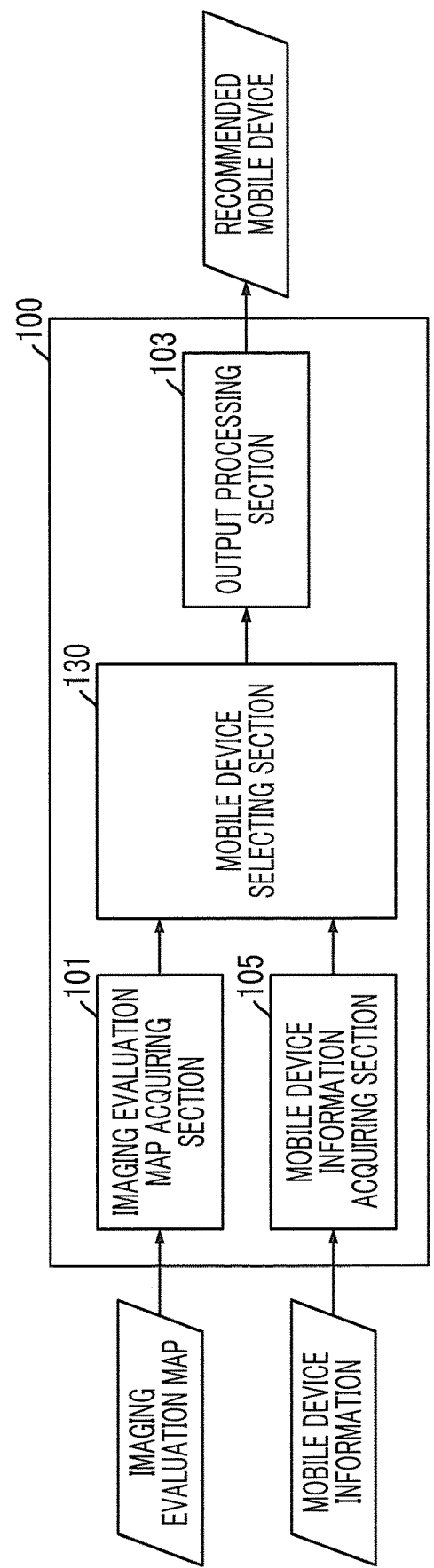
FIG. 35 is a block diagram showing functions realized by an imaging apparatus according to a seventh embodiment.

FIG. 35 is a block diagram showing functions realized by an imaging apparatus according to a seventh embodiment.

The imaging apparatus 100 according to the present embodiment automatically selects a mobile device suitable for imaging on the basis of an imaging evaluation map.

As shown in FIG. 35, the imaging apparatus 100 according to the present embodiment includes an imaging evaluation map acquiring section 101 that acquires an imaging evaluation map, a mobile device information acquiring section 105 that acquires information on a plurality of usable mobile devices, a mobile device selecting section 130 that selects a mobile device suitable for imaging on the basis of the acquired imaging evaluation map and information on the usable mobile device, and an output processing section 103 that outputs information on the selected mobile device.

The functions of the imaging evaluation map acquiring section 101 and the mobile device information acquiring section 105 are substantially the same as those of the imaging evaluation map acquiring section 101 and the mobile device information acquiring section 105 of the imaging apparatus according to the third embodiment. Accordingly, in the following description, only the differences from the imaging apparatus of the third embodiment will be described.

<Mobile Device Selecting Section>

The mobile device selecting section 130 selects a mobile device suitable for imaging on the basis of the imaging evaluation map acquired by the imaging evaluation map acquiring section 101 and the information on the usable mobile device acquired by the mobile device information acquiring section 105. Specifically, an imaging condition with a high evaluation value is extracted, and a mobile device in which imaging can be performed under the extracted imaging condition is selected. For example, higher N imaging conditions with high evaluation values are extracted, and a mobile device in which imaging can be performed under the extracted imaging conditions is selected. Alternatively, an imaging condition having an evaluation value equal to or higher than a threshold value is extracted, and a mobile device in which imaging can be performed under the extracted imaging condition is selected.

<Output Processing Section>

The output processing section 103 outputs the mobile device selected by the mobile device selecting section 130 as a recommended mobile device in a predetermined output format.

<<Operation of Imaging Apparatus>>

Figure 36:
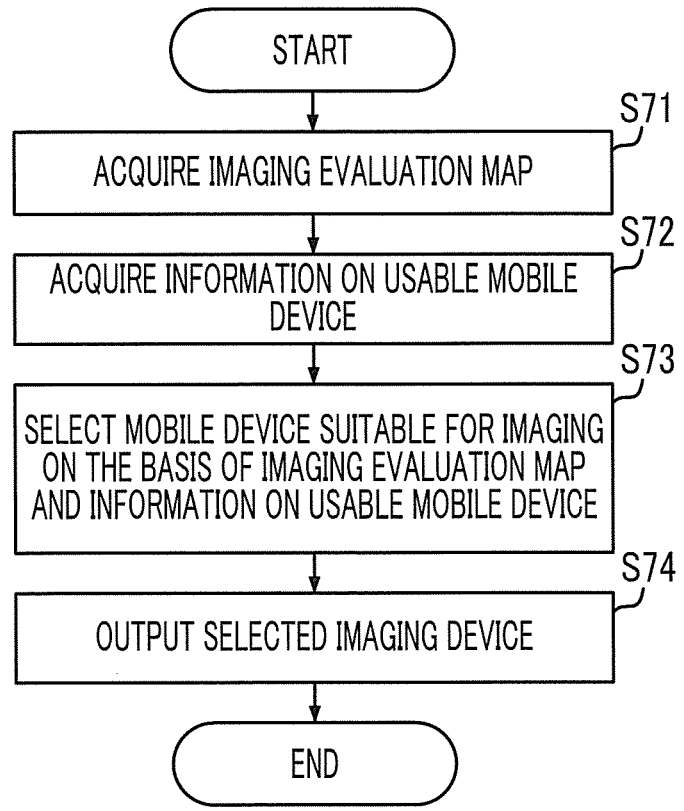
FIG. 36 is a flowchart showing a procedure of a process for selecting a recommended mobile device.

FIG. 36 is a flowchart showing a procedure of a process for selecting a recommended mobile device.

First, an imaging evaluation map is acquired (step S71). Then, information on a usable mobile device is acquired (step S72). At least one piece of information on the usable mobile device is acquired. Then, on the basis of the acquired imaging evaluation map and information on the usable mobile device, a mobile device suitable for imaging an object is selected (step S73). Then, the selected mobile device is output as a recommended mobile device (step S74).

Modification Example

There may be a plurality of mobile devices selected by the mobile device selecting section 130. In this case, it is preferable to select the plurality of imaging devices in ranks. Further, information on imaging devices to be used in combination may be acquired, and mobile devices may be selected in consideration of the obtained information on the imaging devices.

[Eighth Embodiment of Imaging Apparatus]

<<Functions Realized by Imaging Apparatus>>

Figure 37:
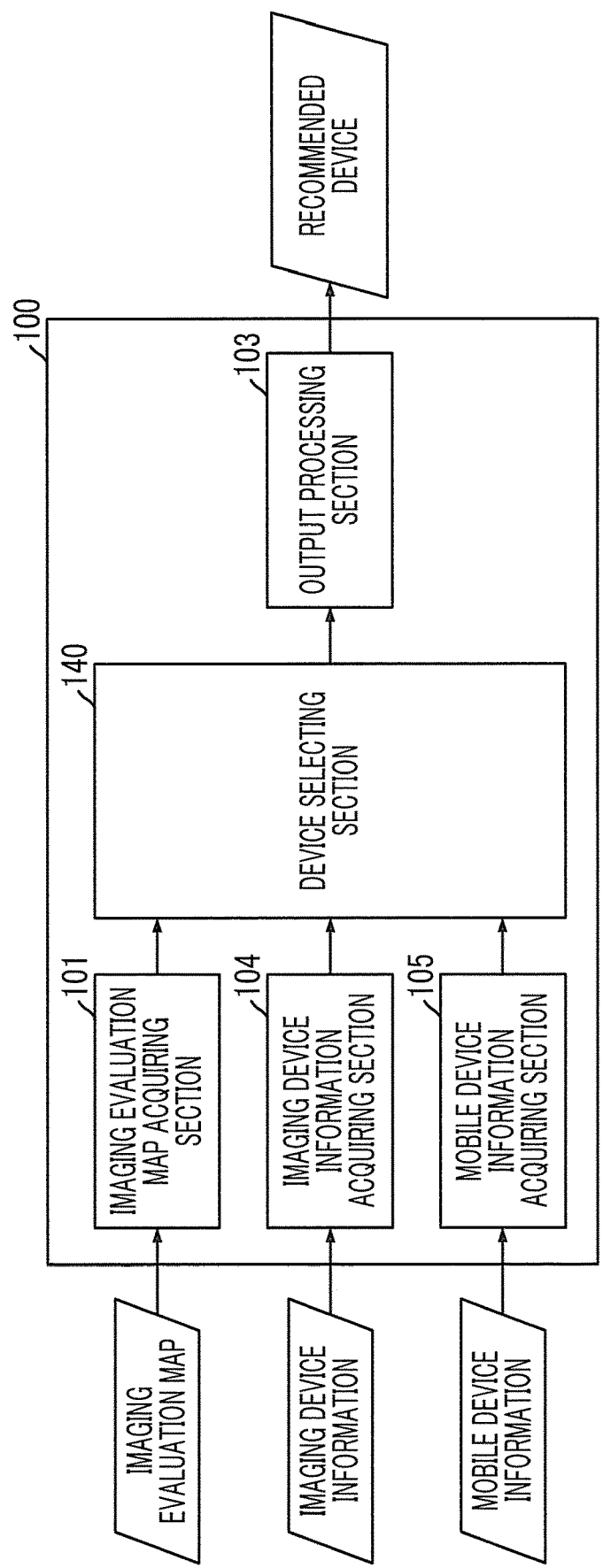
FIG. 37 is a block diagram showing functions realized by an imaging apparatus according to an eighth embodiment.

FIG. 37 is a block diagram showing functions realized by an imaging apparatus according to an eighth embodiment.

The imaging apparatus 100 according to the present embodiment automatically selects an imaging device and a mobile device suitable for imaging on the basis of an imaging evaluation map.

As shown in FIG. 37, the imaging apparatus 100 according to the present embodiment includes an imaging evaluation map acquiring section 101 that acquires an imaging evaluation map, an imaging device information acquiring section 104 that acquires information on a usable imaging device, a mobile device information acquiring section 105 that acquires information on a usable mobile device, and a device selecting section 140 that selects a combination of an imaging device and a mobile device suitable for imaging, on the basis of the acquired imaging evaluation map, and information on the usable imaging device and mobile device.

The functions of the imaging evaluation map acquiring section 101, the imaging device information acquiring section 104, and the mobile device information acquiring section 105 are substantially the same as the imaging evaluation map acquiring section 101, the imaging device information acquiring section 104, and the mobile device information acquiring section 105 of the imaging apparatus according to the third embodiment. Accordingly, in the following description, only the differences from the imaging apparatus of the third embodiment will be described.

<Device Selecting Section>

The device selecting section 140 selects a combination of an imaging device and a mobile device suitable for imaging, on the basis of the imaging evaluation map acquired by the imaging evaluation map acquiring section 101, the information on the usable imaging device acquired by the imaging device information acquiring section 104, and the information on the usable mobile device acquired by the mobile device information acquiring section 105. Specifically, the device selecting section 140 extracts an imaging condition with a high evaluation value, and selects a combination of an imaging device and a mobile device in which imaging can be performed under the extracted imaging condition. For example, the device selecting section 140 extracts higher N imaging conditions with high evaluation values, and selects a combination of an imaging device and a mobile device in which imaging can be performed under the extracted imaging conditions. Alternatively, the device selecting section 140 extracts an imaging condition having an evaluation value equal to or higher than a threshold value, and selects a combination of an imaging device and a mobile device in which imaging can be performed under the extracted imaging condition.

<Output Processing Section>

The output processing section 103 outputs the combination of the imaging device and the mobile device selected by the mobile device selecting section 130 as a recommended device in a predetermined output format.

<<Operation of Imaging Apparatus>>

Figure 38:
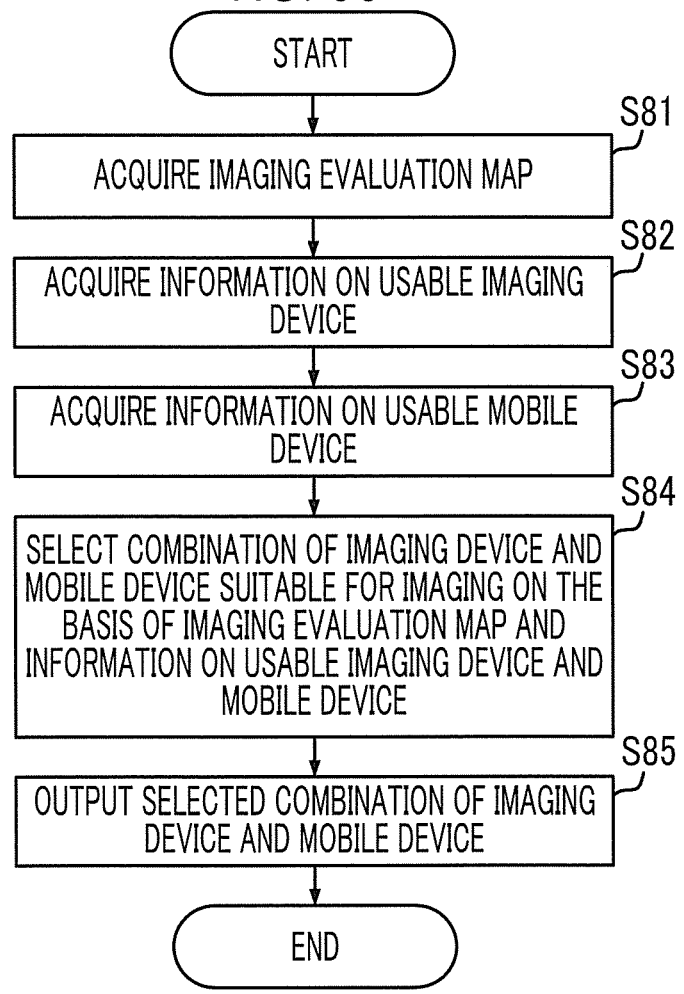
FIG. 38 is a flowchart showing a procedure of a process for selecting recommended device.

FIG. 38 is a flowchart showing a procedure of a process for selecting a recommended device.

First, an imaging evaluation map is acquired (step S81). Then, information on a usable imaging device is acquired (step S82). At least one piece of information on the usable imaging device is acquired. Then, information on a usable mobile device is acquired (step S83). At least one piece of information on the usable mobile device is acquired. Then, on the basis of the acquired imaging evaluation map and information on the usable imaging device and the usable mobile device, a combination of an imaging device and a mobile device suitable for imaging an object is selected (step S84). Then, the selected combination of the imaging device and the mobile device is output as a recommended device (step S85).

Modification Example

There may be a plurality of combinations of imaging devices and mobile devices selected by the device selecting section 140. In this case, it is preferable to select the plurality of imaging devices in ranks.

◆◆Imaging System◆◆

In the following description, a system that automatically performs imaging according to conditions (an imaging point, an imaging condition at the imaging point, and a movement route) selected by the imaging apparatus or an imaging plan will be described.

[Imaging system] Here, an example will be described in which imaging is performed using a drone for the purpose of inspecting a structure such as a bridge.

Figure 39:
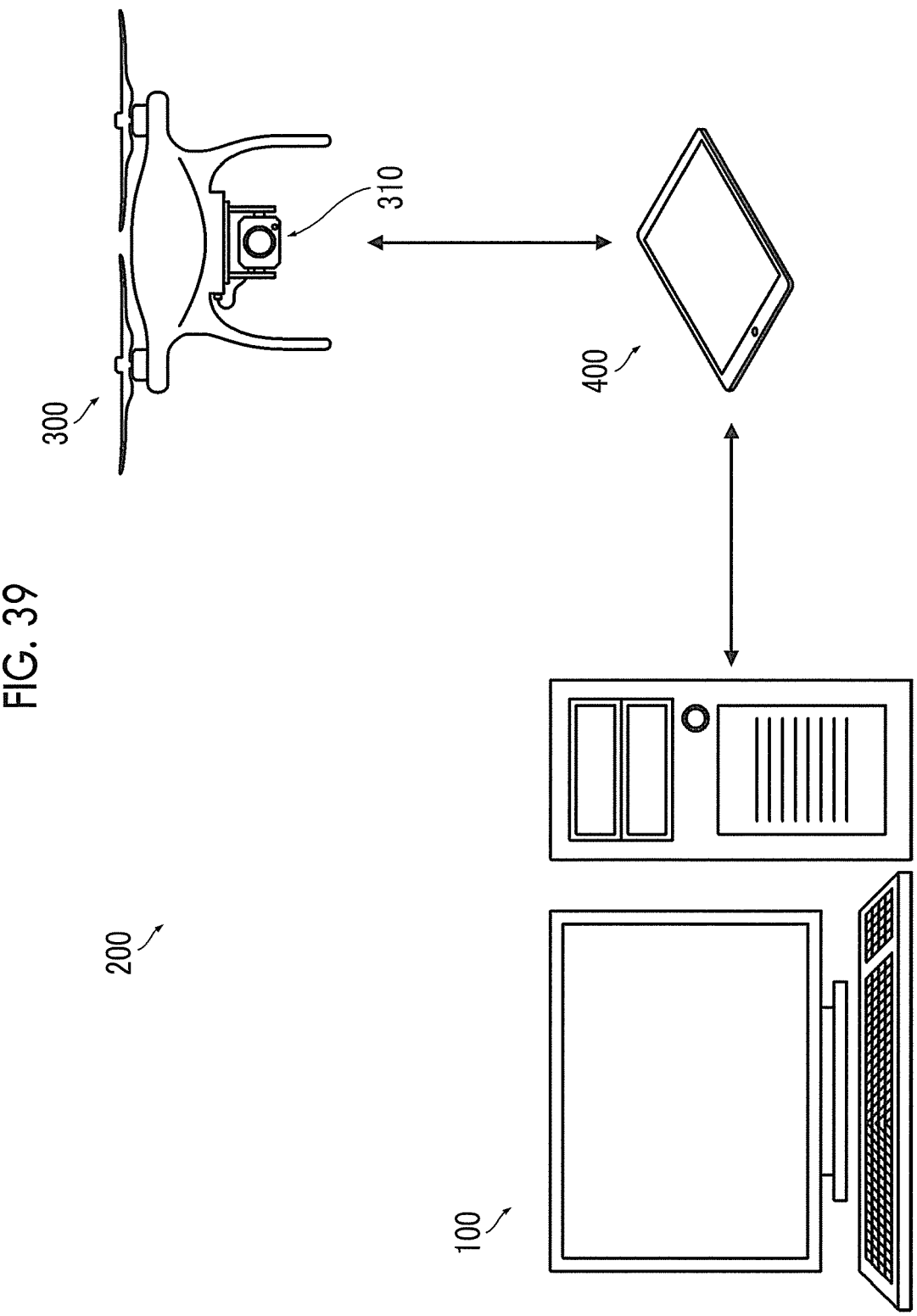
FIG. 39 is a diagram showing an example of a system configuration of an imaging system.

FIG. 39 is a diagram showing an example of a system configuration of an imaging system.

As shown in the figure, an imaging system 200 of the present embodiment includes an imaging apparatus 100, a drone 300, and a control terminal 400.

<<Imaging Apparatus>>

The imaging apparatus 100 generates an imaging plan from an imaging evaluation map of an object that is an inspection target. In this example, since the object that is the inspection target is imaged by the drone, the imaging plan is generated using the drone 300 as a mobile device and an imaging unit provided in the drone 300 as an imaging device.

<<Drone>>

The drone 300 is an example of an autonomous mobile robot including an imaging unit 310. The drone 300 is configured to be able to automatically fly on the basis of a designated flight path and to be able to automatically perform imaging under a designated condition. Since an autonomous mobile robot (autonomous flying robot) such as a drone having such functions is known, a description of its specific configuration will be omitted.

<<Control Terminal>>

The control terminal 400 is an example of an imaging control device. The control terminal 400 controls flight and imaging of the drone 300. Specifically, information on an imaging point, an imaging condition, and a movement route is acquired from the imaging apparatus as imaging control information, and the flight and imaging of the drone 300 are controlled on the basis of the acquired imaging control information. Alternatively, information on an imaging plan including the information on the imaging point, the imaging condition, and the movement route is acquired from the imaging apparatus, and the flight and imaging of the drone 300 are controlled on the basis of the information on the acquired imaging plan.

The control terminal 400 is configured of, for example, a portable computer (tablet computer, notebook computer, or the like) having a wireless communication function, communicates with the drone 300 in a wireless manner, and transmits and receives a variety of information including control information.

The control terminal 400 includes a monitor, and displays an image captured by the drone 300 during flight in real time as necessary.

[Operation of imaging system] FIG. 40 is a flowchart showing a procedure of a process for imaging by the imaging system.

First, an imaging evaluation map generating device 1 generates an imaging evaluation map of an inspection target (step S91). The imaging evaluation map is generated for the purpose of inspection. Accordingly, a characteristic part, an evaluation standard set for each characteristic part, an imaging condition, and the like are set for the purpose of inspection.

Then, an imaging plan is generated on the basis of the obtained imaging evaluation map (step S92). The imaging apparatus 100 acquires an imaging evaluation map of an inspection target, and generates an imaging plan suitable for imaging of the inspection target. The imaging plan includes information on an imaging point, an imaging condition at the imaging point, and a movement route.

In generating the imaging plan, the imaging apparatus 100 acquires information on an imaging device and a mobile device to be used, and generates the imaging plan. In this example, information on the imaging unit 310 included in the drone 300 is acquired as the information on the imaging device. Further, the information on the drone 300 is acquired as the information on the mobile device. The imaging apparatus 100 generates an imaging plan suitable for imaging using the drone 300 from the imaging evaluation map. The imaging may be imaging of a still image or imaging of a motion picture. Further, the imaging may be imaging for combination of a still image and a motion picture.

Then, imaging is performed on the basis of the generated imaging plan (step S93). The control terminal 400 acquires information on the generated imaging plan, controls the drone 300 on the basis of the acquired imaging plan, and performs imaging according to the generated imaging plan. That is, the imaging is performed at a set imaging point under a set imaging condition while moving (flight) according to a set movement route.

As described above, according to the imaging system of the present embodiment, it is possible to make an imaging plan and perform actual imaging in an automatic way.

Modification Example

In the above-described embodiment, an example in which imaging is performed using a drone has been described, but the imaging device and the mobile device to be used may be appropriately changed.

Further, in the above embodiment, a configuration in which the imaging control device (control terminal 400) and the autonomous mobile robot (drone 300) are separately provided has been described, but a configuration in which the autonomous mobile robot is integrally provided with the function of the imaging control device may be used.

In addition, in generating an imaging plan, a plan for performing imaging in multiple times may be created. In this case, an imaging evaluation map to be used may be switched. For example, a weight to be given to each characteristic part may be changed whenever imaging is performed.

Further, the imaging plan may be generated by feeding back a result of previous imaging. For example, with respect to a characteristic part once imaged under a condition with high satisfaction, it may be interpreted that the desire for imaging is satisfied, and a weight to be multiplied by the overall evaluation may be reduced.

Other Embodiments

In the above embodiments, the functions realized by the computer may be realized by various processors. The various processors may include a CPU which is a general-purpose processor that executes programs and functions as a variety of processing units, a programmable logic device (PLD) of which a circuit configuration is changeable after manufacturing, such as a field programmable gate array (FPGA), a dedicated electric circuit that is a processor having a circuit configuration that is dedicatedly designed for executing a specific process, such as an application specific integrated circuit (ASIC), or the like.

One function may be configured by the same type or different types of two or more processors. For example, one function may be configured by plural FPGAs or a combination of a CPU and an FPGA.

Further, a plurality of functions may be configured by one processor. As an example in which the plurality of functions are configured by one processor, first, as represented by a computer such as a client or a server, a configuration in which a combination of one or more CPUs and software forms one processor and this processor functions as a plurality of functions may be employed. Second, as represented by a system-on-chip (SoC) or the like, a configuration in which a processor for realizing a plurality of processing units using one integrated circuit (IC) chip is used may be employed. As described above, the various functions are configured using one or more of the above-described various processors as a hardware structure.

Further, as the hardware structure of the various processors is, more specifically, electric circuitry in which circuit elements such as semiconductor elements are combined.

EXPLANATION OF REFERENCES

1: Imaging evaluation map generating device
2: Network
10: CPU (Central Processing Unit)
11: ROM (Read Only Memory)
12: RAM (Random Access Memory)
13: Hard disk drive (HDD)
14: Optical disc drive
15: Communication interface
16: Input/output interface
20: Keyboard
21: Mouse
22: Display
23: Printer
31: Coordinate space setting section
32: Imaging candidate position setting section
33: Imaging condition setting section
34: Characteristic part setting section
35: Evaluation standard setting section
36: Evaluation value calculating section
37: Imaging evaluation map generating section
38: Imaging evaluation map output processing section
100: Imaging apparatus
101: Imaging evaluation map acquiring section
102: Imaging point selecting section 103: Output processing section
104: Imaging device information acquiring section
105: Mobile device information acquiring section
106: Movement route selecting section
110: Imaging plan generating section
120: Imaging device selecting section
130: Mobile device selecting section
140: Device selecting section
200: Imaging system
300: Drone
310: Imaging unit
400: Control terminal
B: Block
CP1: First characteristic part
CP2: Second characteristic part
CS: Coordinate space
OB: Object
S: Limited space
S1 to S9: Procedure of generating imaging evaluation map
S10 to S15: Procedure of calculating evaluation value
S21 to S24: Procedure of process for selecting and outputting imaging point and imaging condition
S31-S35: Procedure of process for selecting and outputting imaging point and imaging condition
S41 to S46: Procedure of process for selecting imaging point and imaging condition, and movement route
S51 to S55: Procedure of process for generating imaging plan
S61 to S64: Procedure of process for selecting recommended imaging device
S71 to S74: Procedure of process for selecting recommended mobile device
S81-S85: Recommended device selecting process
S91 to S93: Processing procedure of imaging by imaging system
S101 to S103: Procedure of process for selecting and outputting imaging point and imaging condition

What is claimed is:

1. An imaging apparatus comprising:
an imaging evaluation map acquiring section that acquires an imaging evaluation map in which an evaluation value that represents an evaluation of imaging in a case where an object is imaged at a specific position under a specific imaging condition is determined at a plurality of imaging candidate positions for each of a plurality of imaging conditions, wherein the plurality of imaging conditions comprise a plurality of imaging directions;
an imaging device information acquiring section that acquires information on an imaging device to be used; and
an imaging point selecting section that selects an imaging point suitable for imaging the object and an imaging condition at the imaging point on the basis of the acquired imaging evaluation map and the information on the imaging device,
wherein the information on the imaging device comprises an available time which is a time during which the imaging device can be used based on a capacity of a battery installed in the imaging device,
wherein the evaluation value for each imaging condition at each imaging candidate position is calculated by setting a plurality of characteristic parts on the object, setting an evaluation standard of imaging based on the imaging candidate positions and the imaging conditions for each characteristic part, calculating individual evaluation values for the respective characteristic parts according to the evaluation standard, and calculating a sum of the obtained individual evaluation values for the respective characteristic parts,
wherein, in a case where a three-dimensional shape of the object is used as the characteristic part, information on vertices, ridges, or the like is acquired from at a time of design of a structure of the object, and is set as the characteristic part.

2. The imaging apparatus according to claim 1, wherein the imaging device information acquiring section acquires information on the plurality of imaging devices that are usable.

3. The imaging apparatus according to claim 1, wherein the information on the imaging device acquired by the imaging device information acquiring section includes at least one piece of information on an available imaging time or the number of images capable of being captured.

4. The imaging apparatus according to claim 1, further comprising:
a mobile device information acquiring section that acquires information on a mobile device to be used,
wherein the imaging point selecting section selects the imaging point suitable for imaging the object and the imaging condition at the imaging point on the basis of the acquired imaging evaluation map, information on the imaging device, and information on the mobile device.

5. The imaging apparatus according to claim 4, wherein the mobile device information acquiring section acquires information on the plurality of mobile devices that are usable.

6. The imaging apparatus according to claim 4, wherein the information on the mobile device acquired by the mobile device information acquiring section includes information on an available time.

7. The imaging apparatus according to claim 1, further comprising:
a movement route selecting section that selects a movement route suitable for imaging at each of the selected imaging points.

8. An imaging system comprising:
an autonomous mobile robot provided with an imaging unit; and
an imaging control device that acquires information on an imaging point, an imaging condition, and a movement route selected by the imaging apparatus according to claim 1 as imaging control information, and controls the autonomous mobile robot on the basis of the acquired imaging control information.

9. An imaging apparatus comprising:
an imaging evaluation map acquiring section that acquires an imaging evaluation map in which an evaluation value that represents an evaluation of imaging in a case where an object is imaged at a specific position under a specific imaging condition is determined at a plurality of imaging candidate positions for each of a plurality of imaging conditions, wherein the plurality of imaging conditions comprise a plurality of imaging directions;
an imaging device information acquiring section that acquires information on a plurality of usable imaging devices; and
an imaging device selecting section that selects the imaging device suitable for imaging the object on the basis of the acquired imaging evaluation map and information on the imaging device, wherein the information on the plurality of usable imaging devices comprises an available time which is a time during which the plurality of usable imaging devices can be used based on a capacity of a battery installed in each of the plurality of usable imaging devices, wherein the evaluation value for each imaging condition at each imaging candidate position is calculated by setting a plurality of characteristic parts on the object, setting an evaluation standard of imaging based on the imaging candidate positions and the imaging conditions for each characteristic part, calculating individual evaluation values for the respective characteristic parts according to the evaluation standard, and calculating a sum of the obtained individual evaluation values for the respective characteristic parts, wherein, in a case where a three-dimensional shape of the object is used as the characteristic part, information on vertices, ridges, or the like is acquired from at a time of design of a structure of the object, and is set as the characteristic part.

10. An imaging apparatus comprising:

an imaging evaluation map acquiring section that acquires an imaging evaluation map in which an evaluation value that represents an evaluation of imaging in a case where an object is imaged at a specific position under a specific imaging condition is determined at a plurality of imaging candidate positions for each of a plurality of imaging conditions, wherein the plurality of imaging conditions comprise a plurality of imaging directions;

a mobile device information acquiring section that acquires information on a plurality of usable mobile devices;

an imaging device information acquiring section that acquires information on an imaging device to be used; and a mobile device selecting section that selects the mobile device suitable for imaging the object on the basis of the acquired imaging evaluation map, the information on the imaging device and information on the mobile device, wherein the information on the imaging device comprises an available time which is a time during which the imaging device can be used based on a capacity of a battery installed in the imaging device, wherein the evaluation value for each imaging condition at each imaging candidate position is calculated by setting a plurality of characteristic parts on the object, setting an evaluation standard of imaging based on the imaging candidate positions and the imaging conditions for each characteristic part, calculating individual evaluation values for the respective characteristic parts according to the evaluation standard, and calculating a sum of the obtained individual evaluation values for the respective characteristic parts, wherein, in a case where a three-dimensional shape of the object is used as the characteristic part, information on vertices, ridges, or the like is acquired from at a time of design of a structure of the object, and is set as the characteristic part.

11. An imaging apparatus comprising:

an imaging evaluation map acquiring section that acquires an imaging evaluation map in which an evaluation value that represents an evaluation of imaging in a case where an object is imaged at a specific position under a specific imaging condition is determined at a plurality of imaging candidate positions for each of a plurality of imaging conditions, wherein the plurality of imaging conditions comprise a plurality of imaging directions;

an imaging device information acquiring section that acquires information on a usable imaging device;

a mobile device information acquiring section that acquires information on a usable mobile device; and an imaging plan generating section that generates an imaging plan suitable for imaging the object, on the basis of the acquired imaging evaluation map, information on the imaging device, and information on the mobile device, wherein the information on the imaging device comprises an available time which is a time during which the imaging device can be used based on a capacity of a battery installed in the imaging device, wherein the evaluation value for each imaging condition at each imaging candidate position is calculated by setting a plurality of characteristic parts on the object, setting an evaluation standard of imaging based on the imaging candidate positions and the imaging conditions for each characteristic part, calculating individual evaluation values for the respective characteristic parts according to the evaluation standard, and calculating a sum of the obtained individual evaluation values for the respective characteristic parts, wherein, in a case where a three-dimensional shape of the object is used as the characteristic part, information on vertices, ridges, or the like is acquired from at a time of design of a structure of the object, and is set as the characteristic part.

12. The imaging apparatus according to claim 11, wherein the imaging plan includes a movement route, an imaging point, and an imaging condition at the imaging point.

13. An imaging system comprising:

an autonomous mobile robot provided with an imaging unit; and an imaging control device that acquires information on the imaging plan generated by the imaging apparatus according to claim 11, and controls the autonomous mobile robot on the basis of the acquired imaging plan.

14. An imaging method comprising:

a step of acquiring an imaging evaluation map in which an evaluation value that represents an evaluation of imaging in a case where an object is imaged at a specific position under a specific imaging condition is determined at a plurality of imaging candidate positions for each of a plurality of imaging conditions, wherein the plurality of imaging conditions comprise a plurality of imaging directions;

a step of acquiring section that acquires information on an imaging device to be used; and a step of selecting an imaging point suitable for imaging the object and an imaging condition at the imaging point on the basis of the acquired imaging evaluation map and the information on the imaging device, wherein the information on the imaging device comprises an available time which is a time during which the imaging device can be used based on a capacity of a battery installed in the imaging device, wherein the evaluation value for each imaging condition at each imaging candidate position is calculated by setting a plurality of characteristic parts on the object, setting an evaluation standard of imaging based on the imaging candidate positions and the imaging conditions for each characteristic part, calculating individual evaluation values for the respective characteristic parts according to the evaluation standard, and calculating a sum of the obtained individual evaluation values for the respective characteristic parts, wherein, in a case where a three-dimensional shape of the object is used as the characteristic part, information on vertices, ridges, or the like is acquired from at a time of design of a structure of the object, and is set as the characteristic part.

15. An imaging method comprising:

a step of acquiring an imaging evaluation map in which an evaluation value that represents an evaluation of imaging in a case where an object is imaged at a specific position under a specific imaging condition is determined at a plurality of imaging candidate positions for each of a plurality of imaging conditions, wherein the plurality of imaging conditions comprise a plurality of imaging directions;

a step of acquiring information on a plurality of usable imaging devices; and a step of selecting the imaging device suitable for imaging the object, on the basis of the acquired imaging evaluation map and information on the imaging device, wherein the information on the plurality of usable imaging devices comprises an available time which is a time during which the plurality of usable imaging devices can be used based on a capacity of a battery installed in each of the plurality of usable imaging devices, wherein the evaluation value for each imaging condition at each imaging candidate position is calculated by setting a plurality of characteristic parts on the object, setting an evaluation standard of imaging based on the imaging candidate positions and the imaging conditions for each characteristic part, calculating individual evaluation values for the respective characteristic parts according to the evaluation standard, and calculating a sum of the obtained individual evaluation values for the respective characteristic parts, wherein, in a case where a three-dimensional shape of the object is used as the characteristic part, information on vertices, ridges, or the like is acquired from at a time of design of a structure of the object, and is set as the characteristic part.

16. An imaging method comprising:

a step of acquiring an imaging evaluation map in which an evaluation value that represents an evaluation of imaging in a case where an object is imaged at a specific position under a specific imaging condition is determined at a plurality of imaging candidate positions for each of a plurality of imaging conditions, wherein the plurality of imaging conditions comprise a plurality of imaging directions;

a step of acquiring information on a plurality of usable mobile devices;

a step of acquiring section that acquires information on an aging device to be used; and a step of selecting the mobile device suitable for imaging the object, on the basis of the acquired imaging evaluation map, the information on the imaging device and information on the mobile device, wherein the information on the imaging device comprises an available time which is a time during which the imaging device can be used based on a capacity of a battery installed in the imaging device, wherein the evaluation value for each imaging condition at each imaging candidate position is calculated by setting a plurality of characteristic parts on the object, setting an evaluation standard of imaging based on the imaging candidate positions and the imaging conditions for each characteristic part, calculating individual evaluation values for the respective characteristic parts according to the evaluation standard, and calculating a sum of the obtained individual evaluation values for the respective characteristic parts, wherein, in a case where a three-dimensional shape of the object is used as the characteristic part, information on vertices, ridges, or the like is acquired from at a time of design of a structure of the object, and is set as the characteristic part.

17. An imaging method comprising:

a step of acquiring an imaging evaluation map in which an evaluation value that represents an evaluation of imaging in a case where an object is imaged at a specific position under a specific imaging condition is determined at a plurality of imaging candidate positions for each of a plurality of imaging conditions, wherein the plurality of imaging conditions comprise a plurality of imaging directions;

a step of acquiring information on a usable imaging device;

a step of acquiring information on a usable mobile device; and a step of generating an imaging plan suitable for imaging the object, on the basis of the acquired imaging evaluation map, information on the imaging device, and information on the mobile device, wherein the information on the imaging device comprises an available time which is a time during which the imaging device can be used based on a capacity of a battery installed in the imaging device, wherein the evaluation value for each imaging condition at each imaging candidate position is calculated by setting a plurality of characteristic parts on the object, setting an evaluation standard of imaging based on the imaging candidate positions and the imaging conditions for each characteristic part, calculating individual evaluation values for the respective characteristic parts according to the evaluation standard, and calculating a sum of the obtained individual evaluation values for the respective characteristic parts, wherein, in a case where a three-dimensional shape of the object is used as the characteristic part, information on vertices, ridges, or the like is acquired from at a time of design of a structure of the object, and is set as the characteristic part.

18. A non-transitory computer-readable recording medium causing a computer to implement an imaging function in a case where a command stored in the recording medium is read by the computer, the imaging function comprising, a function of acquiring an imaging evaluation map in which an evaluation value that represents an evaluation of imaging in a case where an object is imaged at a specific position under a specific imaging condition is determined at a plurality of imaging candidate positions for each of a plurality of imaging conditions, wherein the plurality of imaging conditions comprise a plurality of imaging directions, a function of acquiring section that acquires information on an imaging device to be used; and a function of selecting an imaging point suitable for imaging the object and an imaging condition at the imaging point on the basis of the acquired imaging evaluation map and the information on the imaging device, wherein the information on the imaging device comprises an available time which is a time during which the imaging device can be used based on a capacity of a battery installed in the imaging device, wherein the evaluation value for each imaging condition at each imaging candidate position is calculated by setting a plurality of characteristic parts on the object, setting an evaluation standard of imaging based on the imaging candidate positions and the imaging conditions for each characteristic part, calculating individual evaluation values for the respective characteristic parts according to the evaluation standard, and calculating a sum of the obtained individual evaluation values for the respective characteristic parts, wherein, in a case where a three-dimensional shape of the object is used as the characteristic part, information on vertices, ridges, or the like is acquired from at a time of design of a structure of the object, and is set as the characteristic part.

19. A non-transitory computer-readable recording medium causing a computer to implement an imaging function in a case where a command stored in the recording medium is read by the computer, the imaging function comprising, a function of acquiring an imaging evaluation map in which an evaluation value that represents an evaluation of imaging in a case where an object is imaged at a specific position under a specific imaging condition is determined at a plurality of imaging candidate positions for each of a plurality of imaging conditions, wherein the plurality of imaging conditions comprise a plurality of imaging directions, a function of acquiring information on a plurality of usable imaging devices, and a function of selecting an imaging device suitable for imaging the object and an imaging condition at the imaging device on the basis of the acquired imaging evaluation map, wherein the information on the plurality of usable imaging devices comprises an available time which is a time during which the plurality of usable imaging devices can be used based on a capacity of a battery installed in each of the plurality of usable imaging devices, wherein the evaluation value for each imaging condition at each imaging candidate position is calculated by setting a plurality of characteristic parts on the object, setting an evaluation standard of imaging based on the imaging candidate positions and the imaging conditions for each characteristic part, calculating individual evaluation values for the respective characteristic parts according to the evaluation standard, and calculating a sum of the obtained individual evaluation values for the respective characteristic parts, wherein, in a case where a three-dimensional shape of the object is used as the characteristic part, information on vertices, ridges, or the like is acquired from at a time of design of a structure of the object, and is set as the characteristic part.

20. A non-transitory computer-readable recording medium causing a computer to implement an imaging function in a case where a command stored in the recording medium is read by the computer, the imaging function comprising, a function of acquiring an imaging evaluation map in which an evaluation value that represents an evaluation of imaging in a case where an object is imaged at a specific position under a specific imaging condition is determined at a plurality of imaging candidate positions for each of a plurality of imaging conditions, wherein the plurality of imaging conditions comprise a plurality of imaging directions, a function of acquiring information on a plurality of usable mobile devices, a function of acquiring section that acquires information on an imaging device to be used, and a function of selecting the mobile device suitable for imaging the object, on the basis of the acquired imaging evaluation map, the information on the imaging device and information on the mobile device, wherein the information on the imaging device comprises an available time which is a time during which the imaging device can be used based on a capacity of a battery installed in the imaging device, wherein the evaluation value for each imaging condition at each imaging candidate position is calculated by setting a plurality of characteristic parts on the object, setting an evaluation standard of imaging based on the imaging candidate positions and the imaging conditions for each characteristic part, calculating individual evaluation values for the respective characteristic parts according to the evaluation standard, and calculating a sum of the obtained individual evaluation values for the respective characteristic parts, wherein, in a case where a three-dimensional shape of the object is used as the characteristic part, information on vertices, ridges, or the like is acquired from at a time of design of a structure of the object, and is set as the characteristic part.

21. A non-transitory computer-readable recording medium causing a computer to implement an imaging function in a case where a command stored in the recording medium is read by the computer, the imaging function comprising, a function of acquiring an imaging evaluation map in which an evaluation value that represents an evaluation of imaging in a case where an object is imaged at a specific position under a specific imaging condition is determined at a plurality of imaging candidate positions for each of a plurality of imaging conditions, wherein the plurality of imaging conditions comprise a plurality of imaging directions, a function of acquiring information on a usable imaging device, a function of acquiring information on a usable mobile device, and a function of generating an imaging plan suitable for imaging the object, on the basis of the acquired imaging evaluation map, information on the imaging device, and information on the mobile device, wherein the information on the imaging device comprises an available time which is a time during which the imaging device can be used based on a capacity of a battery installed in the imaging device, wherein the evaluation value for each imaging condition at each imaging candidate position is calculated by setting a plurality of characteristic parts on the object, setting an evaluation standard of imaging based on the imaging candidate positions and the imaging conditions for each characteristic part, calculating individual evaluation values for the respective characteristic parts according to the evaluation standard, and calculating a sum of the obtained individual evaluation values for the respective characteristic parts, wherein, in a case where a three-dimensional shape of the object is used as the characteristic part, information on vertices, ridges, or the like is acquired from at a time of design of a structure of the object, and is set as the characteristic part.

* * * * *